(12) United States Patent
Kadar et al.

(10) Patent No.: US 12,339,500 B2
(45) Date of Patent: Jun. 24, 2025

(54) CONNECTOR STRUCTURE FOR CONNECTING OPTICAL CONDUITS, CRIMPING DEVICE AND PUSH-OUT DEVICE THEREFOR, AND LIGHT BLOCKING ELEMENT FOR A CONNECTOR PART

(71) Applicant: Equip-Test Kft., Vecses (HU)

(72) Inventors: Zoltan Kadar, Szentendre (HU); Csaba Kadar, Szentendre (HU)

(73) Assignee: Equip-Test Kft., Vecses (HU)

( * ) Notice: Subject to any disclaimer, the term of this patent is extended or adjusted under 35 U.S.C. 154(b) by 507 days.

(21) Appl. No.: 17/416,630

(22) PCT Filed: Nov. 8, 2019

(86) PCT No.: PCT/HU2019/000035
§ 371 (c)(1),
(2) Date: Jun. 21, 2021

(87) PCT Pub. No.: WO2020/128541
PCT Pub. Date: Jun. 25, 2020

(65) Prior Publication Data
US 2022/0057582 A1 Feb. 24, 2022

(30) Foreign Application Priority Data
Dec. 20, 2018 (HU) .................... P1800439

(51) Int. Cl.
*G02B 6/38* (2006.01)
*G02B 6/42* (2006.01)

(52) U.S. Cl.
CPC ......... *G02B 6/3809* (2013.01); *G02B 6/3802* (2013.01); *G02B 6/3897* (2013.01); *G02B 6/4219* (2013.01); *G02B 6/3857* (2013.01)

(58) Field of Classification Search
CPC .. G02B 6/3809; G02B 6/3802; G02B 6/3897; G02B 6/4219; G02B 6/3857;
(Continued)

(56) References Cited

U.S. PATENT DOCUMENTS 4,512,630 A 4/1985 Runge
4,531,702 A 7/1985 Plummer
(Continued)

FOREIGN PATENT DOCUMENTS

DE 19807596 9/1998

OTHER PUBLICATIONS

European Patent Office, International Search Report in PCT Application No. PCT/HU2019/000035, Apr. 15, 2020 (5 pgs.).
(Continued)

*Primary Examiner* — Tina M Wong
(74) *Attorney, Agent, or Firm* — Wood Herron & Evans LLP

(57) ABSTRACT

The invention is a connector structure for connecting optical conduits comprising a first connector part (11) and a second connector part (21) connectible to each other, the first connector part (11) comprises a head unit comprising a head portion (18) arranged with a conical receiving space part (35), a connector housing element (22), and a first resilient element (26) in an inner space of the connector housing element (22), and a first conduit channel adapted for arranging a first optical conduit is formed in the first connector part (11), and the second connector part (21) comprises a second head portion (16) having a spherical end portion adapted for being circularly seated on the conical side wall (30) of the conical receiving space part (35) of the first head portion (18) of the first connector part (11) in case the first connector part (11) is connected to the second connector part (21), and a second conduit channel adapted for arranging a second
(Continued)

optical conduit is formed in the second connector part (21). The invention is, furthermore, a crimping device for securing an optical conduit into a connector part, a push-out device for removing an optical conduit from a connector part, and a light blocking element for a connector part.

13 Claims, 52 Drawing Sheets

(58) Field of Classification Search
CPC .... G02B 6/3821; G02B 6/424; G02B 6/3849; G02B 6/3873; G02B 6/36; G02B 6/38
USPC .... 385/55–56, 60–62, 64, 68, 70, 73–74, 79
See application file for complete search history.

(56) References Cited

U.S. PATENT DOCUMENTS

| | | |
|---|---|---|
| 4,953,938 A | 9/1990 | Buhrer et al. |
| 5,796,894 A * | 8/1998 | Csipkes ............... G02B 6/3821 |
| | | 385/38 |
| 2006/0177182 A1* | 8/2006 | Mine .................... G02B 6/3825 |
| | | 385/74 |

OTHER PUBLICATIONS

European Patent Office, Written Opinion of the International Searching authority in PCT Application No. PCT/HU2019/000035, Apr. 15, 2020 (7 pgs.).
EP Applicaton No. 19 856 456.9 Office Action dated Nov. 21, 2023.

\* cited by examiner

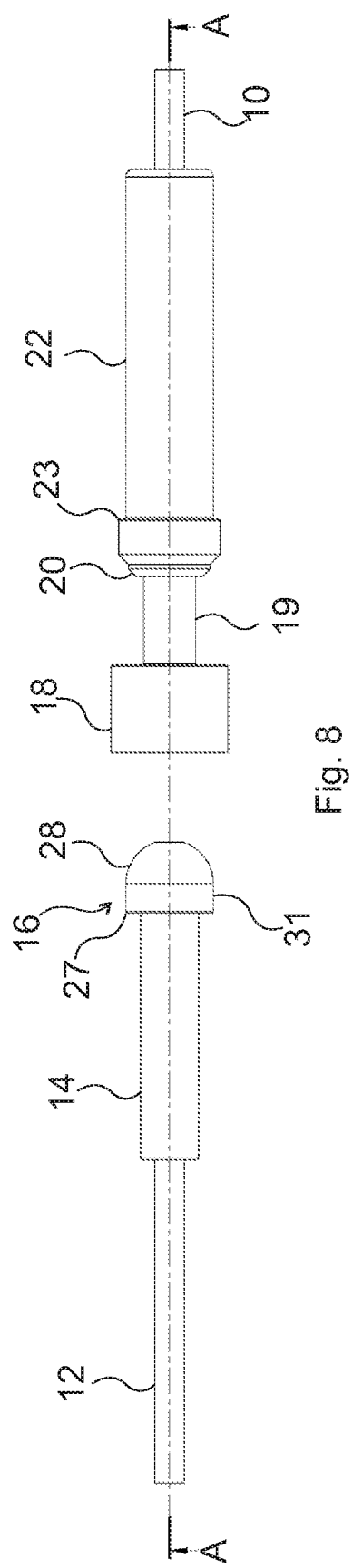
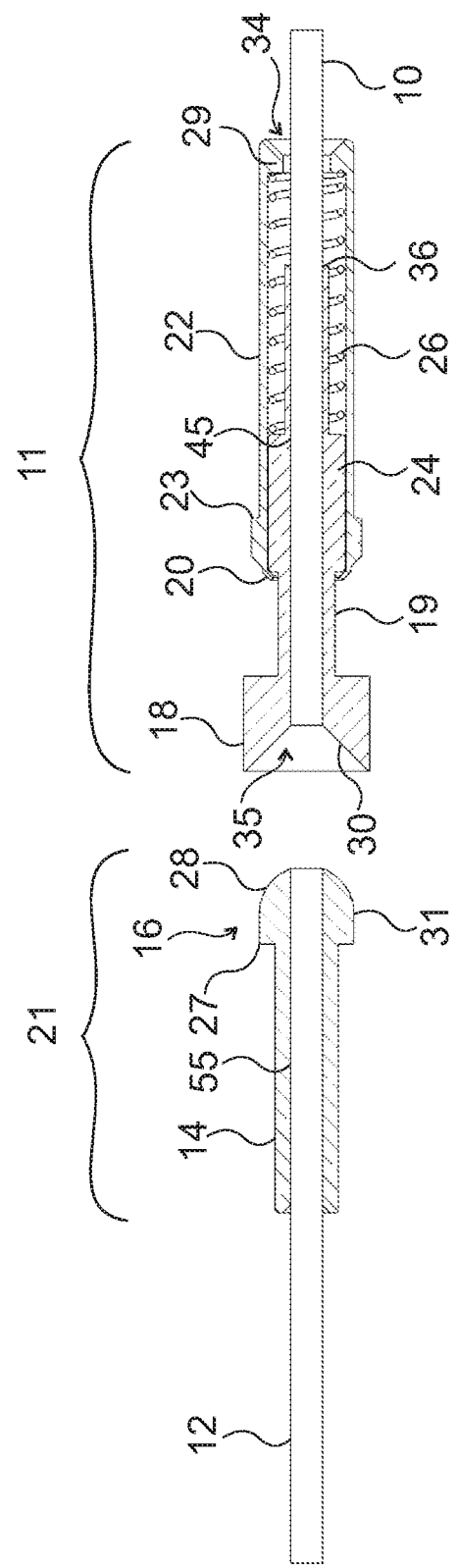
Fig. 8
Fig. 9

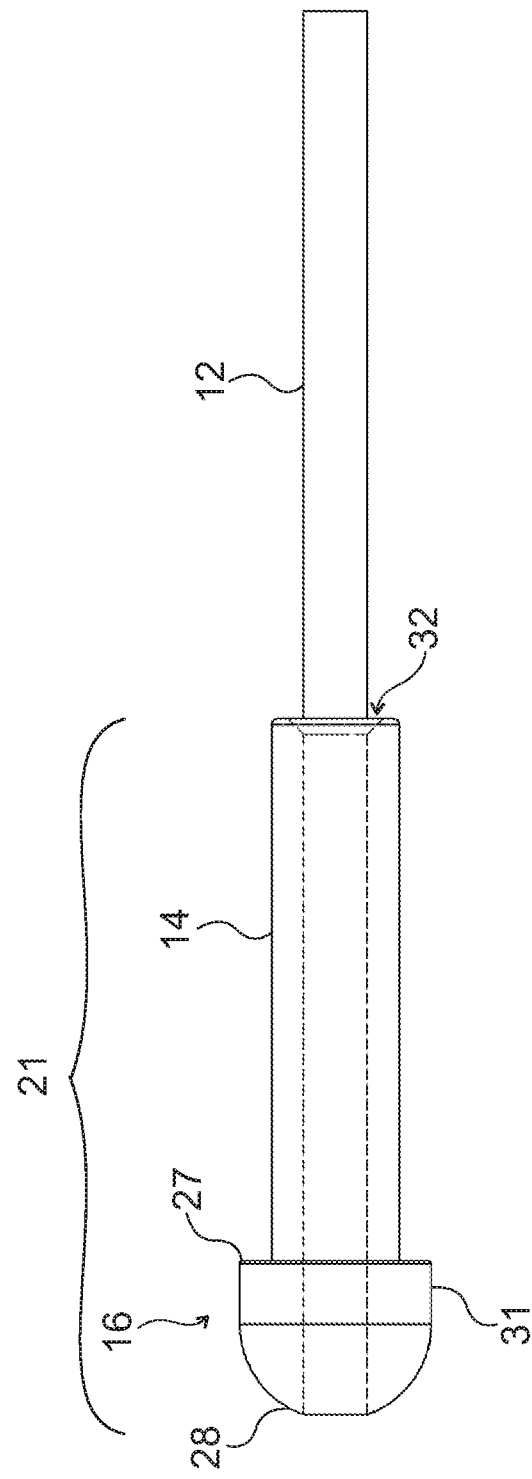

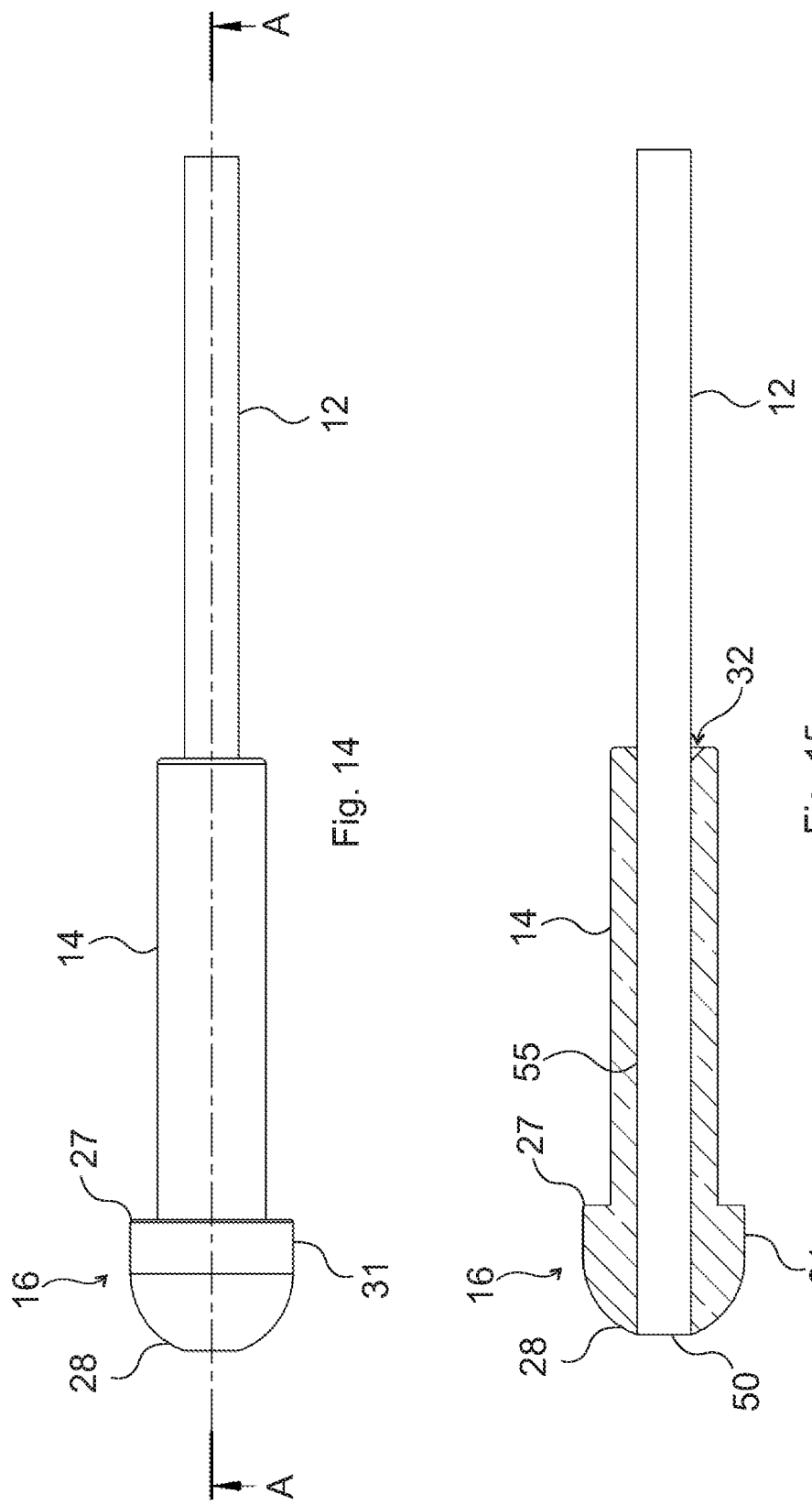

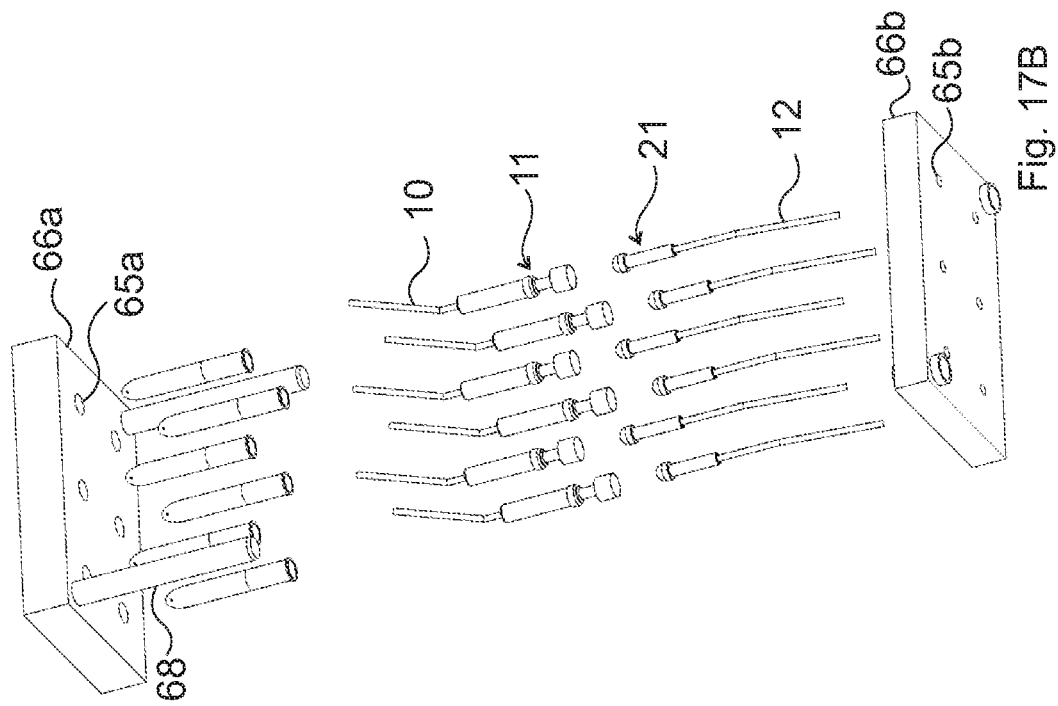
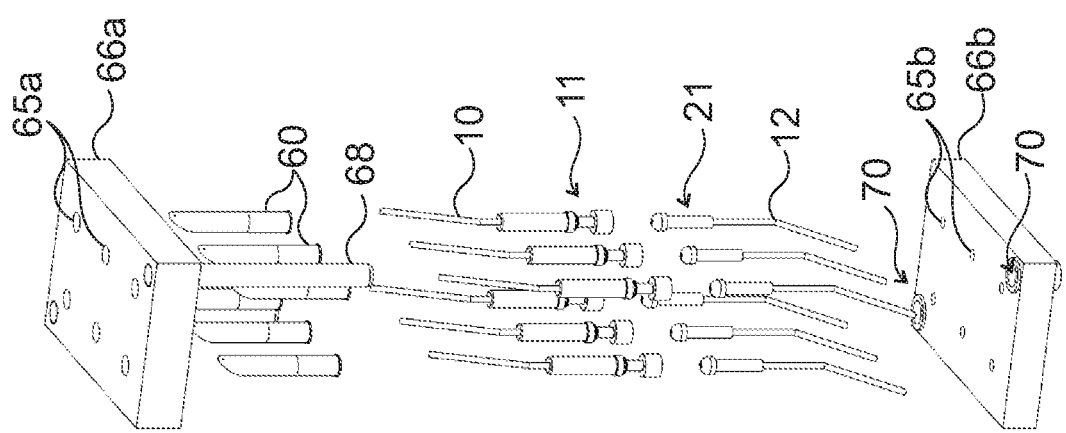
Fig. 17B
Fig. 17A

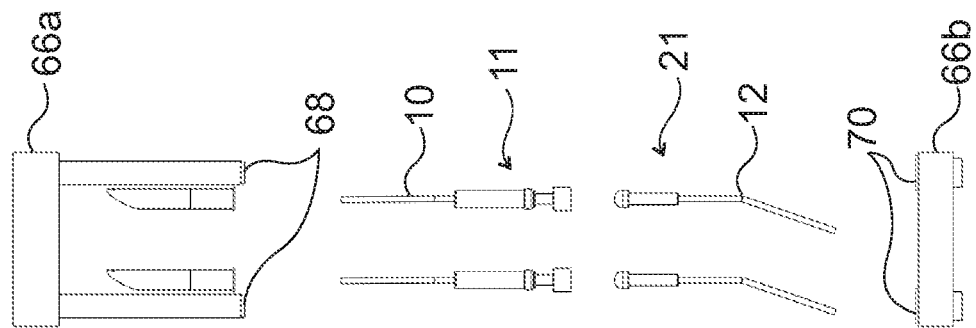
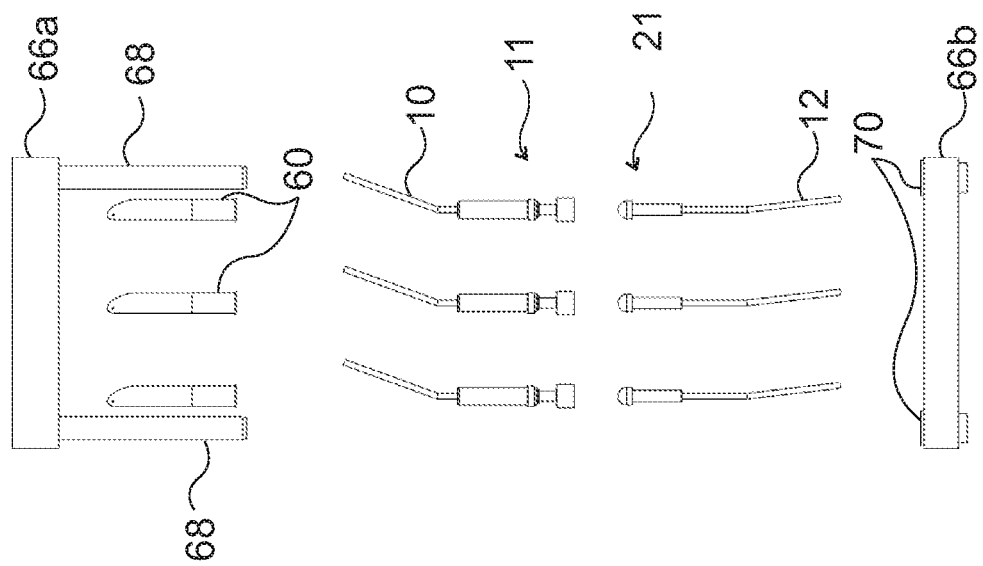

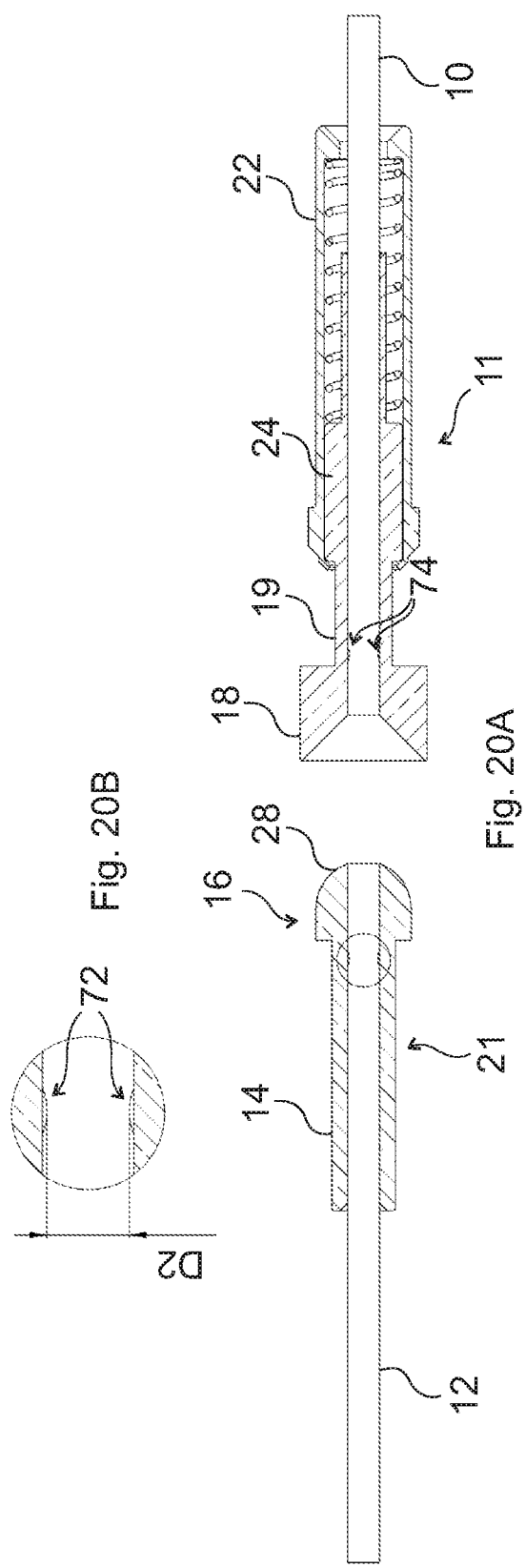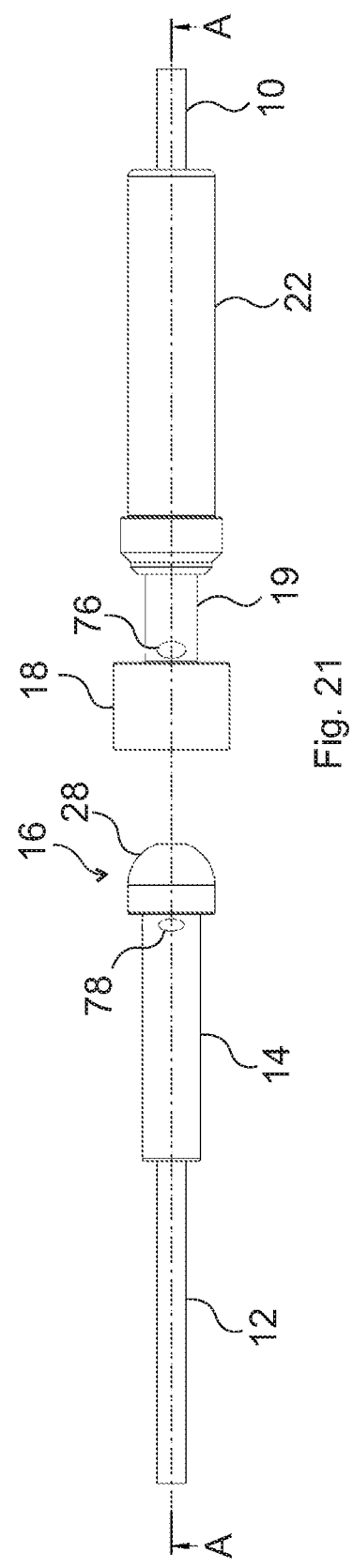
Fig. 20A Fig. 20B Fig. 21

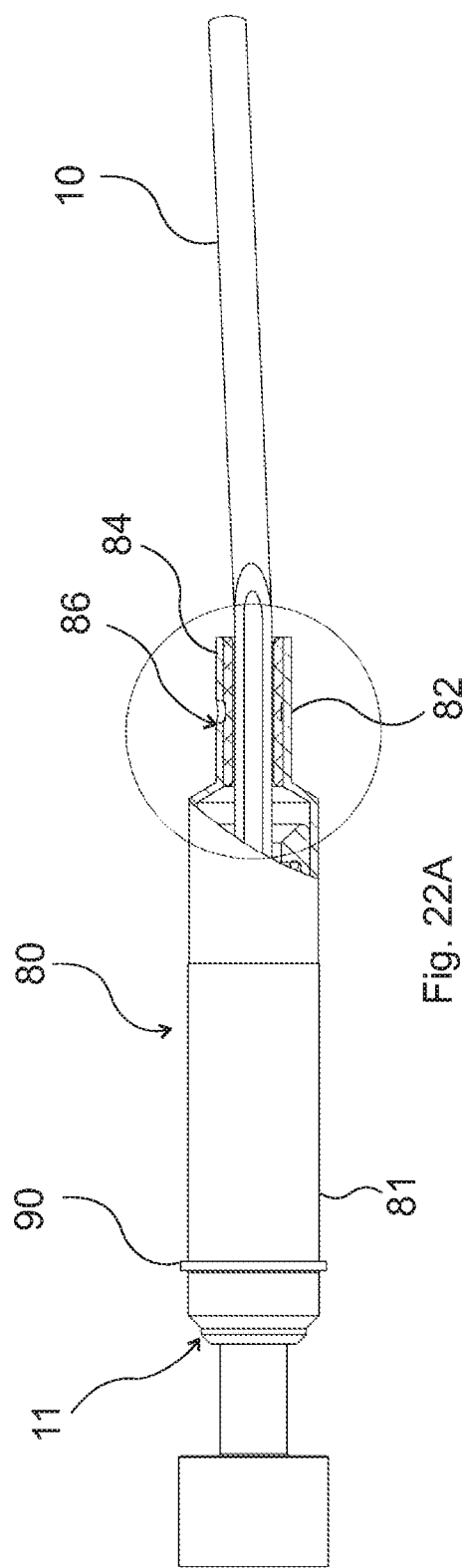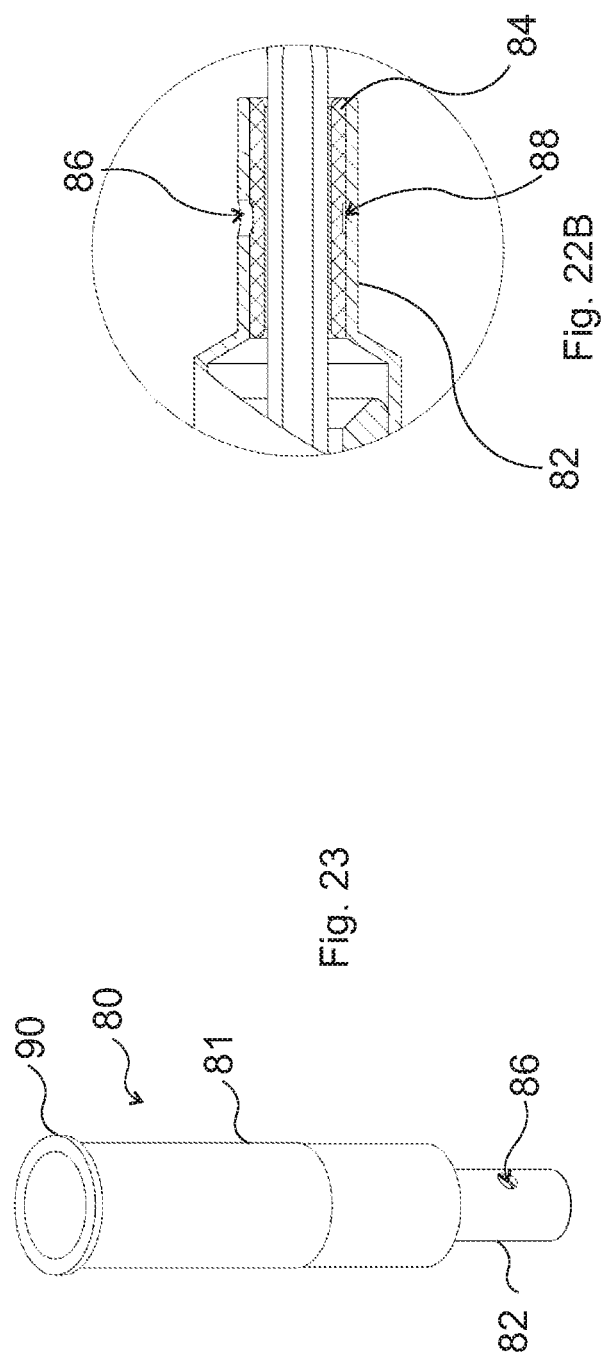
Fig. 22A
Fig. 22B
Fig. 23

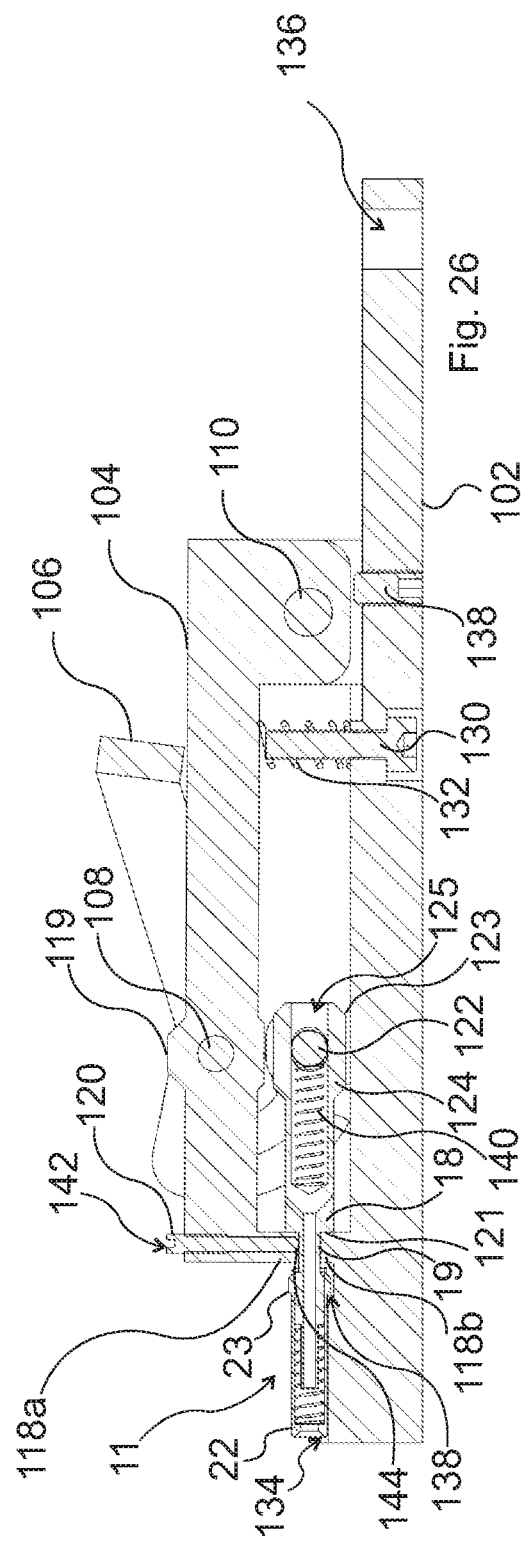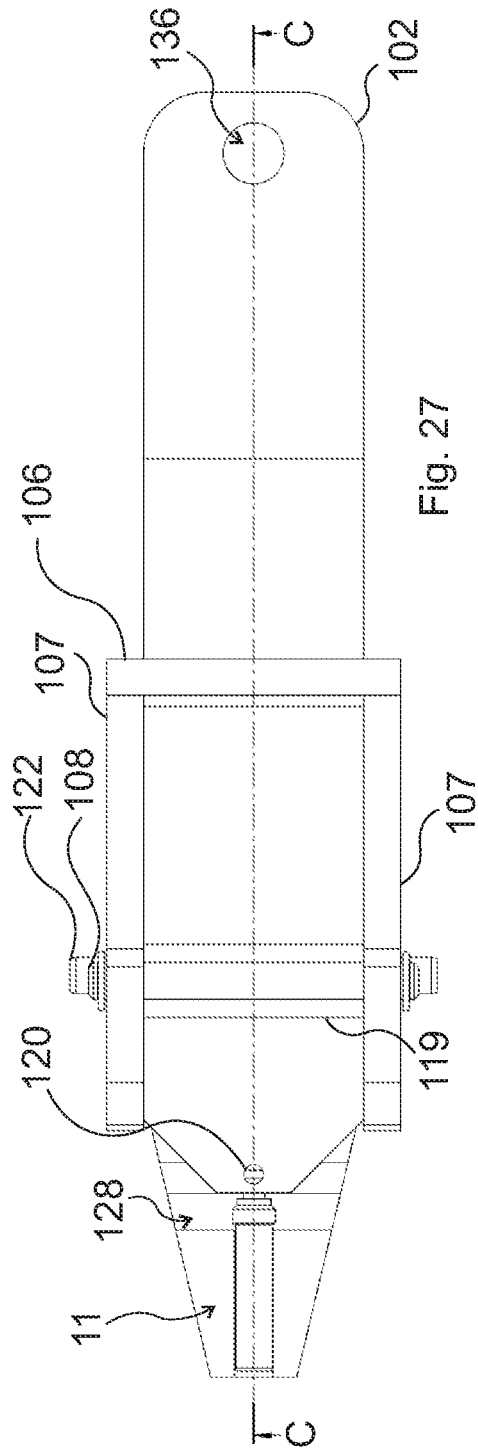

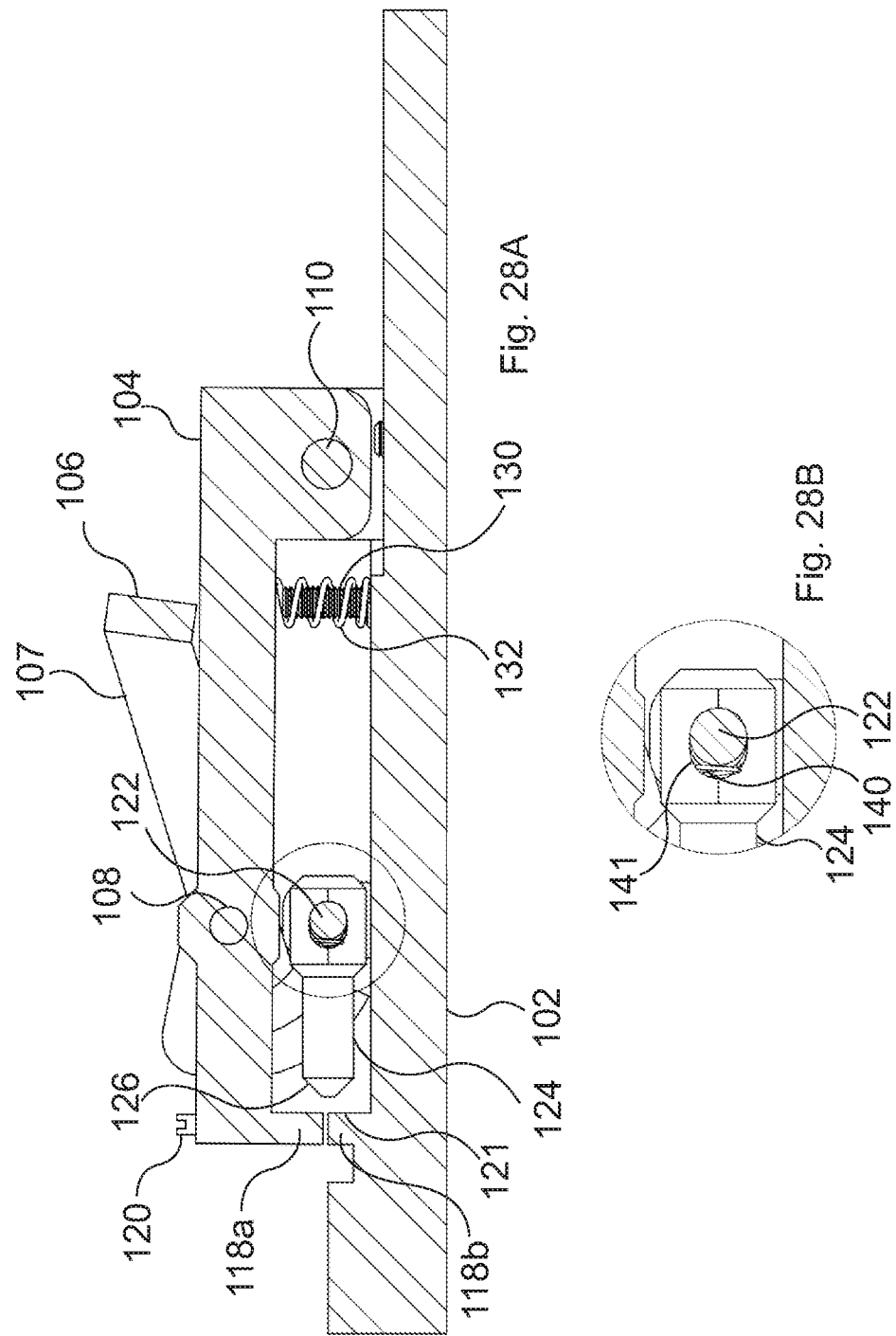

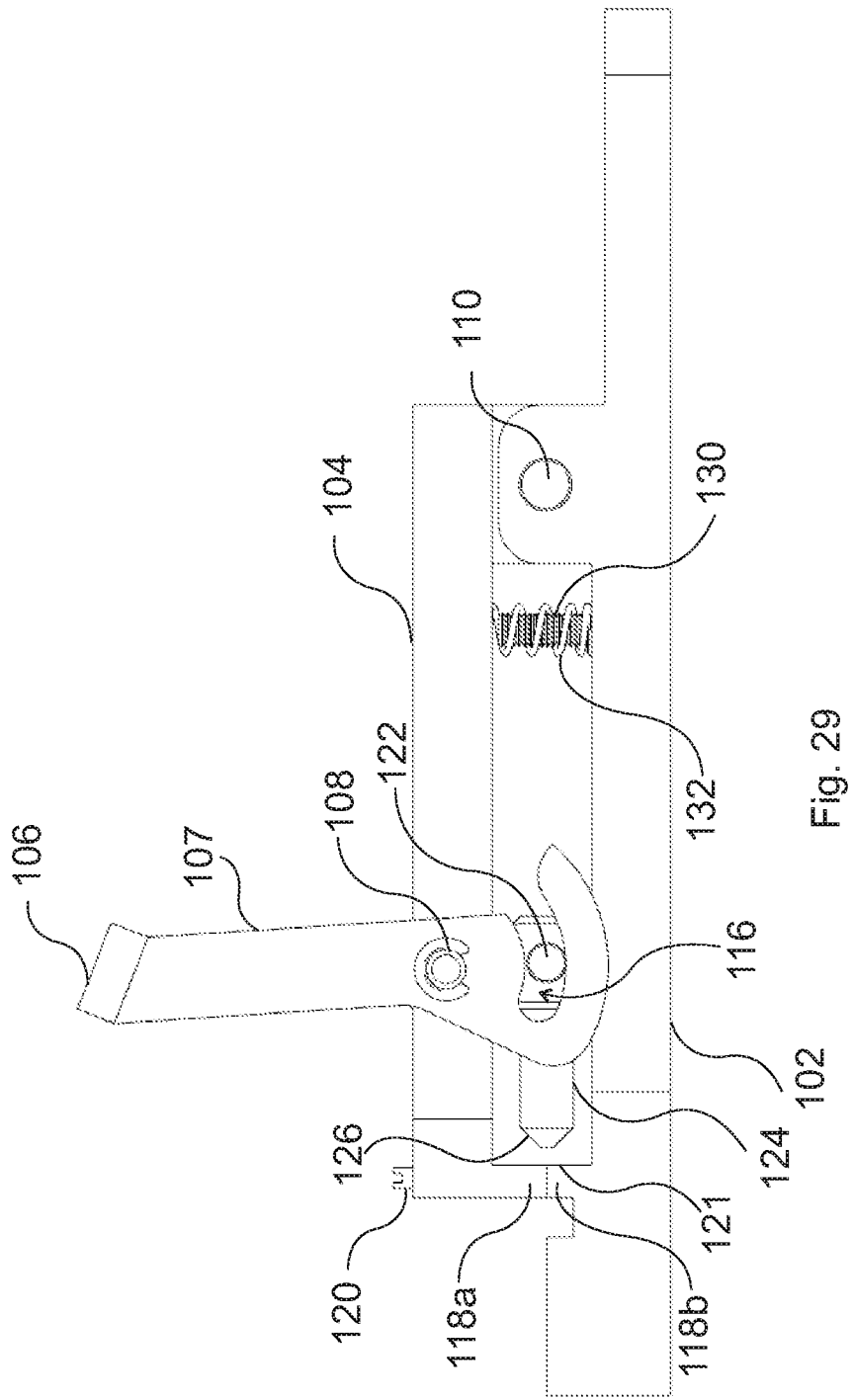

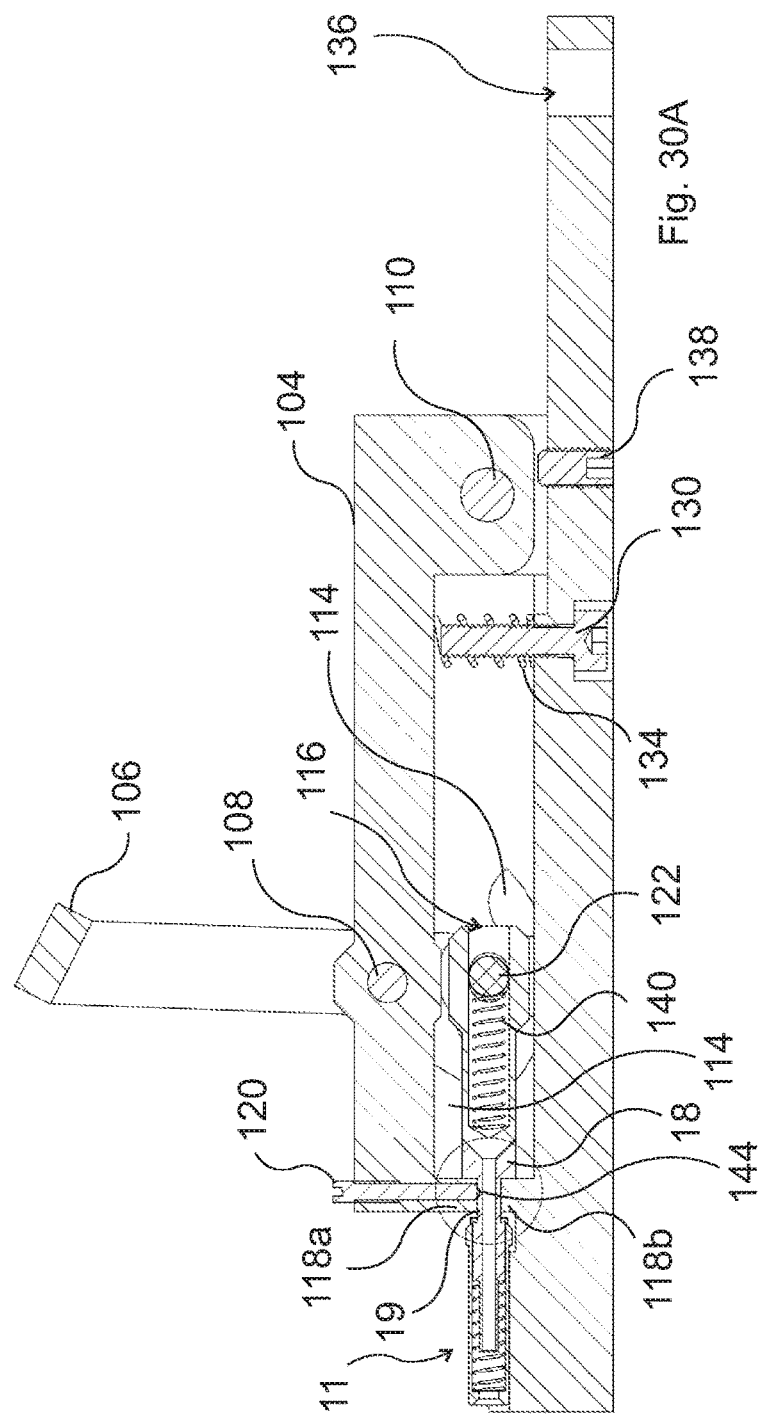
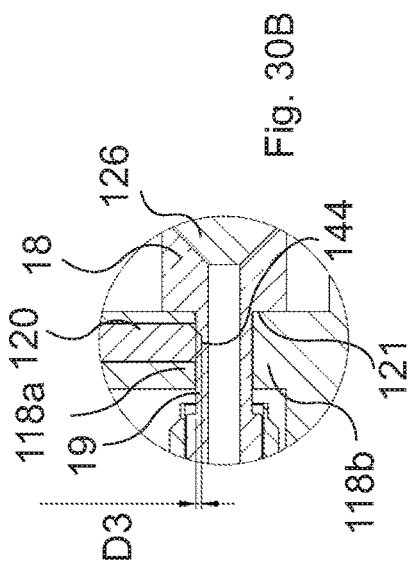
Fig. 30A
Fig. 30B

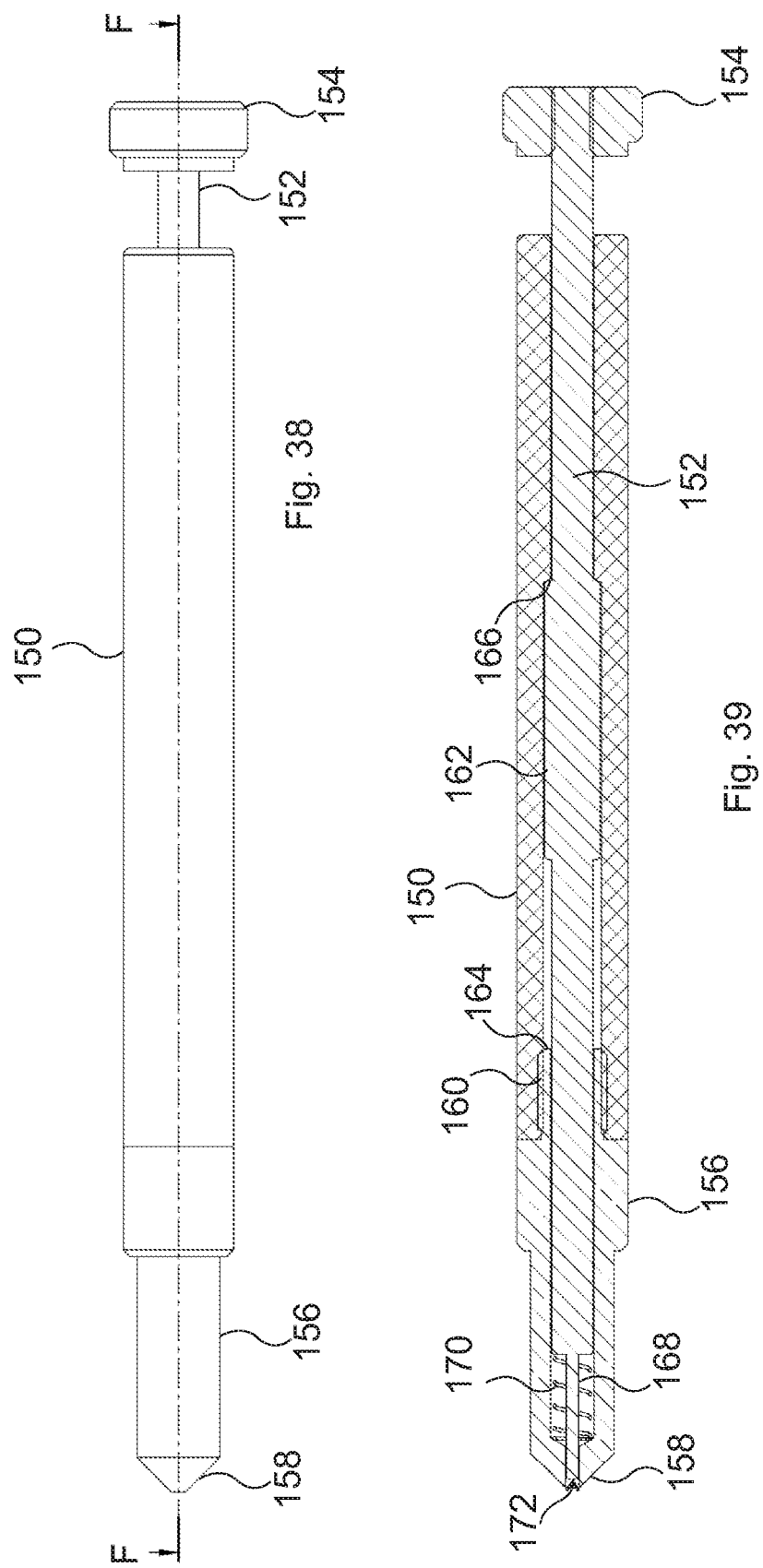

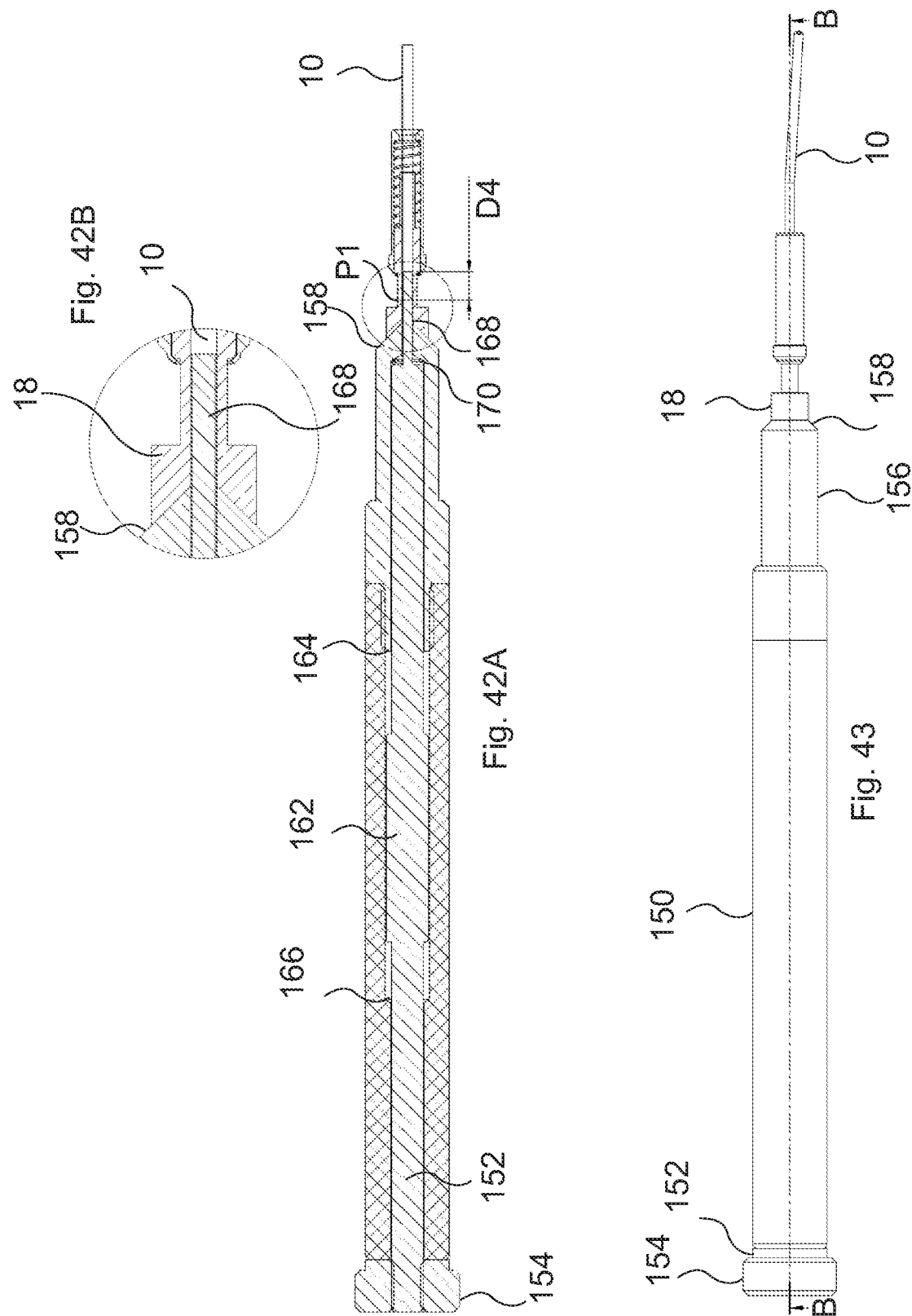

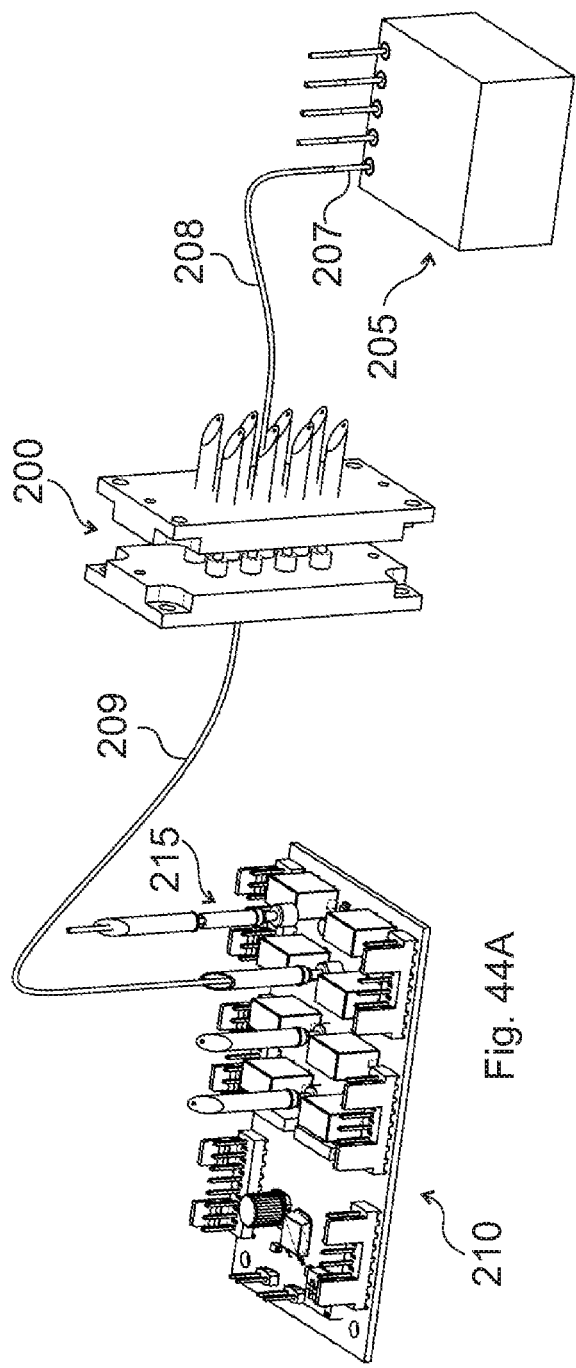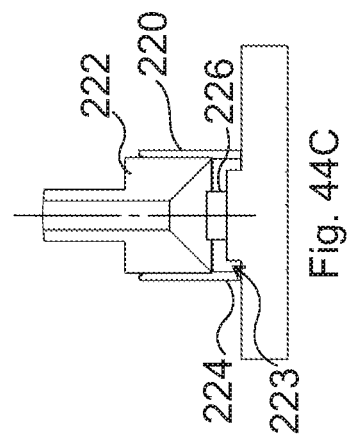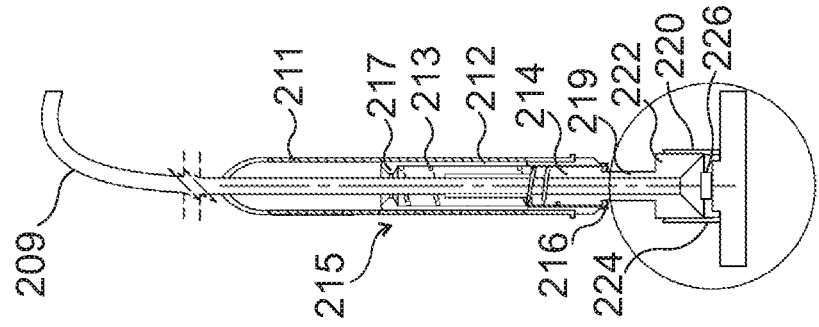

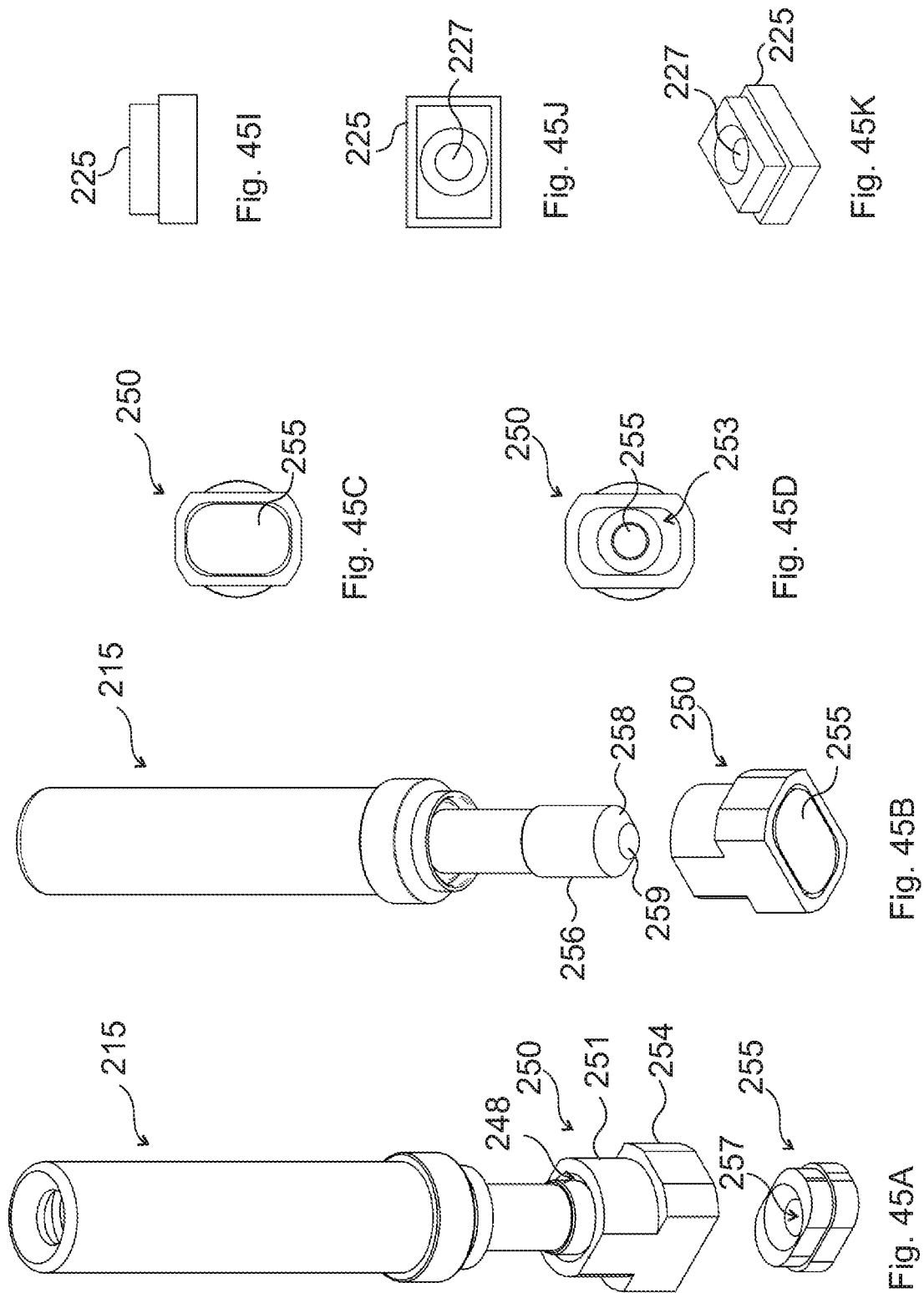

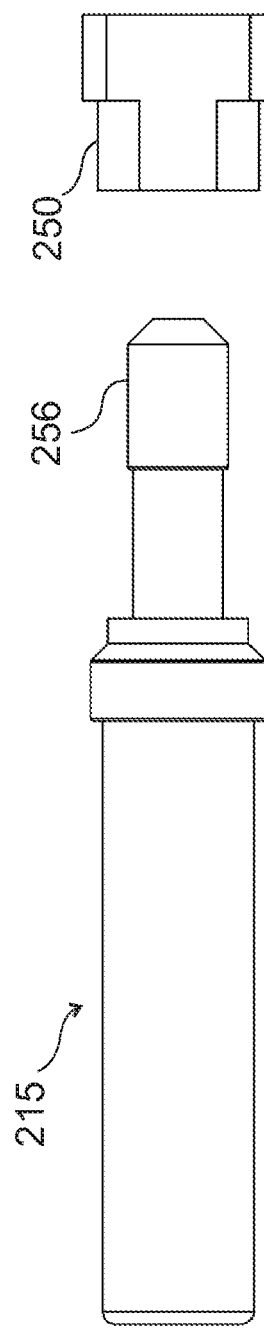
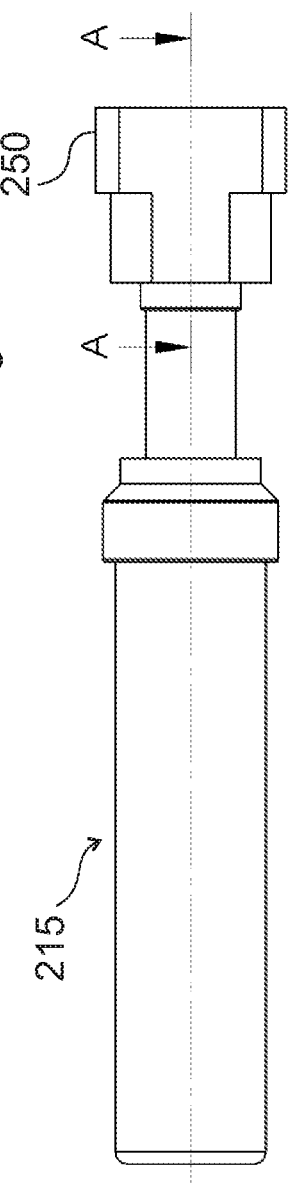
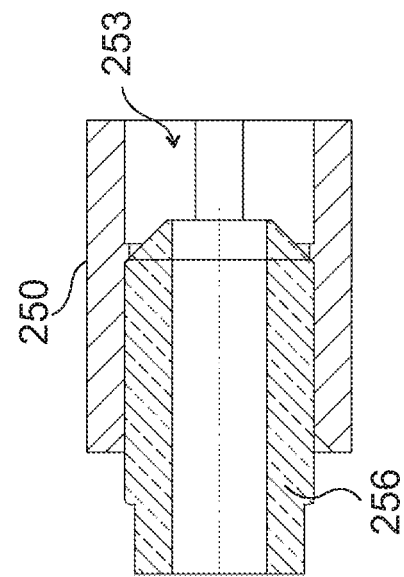
Fig. 45E  Fig. 45F  Fig. 45G  Fig. 45H

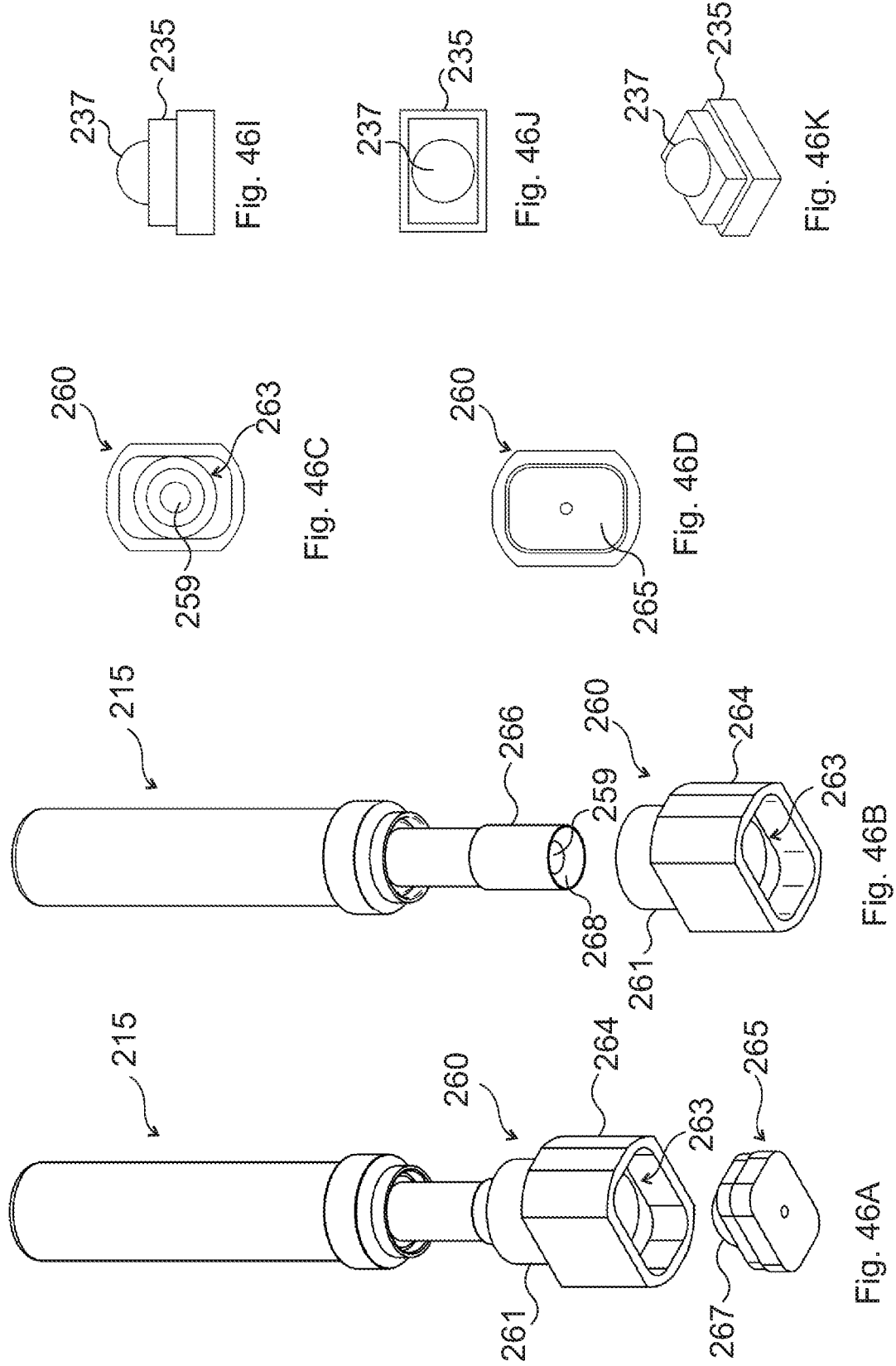

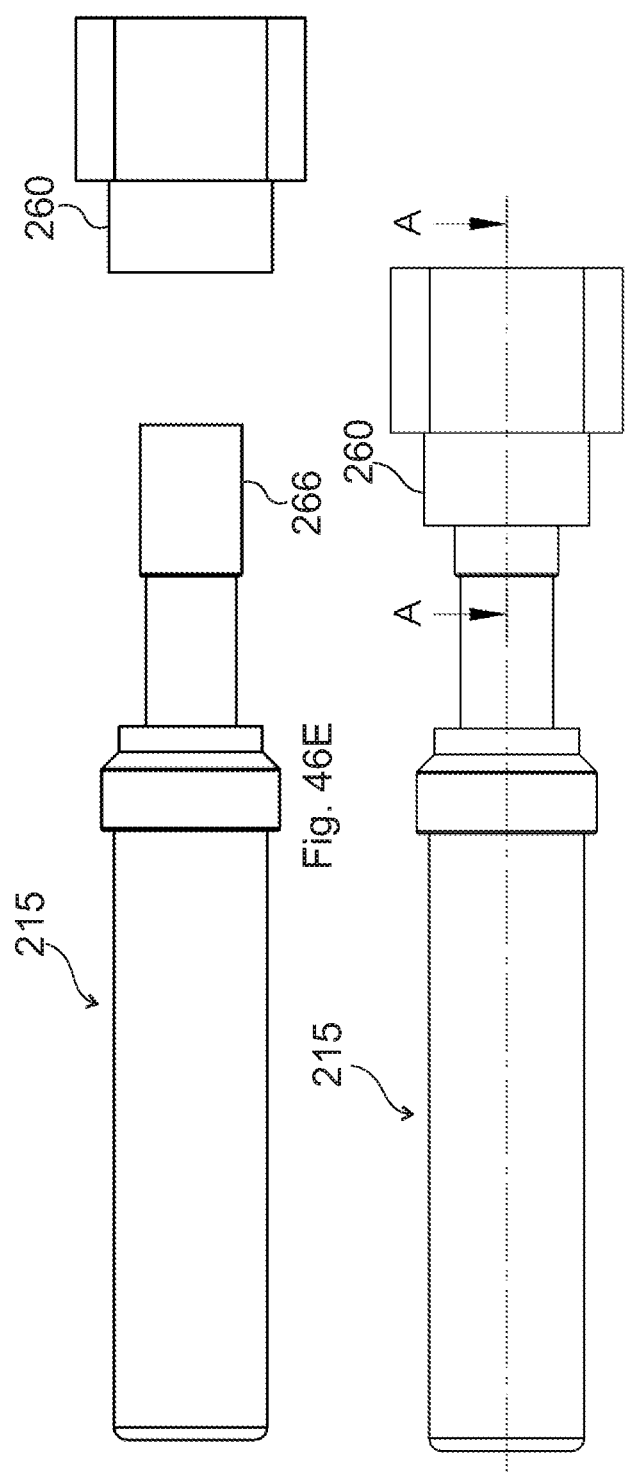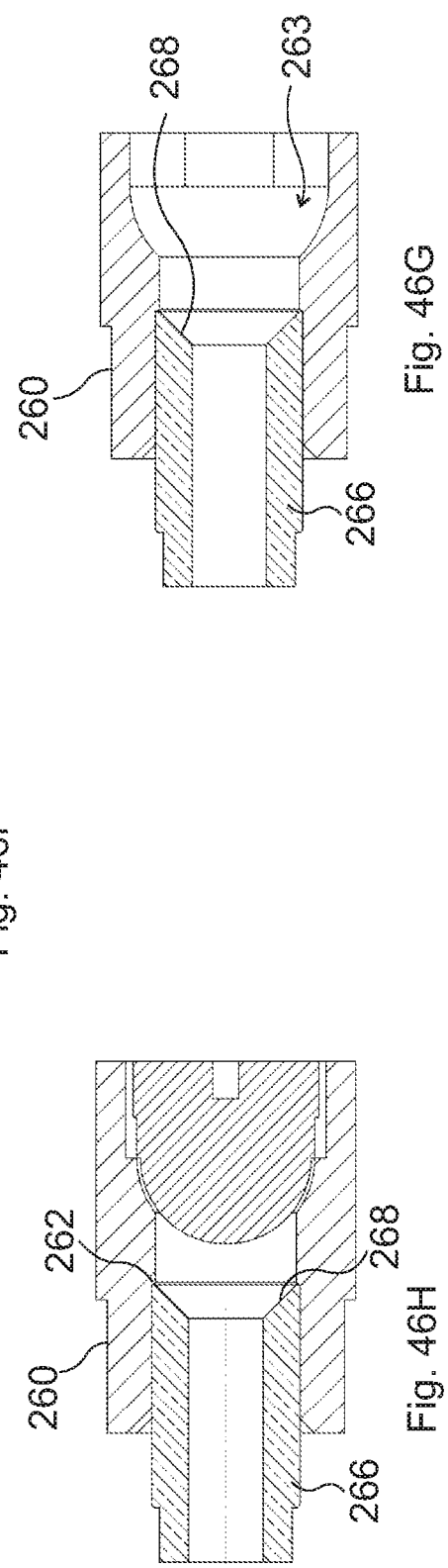

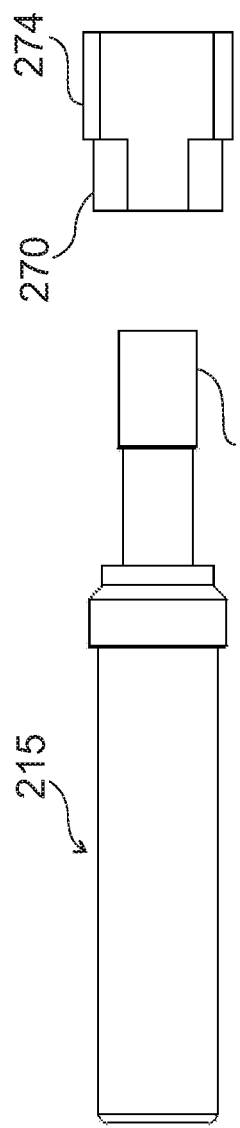
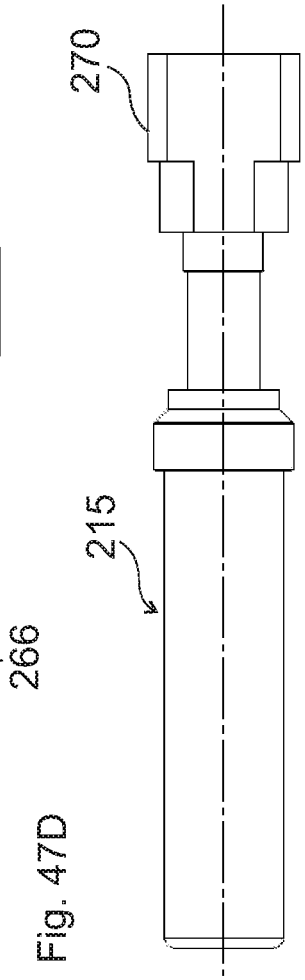
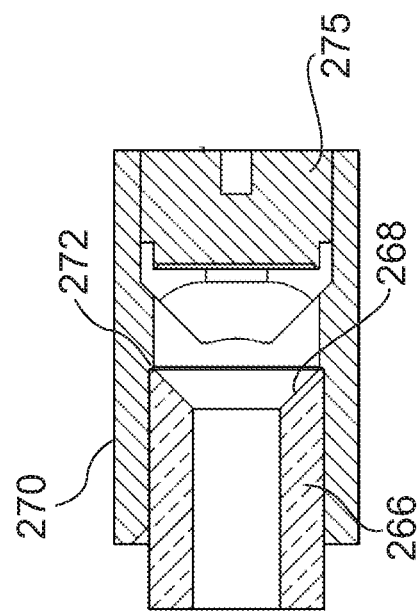
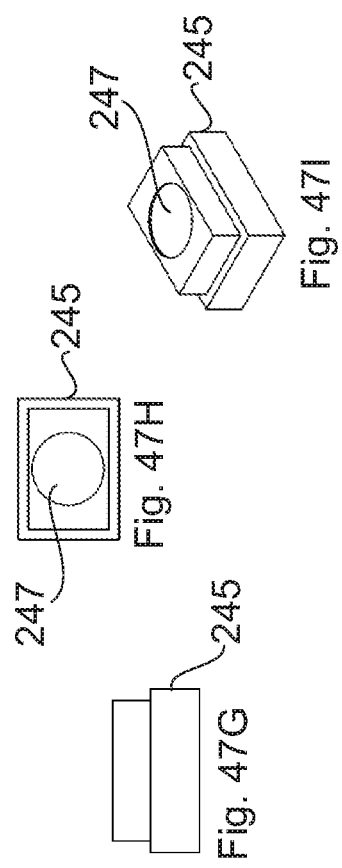
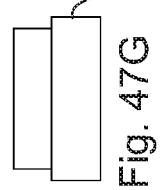

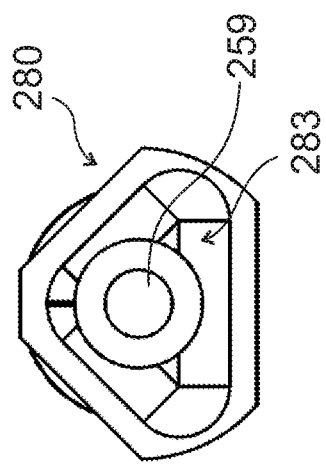
Fig. 48C
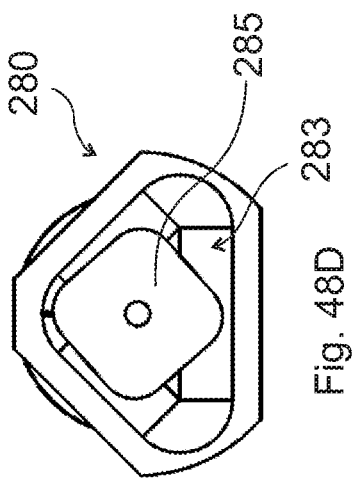
Fig. 48D
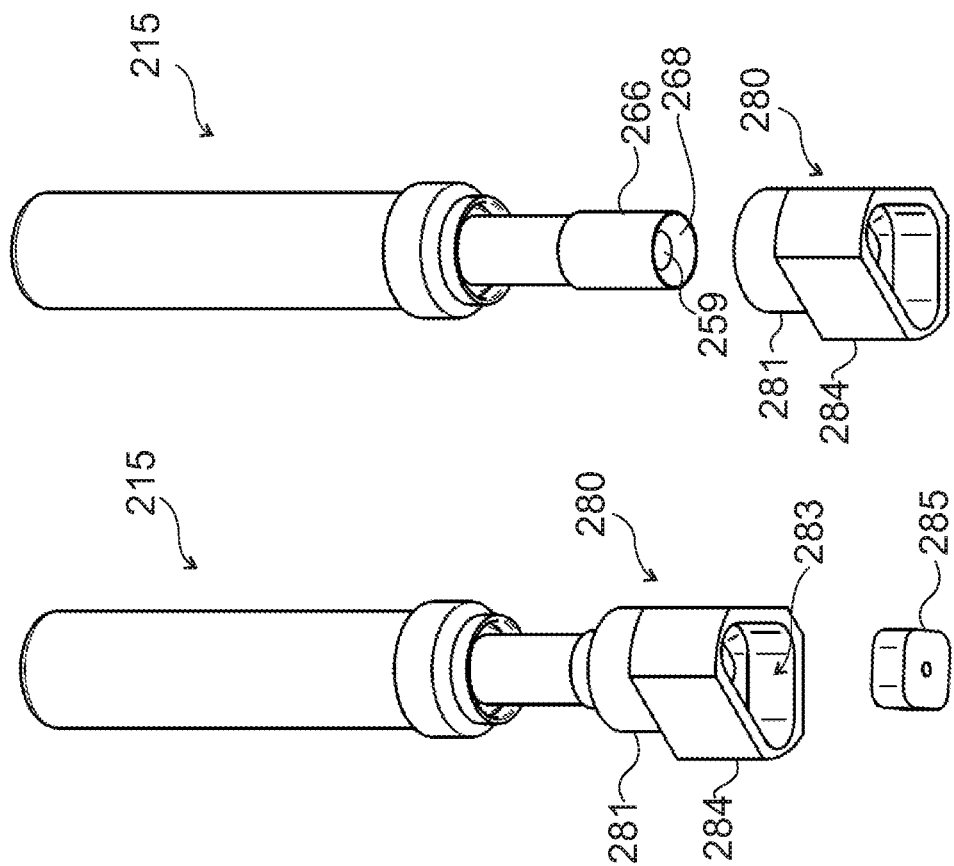
Fig. 48B
Fig. 48A

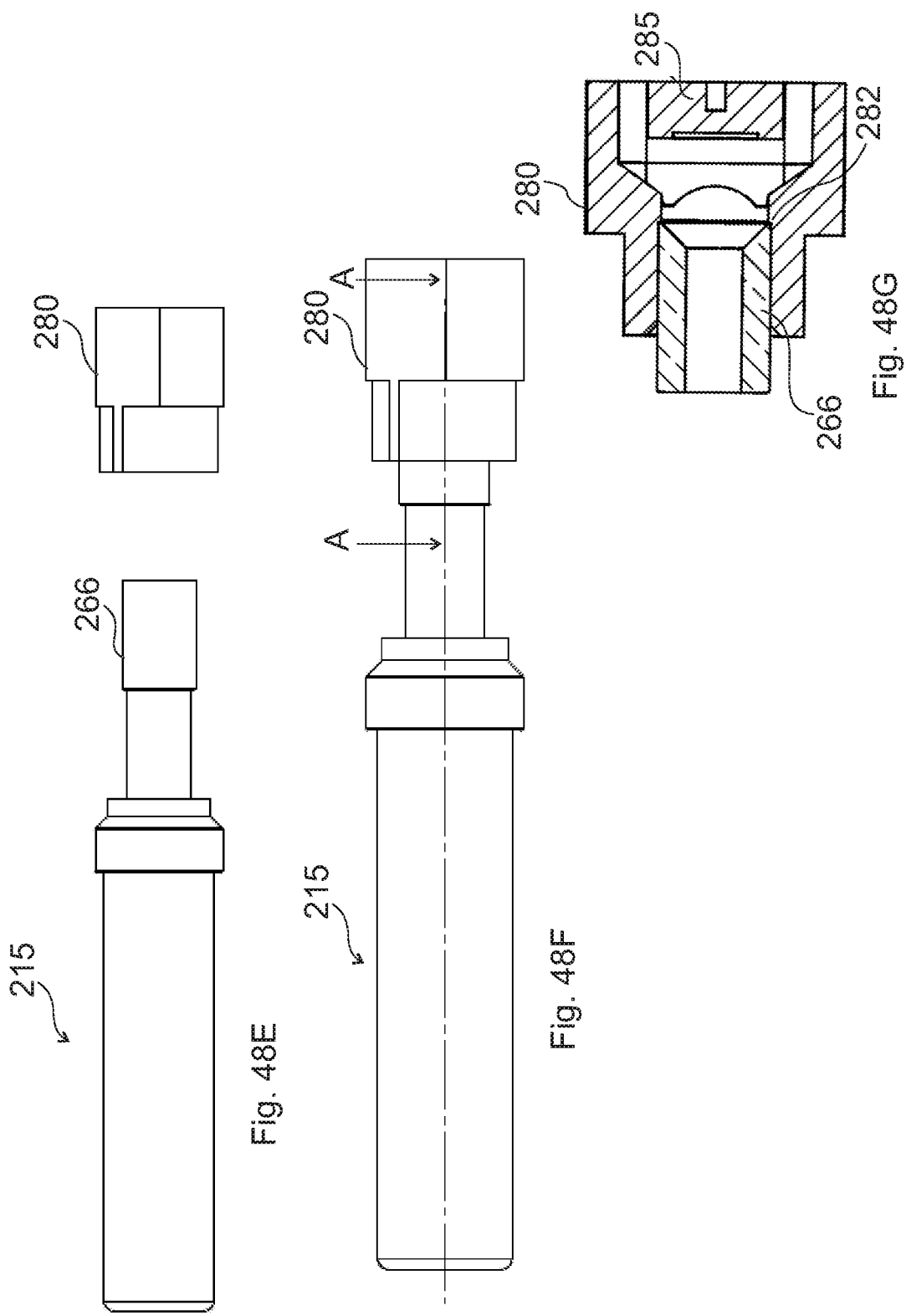

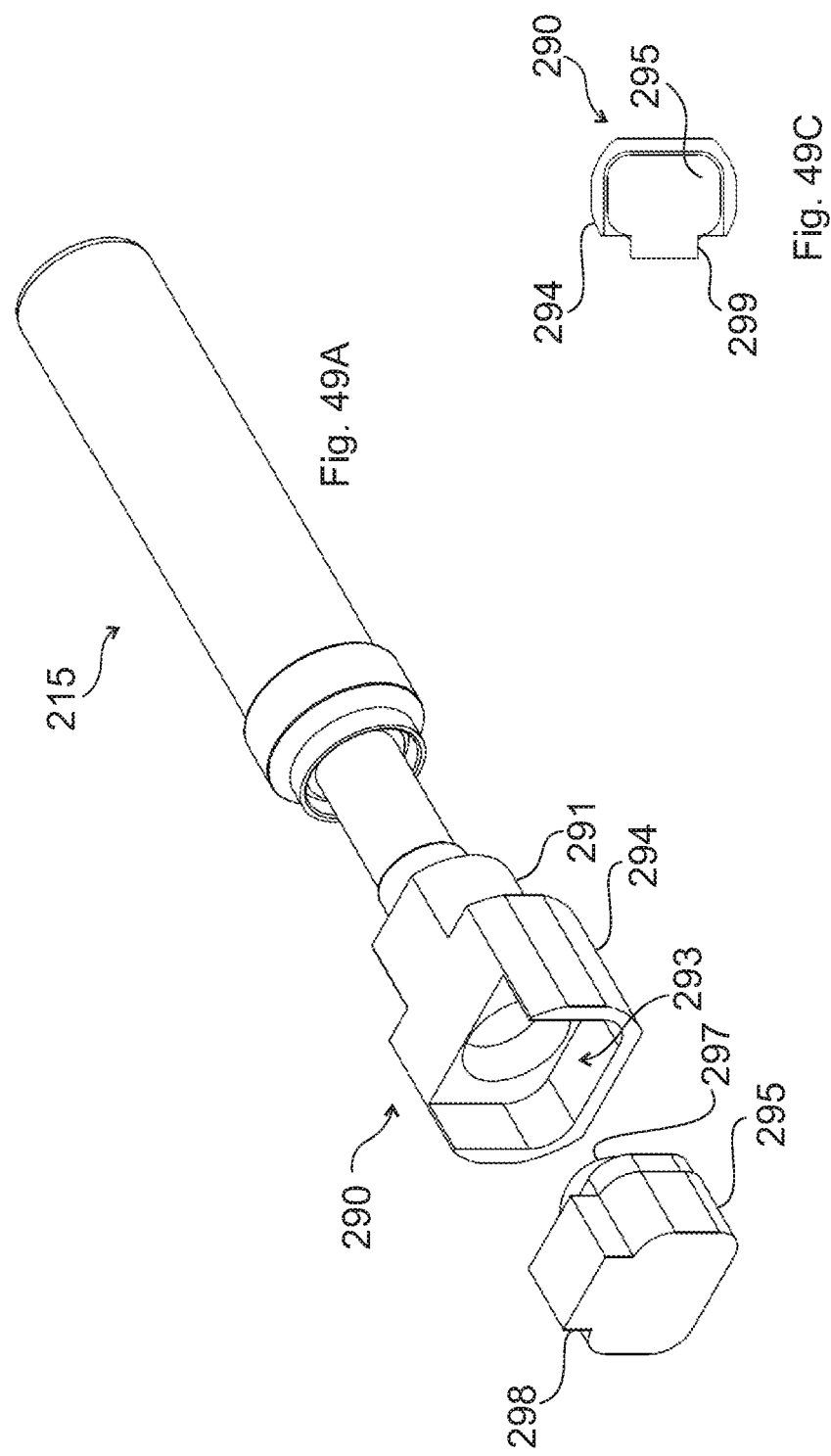

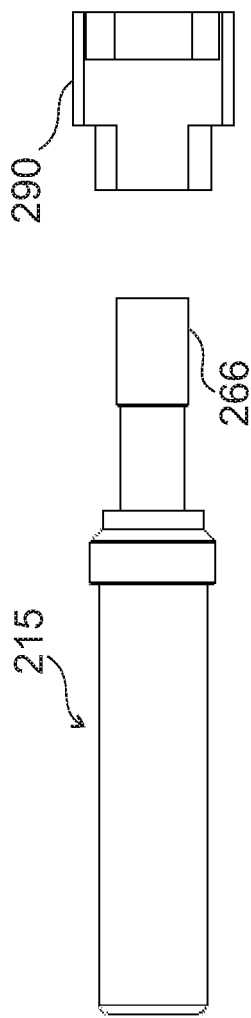
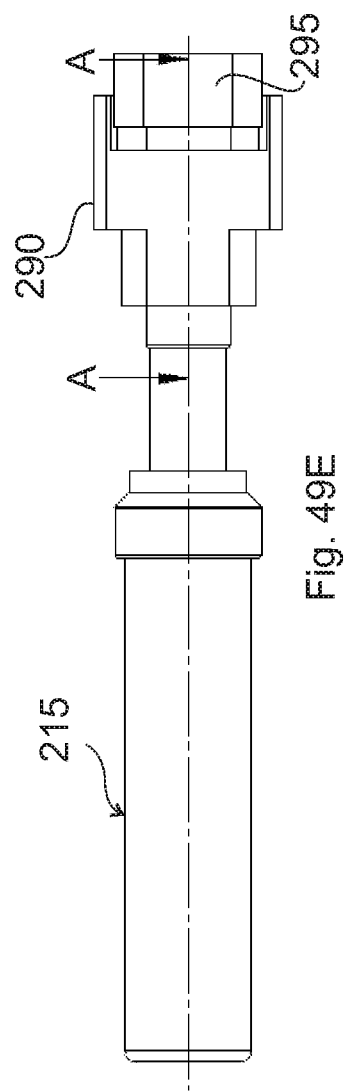
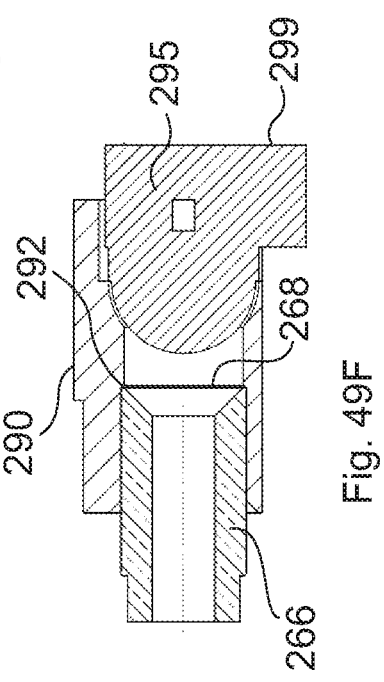
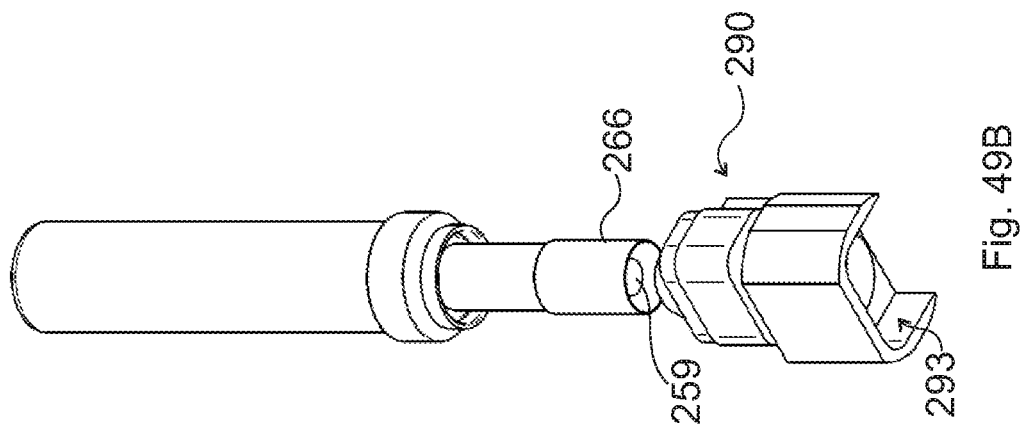
Fig. 49D
Fig. 49E
Fig. 49F
Fig. 49B

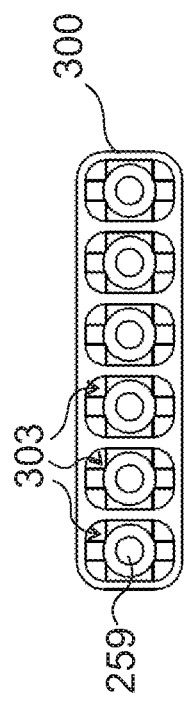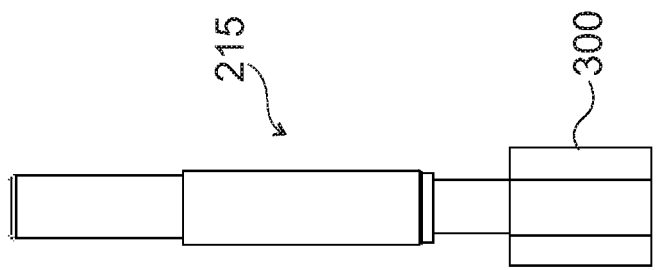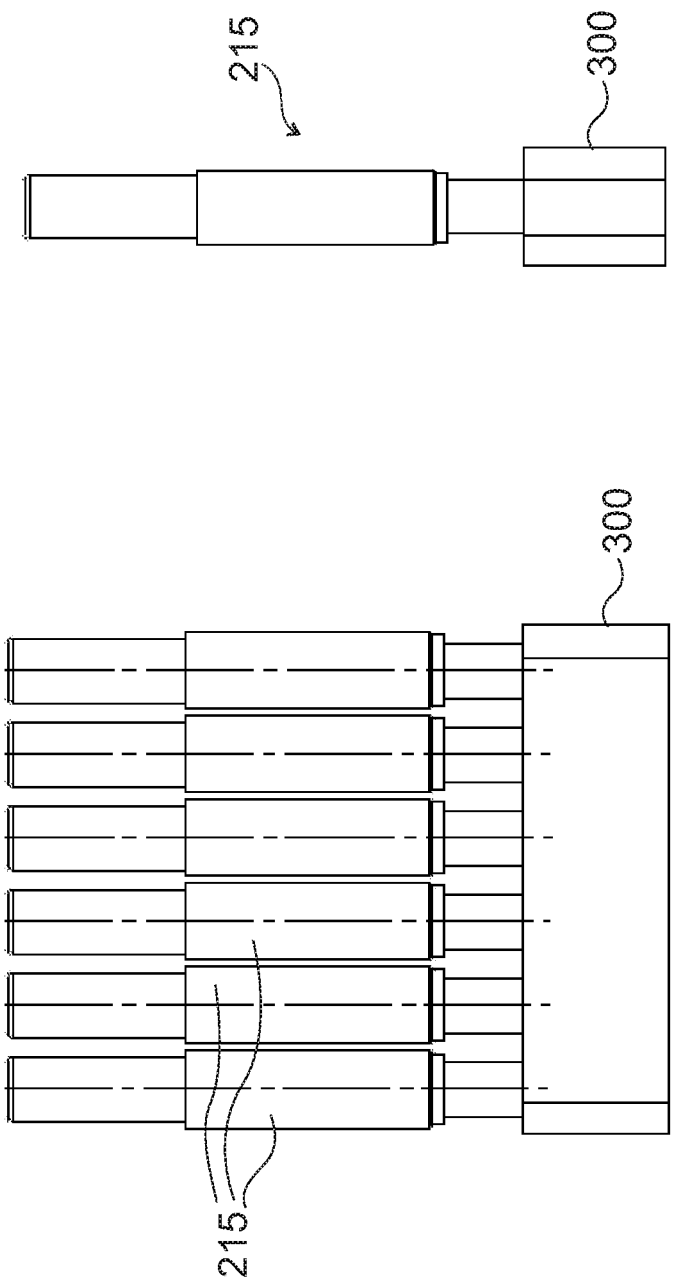

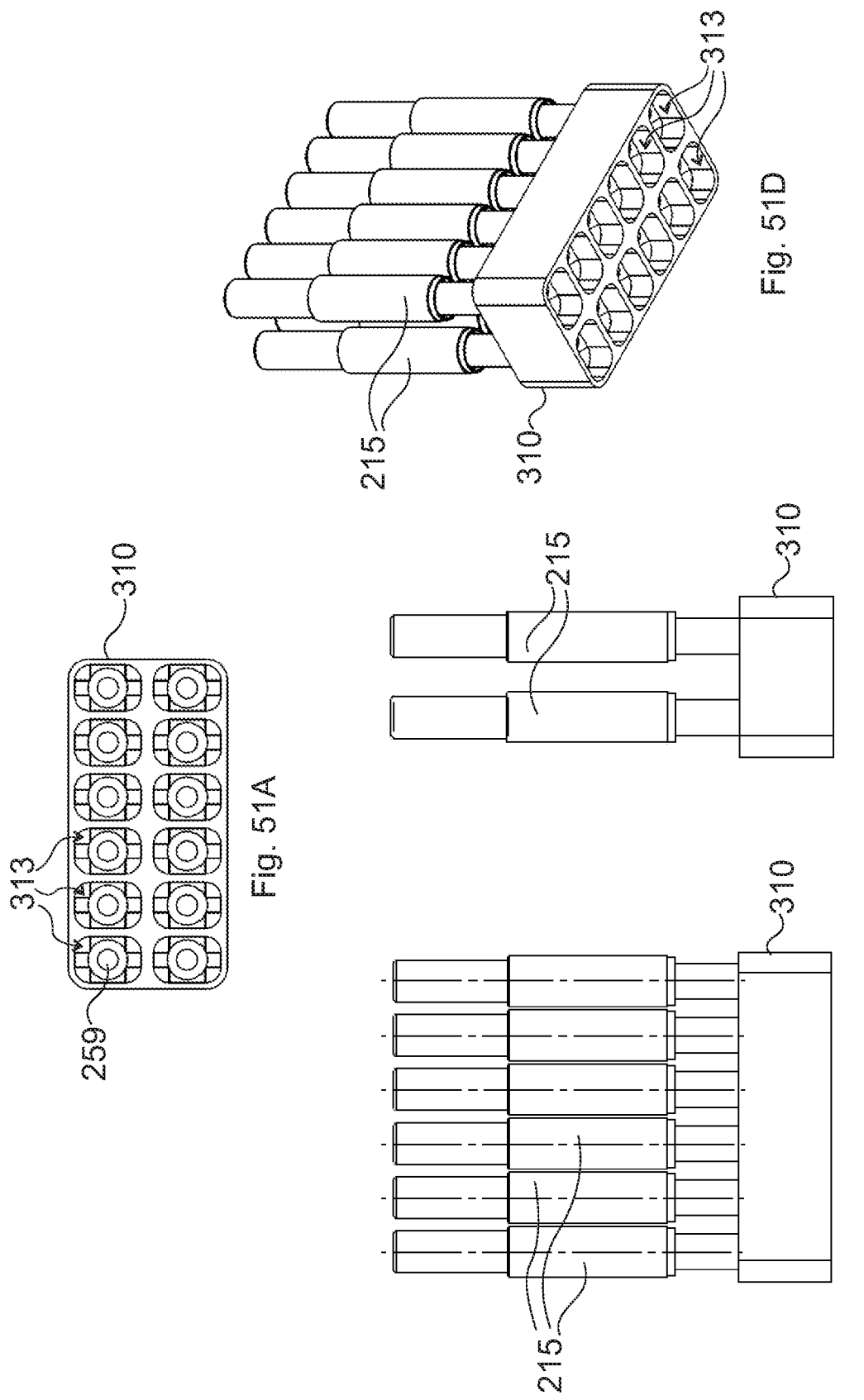

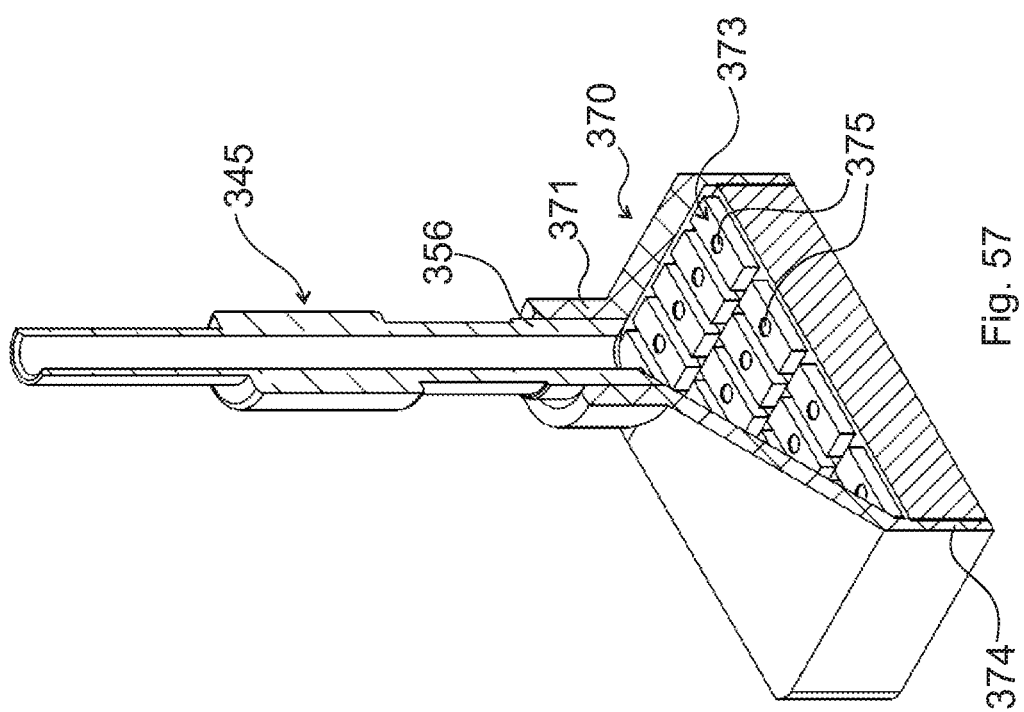

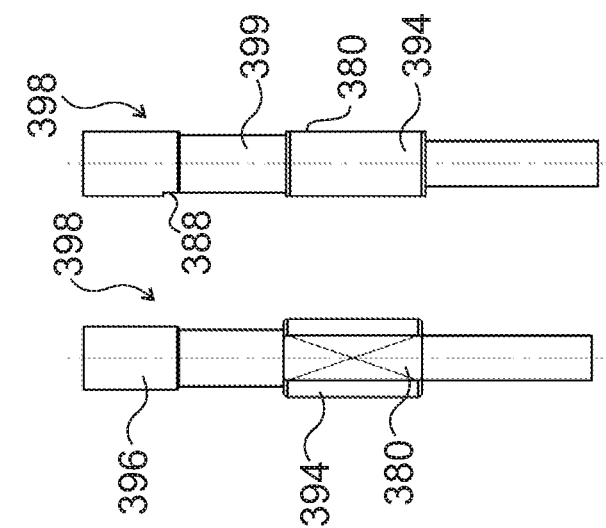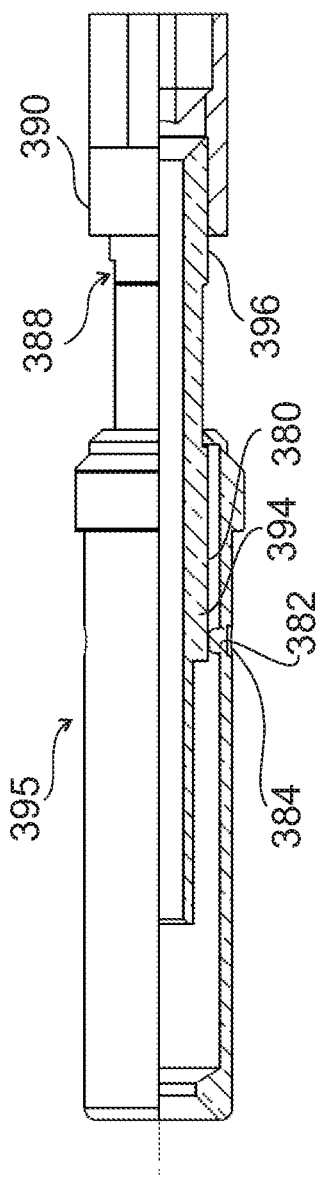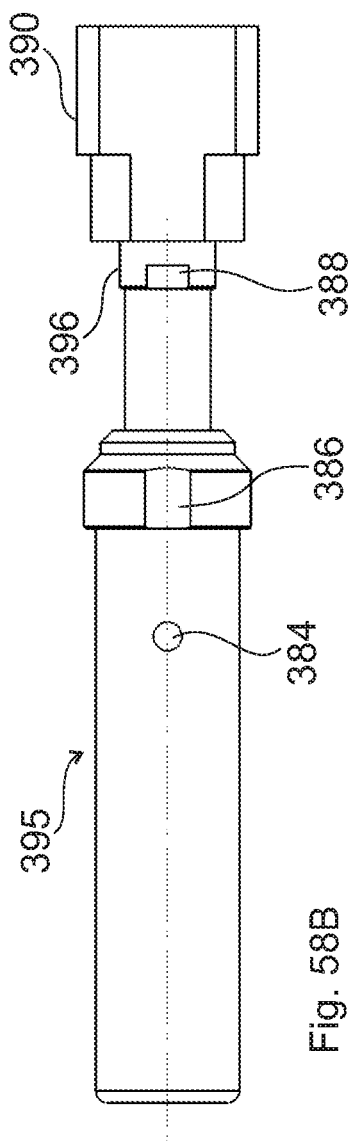

CONNECTOR STRUCTURE FOR CONNECTING OPTICAL CONDUITS, CRIMPING DEVICE AND PUSH-OUT DEVICE THEREFOR, AND LIGHT BLOCKING ELEMENT FOR A CONNECTOR PART

This application claims priority, under Section 371 and/or as a continuation under Section 120, to PCT/HU2019/000035, filed Nov. 8, 2019, which claims priority to Hungarian Application No. P1800439, filed Dec. 20, 2018.

TECHNICAL FIELD

The invention relates to a connector structure for connecting optical conduits (e.g. optical cables), particularly to a connector structure that is also suitable for testing applications, to a crimping device adapted for securing an optical conduit in a connector part of a connector structure and to a push-out device adapted for removing an optical conduit from a connector part, as well as to a light blocking element for a connector part.

BACKGROUND ART

Signal transmission applying optical conduits (optical cables) have dynamically become widely applied recently. However, the connection of such conduits (cables) poses a number of problems, for example, difficulties related to cancelling the effects of external light. In view of this, a number of approaches are known for connecting optical conduits. Generally speaking, it can be maintained that the connectors of optical conduits, i.e. the contact between the ends of the two optical conduits (fixed, permanent contacts) are provided such that the ends of the optical conduits are precisely led to each other by means of one or more guide elements, and also such that covers or cover structures encompassing the contact point can provide as secure a light blocking as possible.

Such connector structures are disclosed in U.S. Pat. Nos. 4,015,894, 4,799,759, 5,563,978, 5,619,610, US 2008/050072 A1, and SU 1677687 A1. A major drawback of these connector structures is their complex configuration, which makes these exceedingly cumbersome for testing purposes. A connector arrangement with a similar guiding and housing arrangement is disclosed in U.S. Pat. No. 5,247,595.

An arrangement for guiding an optical conduit is disclosed in US 2003/0081912 A1. The guiding arrangement provides proper arrangement of the optical conduit to a laser diode, i.e. in this approach the connection of two optical conduits is not disclosed.

A conical guiding and a corresponding conical end insertable therein are disclosed in DE 198 07 596 C2. Due to the contact between the conical surfaces, the approach according to the document is exceedingly sensitive to the proper coaxial alignment of the optical conduits to be connected. A related disadvantage of this configuration is that in order to filter out external light, the contacting ends have mutually closely-positioned covers which, in case the coaxial alignment is broken in some way (i.e. one of the optical conduits is tilted from the mutual axis), abut against each other and also keep the contact surfaces distanced from each other. Furthermore, in this approach the contact between the ends of the optical fibres is provided such that one of the fibres is pressed inwards by the other to achieve light blocking. This is also disadvantageous because it causes increased wear and tear of the optical fibres.

The connector structure disclosed in U.S. Pat. No. 4,738,055 is also based on applying conical contact surfaces. In this approach, also other guiding is typically applied, which also contributes to cancelling external light. Still, due to the conical contact surfaces, the breaking of coaxial alignment results in the deterioration of the contact also in this approach. In DT 25 08 488 A1 such board-type connector structures are disclosed wherein receiving portions with a frustoconical shape are applied. In this approach, the alignment of the contacting optical fibre ends is facilitated by applying alignment pins, so the arrangement requires very precise implementation.

An approach based on a connector part with a spherical end is disclosed in U.S. Pat. No. 4,861,132, which is structurally adapted for providing the coaxial alignment of the connector parts to be connected.

A common disadvantage of the above cited approaches is that they are not, or poorly suited to be applied for making test connections (for example test connector boards), or their application for such purposes is cumbersome.

In view of the known approaches, there is a demand for connector structures that provide for the connection of two optical conduits in a manner that is more effective compared to known connector structure (connector arrangements), and are explicitly suitable for making test connections. There is a demand also for crimping and push-out devices that are preferably adapted for securing optical conduits to be connected to connector parts—optionally, into connector parts provided with optical conduits to be replaced—and for pushing out the conduits therefrom. Furthermore, there is a demand also for a solution that is adapted for effectively fitting optical conduits to light sources arranged on a printed circuit board.

DESCRIPTION OF THE INVENTION

The primary object of the invention is to provide a connector structure, crimping device and push-out device which are free of the disadvantages of prior art approaches to the greatest possible extent.

A further object of the invention is to provide a connector structure that fulfils the above described needs, i.e. to provide a connector structure that solves the problem of connecting two optical conduits more effectively (e.g. with applying a simpler configuration) compared to the known connector structures. Further, it is also an object of the invention to provide a crimping device and push-out device that are adapted for effectively securing the optical conduit in the corresponding connector part of the connector structure and for removing it therefrom.

A still further object of the invention is to provide a connector structure that is not very sensitive to the connected optical conduits not being coaxial, i.e. to the breaking of coaxial alignment, and is thus explicitly suitable for making test connections. A further object of the invention is to provide a crimping device and push-out device for the connector structure for securing (fixing) the optical conduit in the connector structure, and for removing it therefrom in a preferred manner.

A further object of the invention by the help of the light blocking element is to address the need for a solution that is adapted for effectively fitting optical conduits to light sources arranged on a printed circuit board.

The objects of the invention can be achieved by the connector structure, the crimping device, the push-out device, and the light blocking element described herein. Preferred embodiments of the invention are defined in the dependent claims.

BRIEF DESCRIPTION OF THE DRAWINGS

Preferred embodiments of the invention are described below by way of example with reference to the following drawings, where FIG. 8 is a side view illustrating the embodiment of FIG. 1 in the separated state of the connector parts, FIG. 9 is a sectional side view taken along a section A-A of FIG. 8, illustrating the embodiment of FIG. 1 in the separated state of the connector parts, FIG. 13 is a side view illustrating the second connector part of the embodiment of FIG. 1, also showing internal structural components, FIG. 14 is a side view illustrating the second connector part of the embodiment of FIG. 1, FIG. 15 is a sectional side view taken along a section A-A of FIG. 14, illustrating the second connector part of the embodiment of FIG. 1, FIGS. 17A-17D show various views illustrating a state of a group of connector structures according to an embodiment of the invention inserted into connector boards, FIG. 20A is a sectional view taken along a section A-A of FIG. 21, illustrating the crimping indentations in the embodiment of FIG. 1, FIG. 20B shows the encircled part in FIG. 20A, illustrating the crimping indentations on the second connector part, FIG. 21 is a spatial drawing illustrating the crimping indentations in the embodiment of FIG. 1, FIG. 22A is a drawing showing partially exploded view that illustrates the first connector part in a further connector insert, FIG. 22B is a magnified view showing the encircled detail of FIG. 22A, FIG. 23 is a spatial drawing of the connector insert applied in the arrangement according to FIG. 22A, FIG. 26 is a sectional drawing taken along a C-C section of FIG. 27, showing the embodiment of the crimping device shown in FIG. 24 in a closed state, FIG. 27 is a top view drawing showing the embodiment of the crimping device illustrated in FIG. 24 in a closed state, FIG. 28A is a partial sectional drawing illustrating the embodiment of the crimping device shown in FIG. 24, FIG. 28B shows a view of the detail of FIG. 28A near the support element, FIG. 29 shows the embodiment of the crimping device illustrated in FIG. 24 in a state wherein it has been closed applying the lever, FIG. 30A illustrates the closed state of the embodiment of the crimping device shown in FIG. 24, showing the first connector part, FIG. 30B is a magnified drawing showing the encircled detail of FIG. 30A.

FIG. 38 is an overview drawing of the embodiment shown in FIG. 37, FIG. 39 is a sectional view of the embodiment of FIG. 37, taken along a section F-F of FIG. 38, FIG. 42A shows, in a sectional view (taken along a section B-B of FIG. 43), the arrangement of FIG. 40 in such a state wherein the first connector part is placed onto the push-out device and the push-out pin is in a pushed-out state, FIG. 42B is a magnified drawing showing the encircled detail of FIG. 42A, illustrating the push-out process of the push-out pin, FIG. 43 shows in a spatial drawing the arrangement of FIG. 42A, FIG. 44A illustrates an arrangement in a spatial drawing that also indicates schematically respective embodiments of the connector structure according to the invention and the light blocking element according to the invention, FIG. 44B illustrates the embodiment of the light blocking element shown in 44A attached to the connector part, FIG. 44C illustrates in a magnified view the encircled detail of FIG. 44B, i.e. an embodiment of the light blocking element, FIGS. 45A-45H, respectively, show in spatial drawings an embodiment of the light blocking element according to the invention connected to the connector part with a corresponding LED, being removed from the connector part and with the LED being arranged in the light source receiving space part, in an underside view with the LED being arranged in the light source receiving space part, in an underside view without the arrangement of a LED, in a side view separated from the connector part, in a side view connected to the connector part, and in a sectional view connected to the connector part with and without a LED, FIGS. 45I-45K, respectively, illustrate in a side view, in a top view, and in a spatial drawing, a LED applicable with the embodiment illustrated in FIGS. 45A-45H, FIGS. 46A-46H, respectively, show in spatial drawings a further embodiment of the light blocking element according to the invention connected to the connector part with a corresponding LED, being removed from the connector part in an underside view with the LED being arranged in the light source receiving space part, in an underside view without a LED, in a side view separated from the connector part, in a side view connected to the connector part, and in a sectional view connected to the connector part with and without a LED, FIGS. 46I-46K, respectively, illustrate in a side view, in a top view, and in a spatial drawing, a LED applicable with the embodiment illustrated in FIGS. 46A-46H, FIGS. 47A-47F, respectively, show in spatial drawings a still further embodiment of the light blocking element according to the invention connected to the connector part with the corresponding LED, being removed from the connector part in an underside view without a LED, in a side view separated from the connector part, in a side view connected to the connector part, and in a sectional view connected to the connector part with a LED, FIGS. 47I-47K, respectively, illustrate in a side view, in a top view, and in a spatial drawing, a LED applicable with the embodiment illustrated in FIGS. 47A-47H, FIGS. 48A-48G, respectively, show in spatial drawings an embodiment of the light blocking element according to the invention connected to the connector part with the corresponding LED, being removed from the connector part with the LED, in an underside view without a LED, in an underside view with the LED being arranged in the light source receiving space part, in a side view separated from the connector part, in a side view connected to the connector part, and in a sectional view connected to the connector part with a LED, FIGS. 49A-49F, respectively, show in spatial drawings a further embodiment of the light blocking element according to the invention connected to the connector part with the corresponding LED, being removed from the connector part with the LED, in an underside view with the LED being arranged in the light source receiving space part, in a side view separated from the connector part, in a side view connected to the connector part, and in a sectional view connected to the connector part with a LED, FIGS. 50A-50C, respectively, illustrate in an underside and two different side views an embodiment of the light blocking element according to the invention that is applicable with multiple LEDs arranged in a row and the corresponding connector parts, FIGS. 51A-51D, respectively, illustrate in an underside view, two different side views, and a spatial drawing a further embodiment of the light blocking element according to the invention that is applicable with multiple LEDs arranged in two rows and the corresponding connector parts, FIGS. 55-57 illustrate, in spatial sectional drawings, embodiments comprising light source receiving space parts adapted for receiving multiple lights sources FIGS. 58A-58D illustrate an embodiment wherein the relative orientation of the head unit and the connector housing element can be provided, and FIGS. 59A-59B, respectively, show an embodiment in spatial and top view.

MODES FOR CARRYING OUT THE INVENTION

The connector structure (connection structure, connector mechanism, connector construction; connector arrangement) according to the invention is adapted for connecting optical conduits (e.g. optical cables, optical fibres)—to each other. By connecting optical conduits, it is meant that the conduits are brought into proximity such that the optical signal is transmitted over the mutually facing ends of the optical conduits connected to each other. In case of being connected by the connector structure, the optical conduits are therefore preferably not brought into physical contact, but their optical connection to each other is performed.

The optical conduit may be an optical cable (an insulating coating encompassing the light-conducting fibre) or an optical fibre, with a single or multiple core. As an example, an optical cable (a first optical cable 10 and a second optical cable 12 connected into the two parts of the connector structure) is illustrated in the figures, the cable being preferably secured in the connector parts by means of crimping; crimping is pressed into the jacket of the cable. If the optical conduit does not have a jacket, i.e. it is an optical fibre, crimping is still preferably applied. The degree of crimping can expediently be adjusted, as with the crimping devices illustrated below. Crimping allows for gripping the fibre to an extent that it cannot be displaced but is not yet damaged by the deformation of the material. According to another solution, a jacket (cover) may be arranged along the section of the optical fibre that is received in the connector part.

Figure 1:
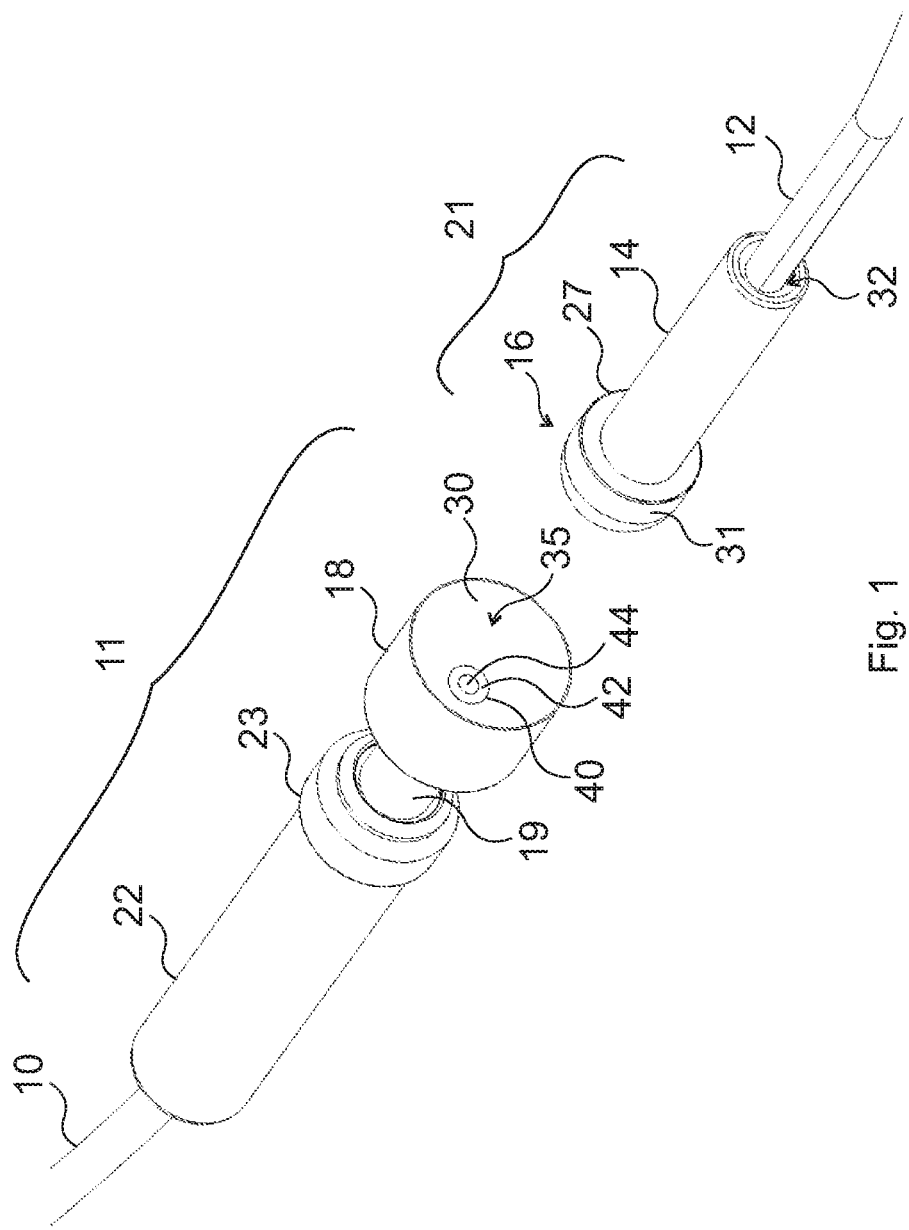
FIG. 1 is a spatial drawing illustrating an embodiment of the connector structure according to the invention.

An embodiment of the connector structure is shown in FIG. 1. In this embodiment the connector structure comprises a first connector part 11 (connection/connecting part/portion; adapted for clamping and connecting to the connector structure a first optical cable 10; in general the first connector part is adapted for this in relation to a first optical conduit) and a second connector part 21 (adapted for clamping and connecting a second optical cable 12; in general the second connector part is adapted for this in relation to a second optical conduit) connectible (fittable) to each other. The connector parts can also be termed connector terminals, optical connector parts or optical connection parts.

Figure 4:
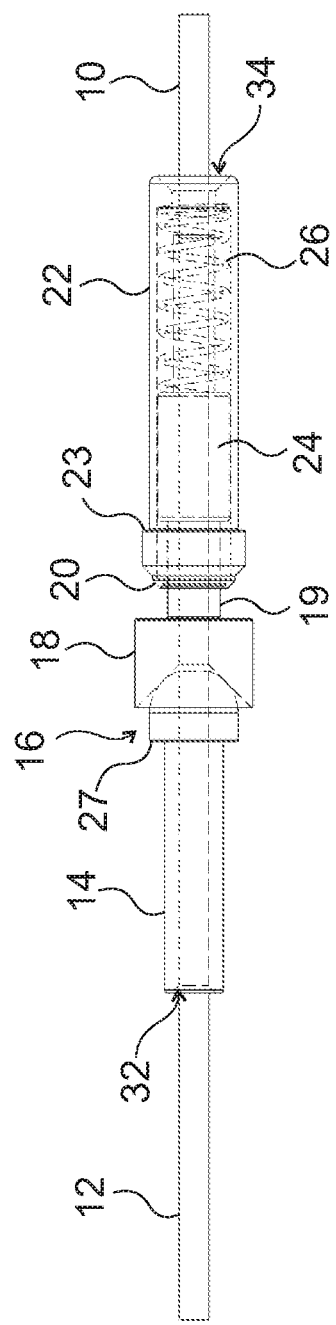
FIG. 4 is a side view illustrating the embodiment of FIG. 1 in the connected state of the connector parts, also showing internal structural components.
Figure 6:
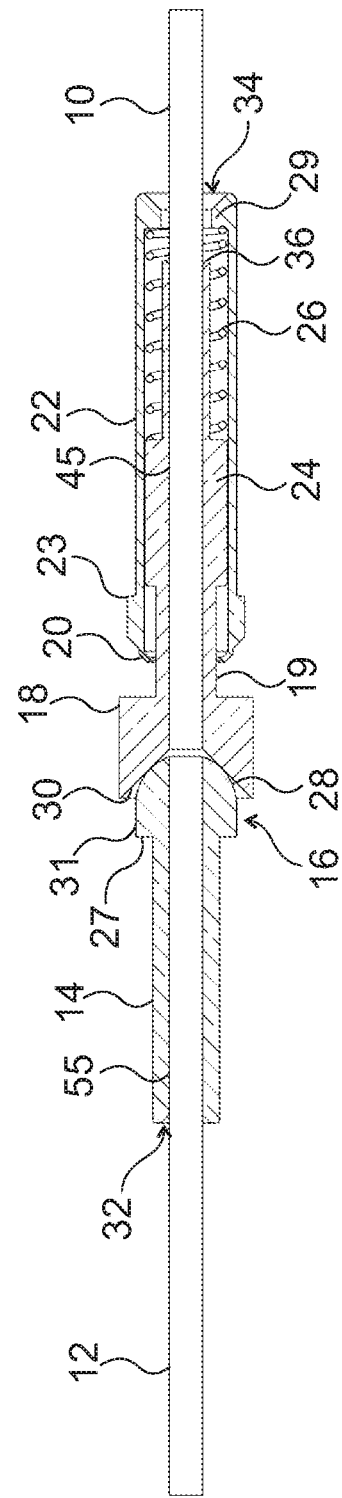
FIG. 6 is a sectional side view taken along a section A-A of FIG. 5, illustrating the embodiment of FIG. 1 in the connected state of the connector parts.
Figure 12:
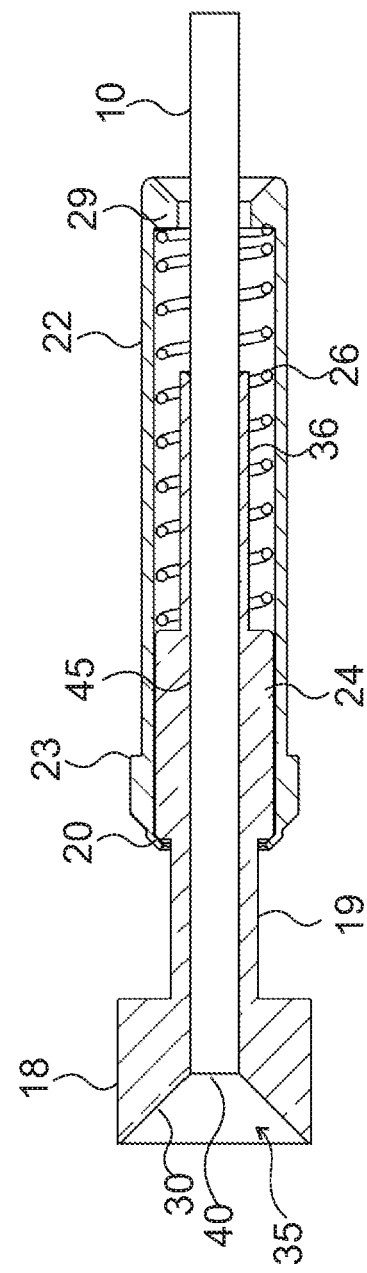
FIG. 12 is a sectional side view taken along a section A-A of FIG. 12, illustrating the first connector part of the embodiment of FIG. 1.

In the embodiment according to FIG. 1, the first connector part 11 comprises a first head unit comprising a first head portion 18 at its first end, a (first) widened portion 24 (broadened portion), and a stem 19 interconnecting the first head portion 18 and the widened portion 24 and providing (ensuring) that the first head portion 18 and the widened portion 24 move together in case of a displacement of the head unit, and a conical receiving space part 35 having a conical side wall 30 and widening (being configured to widen) in the direction of the end portion of the first head portion 18 situated (lying) opposite the connection thereof to the stem 19 is formed in the first head portion 18, a connector housing element 22 having a third end and a fourth end opposite the third end, and the connector housing element 22 receives the first widened portion 24 at the third end and retains it in its inner space by means of a first inward extending edge portion 20 (inward projecting flange portion) formed at the third end and arranged around the stem 19, and a (first) resilient element 26 arranged in the inner space of the connector housing element 22, supported against the widened portion 24 and against a second inward extending edge portion 29 formed at the fourth end of the connector housing element 22 (the edge portions 20, 29 are shown in FIG. 4), and a first conduit channel interconnecting the fourth end of the connector housing element 22 and an end portion of the conical receiving space part 35 being at the stem 19 (i.e. the portion of the conical region toward which it is narrowing and which faces the widened portion 24, the conduit channel opening into this portion), encompassed by the first resilient element 26, and adapted for arranging a first optical conduit is formed in the first connector part 11 (in the illustrated embodiments a first conduit channel 45 and a first optical cable 10 arranged therein are shown, see for example in FIGS. 6 and 12). The conduit channel can also be termed simply a channel or, corresponding to the type of conduit it receives, a cable channel or a channel for an optical fibre. The channels shown in the drawings are called conduit channels 45 and 55, with optical cables 10, 12 being received in them; this terminology is appropriate because optical cables are a type of optical conduit.

The widened portion 24 may be formed at the second end of the head unit, or—as it is illustrated in the figures, particularly in FIGS. 6 and 12—the head unit can also be terminated in a guide portion 36. According to this configuration, the head unit can be typically moved forward and backward inside the connector housing element 22. The stem firmly connecting the head portion 18 and the widened portion 24 provides that they are displaced together, i.e. their relative position is fixed. The configuration can also be interpreted such that a head portion 18 and a widened portion 24 are situated at both ends of the stem 19, with the stem 19 itself preferably continuing in the guide portion 36. As it is also illustrated for example in FIGS. 6 and 12, a shoulder portion is formed at the connection of the widened portion 24 and the guide portion 36, since the guide portion 36 has a lower width—measured transversely to the longitudinal axis—than the widened portion 24 (has to fit into the spatial region enclosed by the resilient element 26); and the resilient element 26 is supported against the widened portion 24 by being supported by this shoulder portion.

The first head portion 18 is mounted (fixed) to the first end of the stem 19 (the head portion 18 and the stem 19 both constitute portions of the first head unit regarded as a single component), i.e. the first head portion 18 moves together with the stem 19. The connector housing element 22 can also be termed a spring housing.

The optical conduit (for example, the optical cables 10, 12) does not necessarily form a part of the connector structure according to the invention (i.e. it is optional whether it is arranged in the first connector part); there are embodiments without an optical conduit, in which case the optical conduits can be subsequently arranged in the conduit channel adapted for receiving them. In such a case, the conduit channel is of course dimensioned taking into account the dimensions of the optical conduit to be arranged therein later (for details on the exemplary tolerances applied see further below). By arranging the conduit channel in such manner it is meant (in line with the drawings) that forming the conduit channel involves additional machining (for example, boring) in the head unit of the first connector part 11 and in the second connector part 21 (the connector housing element 22 also has to be bored out), and the components (for example the resilient element) situated between the widened portion of the head unit and the conical introduction portion 34 have to be configured such that room for the first conduit channel 45 is left free (the guide portion 36 can also be partially arranged here), that is, extending from the end of the connector housing element 22 free space is left inside the resilient element 26, and a through bore constituting the conduit channel is formed in the stem. As illustrated in the figures, the conduit channels 45 and 55 are preferably arranged in the middle—i.e. along the longitudinal axis—of the connector parts 11, 21. In the figures there is illustrated the symmetry of the components (formed circularly symmetric with respect to this longitudinal axis).

In the terminology in the field, the head unit that is supported by the resilient element and is guided inside the connector housing element is typically also called a "plunger" (piston element). The connector housing element 22 and the first head unit (and thus the head portion 18, the stem 19, and the widened portion 24) are preferably rotationally symmetric around a (longitudinal) axis. The widened portion 24 is dimensioned such that it can be displaced in the inner space of the connector housing element 22 (in the illustrated case, it is displaced along the longitudinal axis), while at the same time it is appropriately guided therein. The phrase describing the side wall 30 and the receiving space part 35 as having a conical shape widening in the direction of an end portion of the head portion 18 situated opposite the connection thereof to the stem 19 is intended to mean, in accordance with the figures, that the cone gradually opens towards the outward-facing free end portion of the head portion 18 (this obviously has to be a free end because it is the receiving space part 35 that is adapted to make the connection), i.e. it is narrowing gradually inwards from the outward-facing, free end portion.

The first conduit channel therefore connects the receiving space part 35 with the opposite end of the first connector part 11 (i.e. the fourth end of the connector housing element 22). Accordingly, the first conduit channel extends along the full length of the first connector part 11, such that, when passed in at the end of the connector part, the first optical cable 10 to be arranged therein can come out at the bottom of the conical region of the conical receiving space part 35 in the head portion 18.

The second connector part 21 has a fifth and a sixth end, and comprises, at its fifth end, a second head portion 16 having a spherical end portion 28 adapted for being circularly seated on the conical side wall 30 of the conical receiving space part 35 of the first head portion 18 of the first connector part 11 in case the first connector part 11 is connected to the second connector part 21, and a second conduit channel interconnecting the sixth end of the second connector part 21 and the spherical end portion 28 and adapted for arranging a second optical conduit is formed in the second connector part (in the illustrated embodiments a second conduit channel 55 and a second optical cable 12 arranged therein are shown, see for example in FIGS. 6 and 15). As it was described in detail in relation to the optical cable 10, the optical cable 12 does not necessarily form a part of the connector structure according to the invention.

The optical cables 10, 12 (in general: optical conduits) get typically stuck in the conduit channels 45, 55 after the crimping operation, i.e. as long as they are not secured therein by crimping, the optical cables 10, 12 can be typically displaced in the conduit channels 45, 55 (to provide for that—i.e. that the conduit can be freely moved inside the channel—the channel and the conduit are formed with a tolerance compared to each other, these tolerances ensure that the inside diameter of the conduit channel is a bit larger than the outside diameter of the conduit).

To provide for a circular seatibility of the spherical end portion 28, the conical receiving space part 35 of the first head portion 18 and the spherical end portion 28 of the head portion 16 have to be dimensioned appropriately (the requirement of appropriate dimensioning is laid down by the above definition). Complete light blocking can be achieved inside the portion of the conical receiving space part 35 that is closed off by the spherical end portion 28 by ensuring circular seating during connection. Thanks to the fitting (encounter) of conical and spherical surfaces, light blocking is maintained even when the longitudinal axis of the first connector part 11 and the longitudinal axis of the second connector part 21 become slightly misaligned by tilting, i.e. the configuration is fault-tolerant with respect to the circumstances occurring during connector tests. The (spherical cap-shaped) portion of the spherical end portion where the conduit channel joins the end portion is of course missing therefrom (the conduit channel is not closed off by material). Therefore, the spherical cap corresponding to the opening is cut off from the spherical end portion along the plane of the opening. In the example illustrated in the figures, the spherical end portion 28 has a hemispherical shape from which a spherical cap-shaped portion corresponding to the conduit channel adapted for receiving the optical cable 12 is cut out, i.e. the effective shape of the spherical end portion 28 is a spherical zone (a shape cut out from a sphere by two parallel planes; in this case one of the planes is the halving plane of the sphere). The spherical end portion could also have a different spherical zone, i.e. one that has one of its section planes situated closer to the section plane of the spherical cap than the median plane.

When operating the connector structure, an optical cable 10 is secured in the first (spring) connector part 11, the cable always remaining in the same position with respect to the stem 19 thereof (i.e. relative to the first head unit). The first head portion 18 connected to the stem 19 has a(n inverted) conical configuration (it can be called inverted conical because the receiving portion has a conical shape that from the aspect of the head portion 18 is an inverted conical shape, i.e. it narrows from the outer portion of the head portion 18 towards its inner portions). It is connected to the spherical-end contact surface constituted by the second connector part 21 by the help of this inverted cone. The fitting (contact) between the spherical and inverted conical shapes (i.e. between the spherical end portion and the conical receiving space part) prevents external light from entering the region encompassed by them. Thanks to the inclusion of the resilient element 26 (see for example FIG. 4), the stem 19 is to a small extent self-aligning, which can correct occasional assembly inaccuracies.

The two optical conduits (e.g. optical cable or optical fibre) connected applying the first and second connector parts are capable to transmit light towards the instrument (for example, during a test, the light of a LED towards a testing instrument) in an undisturbed manner. Thanks to the preferably common-axial connection or contacting of the spherical end portion 28 and the conical receiving space part 35 (i.e. the longitudinal axes—in the illustrated example, the axes of symmetry—of the first connector part and the second connector part coincide) the mutually facing ends of the optical conduits connected into the first and second connector parts always assume the same, reproducible position, i.e. they are always at the same distance from each other.

To provide protection against mechanical effects, an optical cable (fibre) provided with a cover—or in an alternative term, a jacket—can be applied, but it is not required to apply a jacket. The optical conduit applied for the invention can for example also be a "naked" optical fibre. Thanks to the application of the jacket, the fibre can be secured in the first and second connector part (in a pin and contact) mechanically, without damaging the optical fibre. Optical cables having a jacket can be secured in the pin and contact even by means of crimping, for example applying the crimping device according to the invention disclosed below.

In the approach described in DE 198 07 596 C2, mentioned in the introduction, two separate springs are applied for controlling the connection. This dual-spring configuration is disadvantageous because the two springs have to operate in a coordinated manner. If their coordination to each other is not appropriate, it may happen that it is not possible to satisfactorily push out the conduit end from the conical receiving portion utilizing the other portion. So, such a situation may occur according to the known approach, wherein a contact is made between the optical conduits, but without providing proper light blocking.

In a very disadvantageous manner, in DE 198 07 596 C2 the optical conduit is displaced with respect to the conical receiving portion during the interconnection of the connector parts, which can cause increased wear and tear of the optical conduit. Conversely, in the invention the optical conduit connected to the connector part does not move (likewise, the head portion 18, the stem 19—and the widened portion 24 thereon—also do not move relative to each other), i.e. when an optical conduit is connected, the optical conduit is arranged fixedly (in a stationary manner) relative to the conical receiving space part. According to the invention, only those components undergo a relative displacement (for example, the widened portion 24 inside the connector housing element 22) and come into contact with each other—typically resulting in friction—that are more resistant to damage and wear and tear.

The approach of DE 198 07 596 C2 is based on the idea that during the connection process the optical conduits to be connected contact each other (are pressed against each other). In contrast to that, in the invention the optical conduits to be connected preferably do not come into contact (do not touch each other) when connected, but are kept at a certain distance from each other; the advantages of not coming into contact will be discussed later on.

In the invention a single resilient element is applied, which is advantageous compared to the configuration of DE 198 07 596 C2 with more springs. According to DE 198 07 596 C2, the spring adapted for pushing the end of the optical conduit out into the conical receiving portion continually urges the end of the conduit outward also when connected. In case it can displace the contact even to the smallest extent, light blocking will be deteriorated. In contrast to that, the spring mechanism according to the invention is adapted for maintaining the connection contact. Related to that, in the technical solution according to the invention no spring force has to be overcome when making the connection (i.e. when fitting together the connector parts; this is in contrast to the approach of DE 198 07 596 C2, wherein in order to achieve light blocking, first the spring adapted to push out the conduit end has to be compressed), which means that only the conical and spherical ends of the connector parts have to be fit together to make the connection.

The connector structure according to the invention also tolerates better (while maintaining light blocking) the breaking of axis alignment (i.e. when the second connector part is tilted) compared to the approach of DE 198 07 596 C2. This is facilitated by:
- a contact (a join) between the conical and spherical portions, because the circular light-blocking contact line is preserved at the contact of the spherical end portion and the conical receiving space part even in case any of the connector parts gets tilted, i.e. the spherical end portion gets slightly tilted relative to the conical region, as a circular light blocking is achieved even in such a case, and
- the configuration of the elongated body 14 of the second connector part, which is narrower than the spherical end portion 28, such that it does not prevent the typically occurring smaller-extent tilts and would only abut against the edge of the conical receiving space part in case the connector part was tilted to a greater degree. The characteristic diameter of the spherical end portion is smaller than the diameter of the circle situated at the end point of the conical receiving space part (when tilted extremely, the body 14 can abut against this terminal circle), while the diameter of the body 14 of the second connector part 21 is even smaller than the characteristic diameter of the spherical end portion.

According to the invention, the first connector part 11 comprising a conical receiving space part 35 has simpler configuration than the technical approach according to DE 198 07 596 C2 that comprises a number of different components, since it comprises (preferably, consists of) a stem fitted with an appropriate head portion and a widened portion, a resilient element, and a housing element adapted for receiving the resilient element and the widened portion.

Although in an embodiment the approach disclosed in U.S. Pat. No. 4,861,132 has a conical portion, this conical portion is not adapted for providing a circular seating of the spherical end, but rather for urging/guiding the spherical portion into the guide channel (in this approach, this component ensures the coaxial alignment of the connector parts). Therefore, it has an entirely different function.

Disadvantageously, in comparison with the invention, in the approach of U.S. Pat. No. 4,861,132—due to structural reasons stemming from applying a guide channel—the breaking of coaxial alignment is not allowed (on the contrary, it is the goal to always maintain it); due to allowing a slide-in contact, light blocking is not ensured either at the conical portion or at the guide channel, while self-alignment is also missing because of the lack of a resilient element.

In FIG. 1, thus, an embodiment of the connector structure according to the invention is shown in a spatial drawing. In the figure, the connector arrangement is rotated such that the first connector part 11 is shown from the direction of its head portion 18, while the second connector part 21 is shown slightly from the rear. FIG. 1 illustrates that the first optical cable 10 leading to the first connector part 11, as well as the second optical cable 12 leading to the second connector part 21 may be led to the connector parts 11, 21 by bending it arbitrarily.

In FIG. 1 the connector housing element 22 of the first connector part 11 are shown, and also the first shoulder portion 23 formed thereon (the latter can be utilized when the connector housing element 22 of the connector part 11 is clamped). As shown in FIG. 1, in this embodiment the head portion 18 projects out from the connector housing element 22; a stem 19 is connected to the head portion 18 at its end facing the connector housing element 22, with the widened portion 24 of the stem 19 being received by the connector housing element 22 (the internal configuration of the connector housing element 22 is presented in further drawings; see for example FIG. 4). In FIG. 1 a second shoulder portion 27 formed on the head portion 16 of the second connector part 21 is shown, which is adapted for clamping the second connector part 21. Clamping (grabbing) is performed applying such portions of the connector housing element 22 and the second connector part 21 that are narrower than the shoulder portions 23, 27 (i.e. the portions situated opposite the head portions 16, 18), typically the regions immediately adjacent to the shoulder portions 23, 27.

In this embodiment, therefore, the connector structure comprises a first shoulder portion 23 arranged on the outside wall of the connector housing element 22 of the first connector part 11, protruding from the longitudinal axis of the first conduit channel 45 further outward than the outside wall of the connector housing element 22—preferably circumferential —, and adapted for clamping the first connector part 11. Further, in the illustrated embodiment the second connector part 21 comprises a—preferably elongated—body 14 connected to the second head portion 16 at its end opposite the spherical end portion 28, having a smaller extension measured from the longitudinal axis of the second conduit channel 55 than the second head portion 16, and encompassing the second conduit channel 55. Thereby, due to the difference in the dimensions (measured perpendicularly to the axis) of the body 14 and the head portion 16, the second circumferential shoulder portion 27 suited for clamping the second connector part 21 is produced on the preferably oblong body of the second connector part 21 The first shoulder portion 23 and the second shoulder portion 27 can be included separately (i.e. one or the other) in the connector structure, but expediently both are included. The first shoulder portion 23 and the second shoulder portion 27 are arranged on the outside of the first connector part 11 and of the second connector part 21, respectively, and are directly adapted for clamping these parts (or alternatively, a connector insert can also be applied, see below).

In FIG. 1 the conical spatial region arranged in the head portion 18 is shown, i.e. the conical side wall 30. In FIG. 1 it can also be observed that the conical side wall 30 is widening outward from the opening into which the end of the optical cable 10 extends. The structural parts of the optical cable 10, i.e. a jacket (mantle; or a cover) 42 and a core 44 are marked at this end. In accordance with the general structure of optical fibres, a clad that encompasses the core in a cylindrical fashion and has a refractive index such that it does not let light propagating in the core out therefrom but always reflects it is also arranged between the core 44 and the jacket 42. The clad is so thin, however, that it cannot be seen in the figures. Accordingly, the component corresponding to the core 44 as marked in the figure could also correspond to the entire optical fibre arranged inside the jacket 42; they are not separately marked in FIG. 19E either. Therefore, the figures illustrating the internal structure of the optical cable are considered in the present application to show the core inside the jacket (cover) because the clad is so thin that it is invisible. However, these figures could also be considered as if the optical fibre inside the jacket was indicated by the reference numerals corresponding to the core; as far as marking (illustration) is concerned, the core and the entire optical fibre are equivalent (because the clad is not visible).

In an exemplary optical cable, the core can be made of poly(methyl methacrylate), while the material of the clad and the jacket can be fluorine-treated polymer and polyethylene, respectively. In an exemplary case, the outside diameter of the core is 0.484 mm, the outside diameter of the clad is 0.5 mm (so the clad is very thin), and that of the jacket is 1±0.07 mm. An optical cable with such dimensions is utilized in certain dimensioning examples.

A first opening 40 encompassing the optical cable 10 is also shown (the outline of the opening 40 is marked in the figure). The jacket is typically made of an electrically insulating material. When crimping is applied for securing and optical cable in a connector part, crimping forms an indentation in the jacket, thereby securing the cable.

In FIG. 1, the second connector part 21 is shown from the rear, i.e. from the conical introduction portion 32 of the second optical cable 12. As shown also in other figures (for example, in FIG. 6), the introduction portion 32 is essentially an opening that narrows inwardly (i.e. towards the interior of the connector part 21). Thus, the optical cable 12 can be introduced into the interior of the connector part 21 through the introduction portion 32 in a simple manner, as the narrowed-down portion of the introduction portion 32 provides relatively good guiding for the optical cable 12. In FIG. 1 the body 14 of the second connector part 21, as well as the second head portion 16 thereof (this latter can be observed better in FIG. 3) that has a spherical end portion are also shown.

Figure 2:
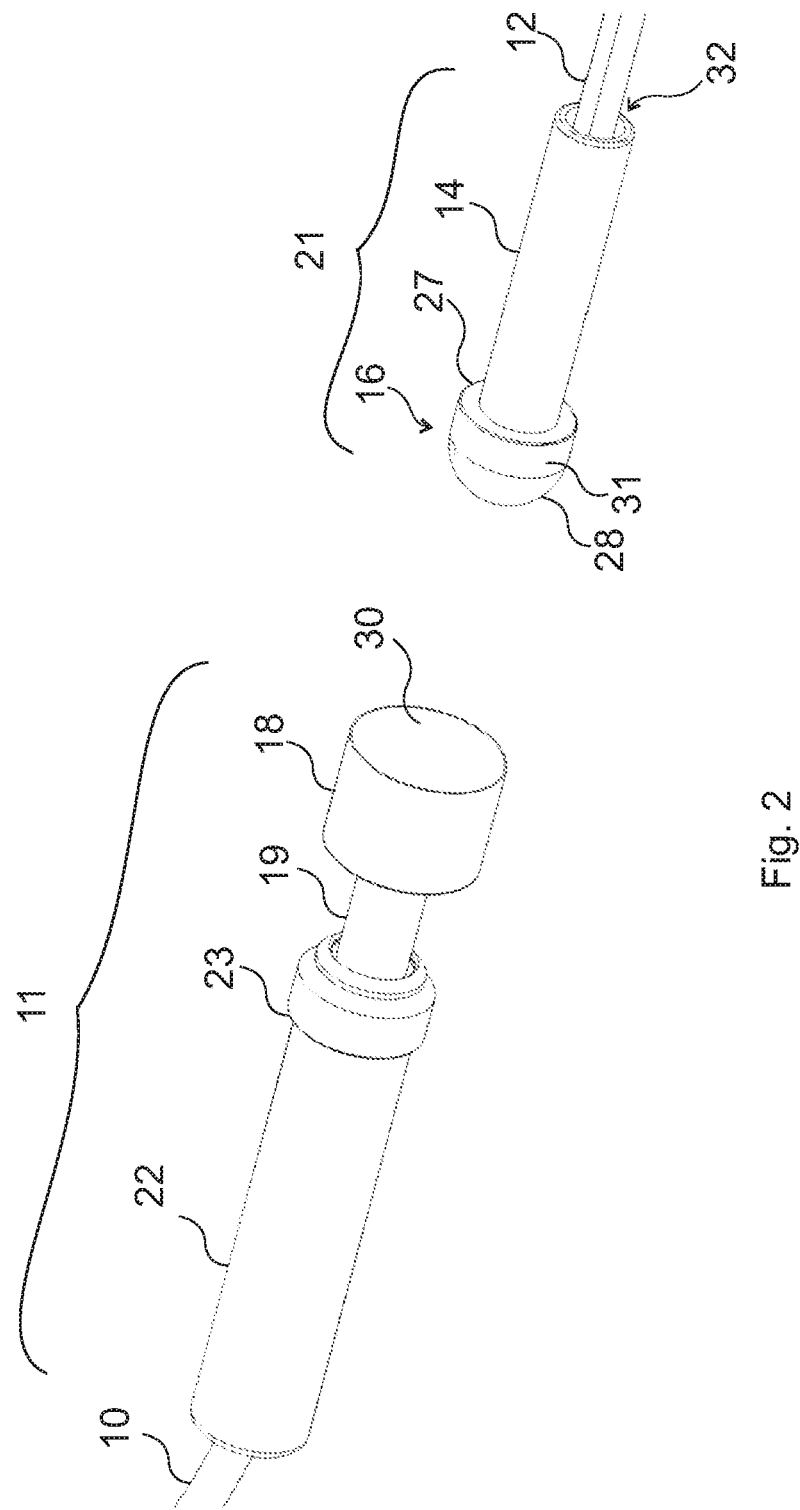
FIG. 2 is a spatial drawing illustrating the embodiment of the connector structure according to the invention shown in FIG. 1 in another view.

FIG. 2 shows the embodiment of the connector structure according to FIG. 1 at a slightly different angle, such that certain further details (in addition to FIG. 1) can be observed therein. For example, a longer portion of the stem 19 can be seen as it is introduced into the connector housing element 22. The stem 19 can be freely moved through the opening of the connector housing element 22.

In FIG. 2 the conical side wall 30 of the head portion 18 is also shown, while the innermost part of the conical region, i.e. the end of the optical cable 10, is no longer visible in FIG. 2. Also the second connector part 21 can be seen at a different angle. As it can be observed, the head portion 16 has a cylindrical portion 31 (having a constant diameter with respect to the longitudinal axis of the arrangement) at its portion extending from the shoulder portion 23 towards the end portion, and a spherical end portion 28 (in this example, a portion with a hemispherical enveloping shape) that forms a continuation of the cylindrical portion 31. As can be observed in FIG. 2, in this embodiment the diameter of the first head portion 18 comprising the conical receiving space part (measured perpendicularly to its longitudinal axis the diameter of the conical region increases up to this diameter at the end portion of the connector part) is larger than the diameter of the cylindrical portion 31 of the second head portion 16 (the spherical end portion 28 forms a continuation of this), that is, the conical region of the first head portion 18, encompassed by a conical side wall 30, is able to receive the spherical end portion 28, and light blocking is brought about between the conical side wall 30 and the spherical end portion 28, i.e. at the end portions of the optical cables 10 and 12, when the first connector part 11 and second connector part 21 are connected. That way, signal transmission between the optical cables 10 and 12 is undisturbed as no external light penetrates.

According to the above, in the above illustrated embodiment the second head portion 16 of the second connector part 21 comprises a cylindrical portion 31 being in connection with the spherical end portion 28 and has a diameter identical to the largest diameter thereof (measured) perpendicularly to its longitudinal axis. Such a configuration is preferable because that way the portion directly adjacent to the spherical end portion 28 (i.e. that forms its continuation) will not get stuck when the spherical end portion 28 is rotated inside the connection.

Figure 3:
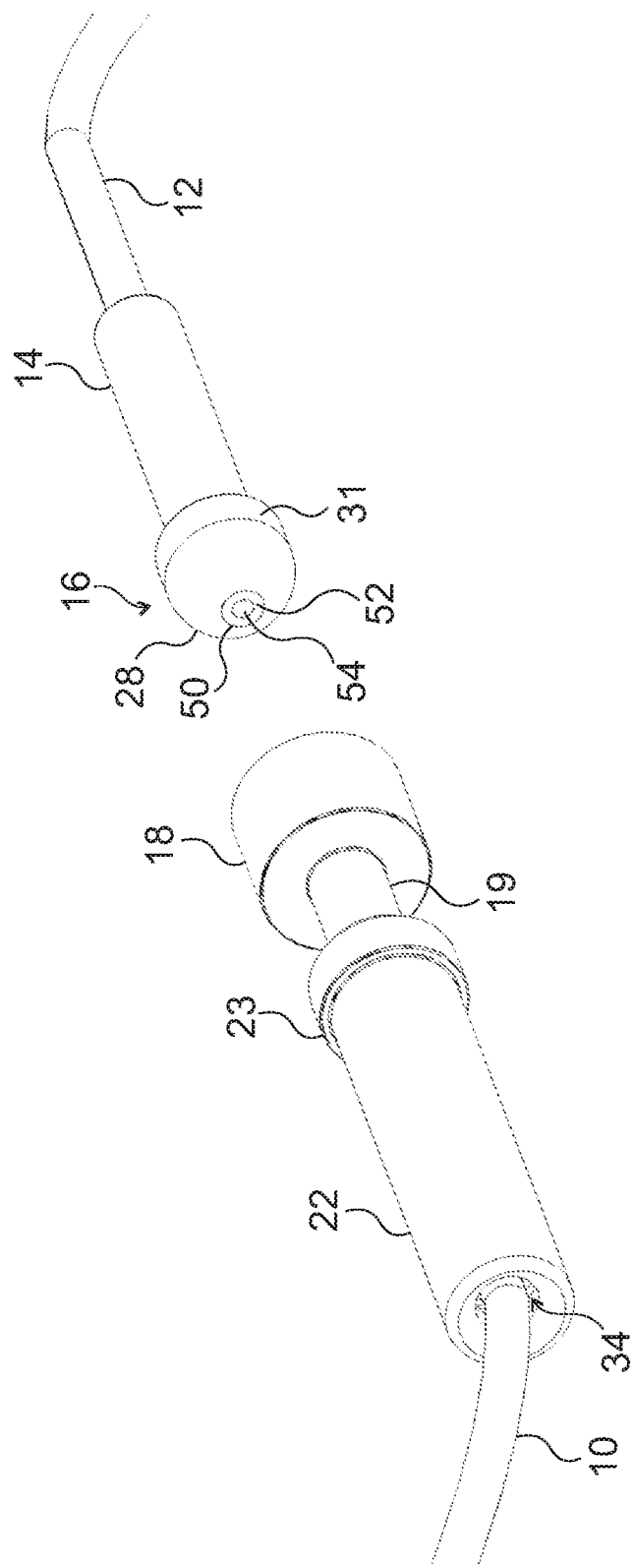
FIG. 3 is a spatial drawing illustrating the embodiment of the connector structure according to the invention shown in FIG. 1 in yet another view.

In FIG. 3, the embodiment of the connector structure of FIG. 1 is shown in another view. In this view, the second connector part 21 is shown from its front. Accordingly, a jacket 52 and a core 54 of the second optical cable 12 (the clad encompassing the core 54 is not visible) and a second opening 50 encompassing the end of the optical cable 12 (in the figure, the edge of the opening 50 is marked) can be seen in the opening formed on the spherical end portion 28. Since both the first connector part 11 and the second connector part 21 are axially symmetric and the optical cables 10, 12 run along their centreline, the cables can be aligned when the connector parts 11 and 21 are connected.

In FIG. 3 a first conical introduction portion 34 of the connector housing element 22 is also shown, through which the optical cable 10 can be introduced as far into the interior of the connector housing element 22 as the opening of the optical cable corresponding to the conical space part.

Thus, in the illustrated embodiment, an inwardly narrowing (i.e. narrowing towards the inside of the first conduit channel 45) first conical introduction portion 34 adapted for introducing the first optical cable 10 into the first conduit channel 45 is formed at the fourth end of the connector housing element 22, and an inwardly narrowing second conical introduction portion 32 adapted for introducing the second optical cable 12 is formed at the end of the second connector part 21 situated opposite the second head portion 16 (the introduction portions are generally adapted for introducing optical conduits). The first conical introduction portion 34 and the second conical introduction portion 32 can be included separately (i.e. one or the other) in the connector structure, but expediently both are included.

In FIG. 4, the embodiment of FIG. 1 is shown in a side view; the internal parts of the connector structure are also shown in dashed lines. The second connector part 21 and the optical cable 12 leading therein are shown on the left of the figure. The first connector part 11 can be seen on the right of FIG. 4. In FIG. 4 the connector parts 11 and 21 are connected to each other, as indicated by the dashed lines that can be seen inside the head portion 18, with the spherical end portion 28 being circularly seated against the conical side wall 30.

In FIG. 4 there is shown how the optical cables 10 and 12 are arranged in the connector parts 11, 21. As shown in the figure, the optical cables 10, 12 extend along the principal axis (axis of symmetry) in the connector parts. It is also illustrated by FIG. 4 that the optical cable 12—that extends as far as the end portion of the head portion 16—and the optical cable 10—which extends as far as the deepest point of the conical region—do not come into contact when the connector parts 11, 21 are connected (the optical cable 10 is connected to the conical region where the diameter of the conical portion—taken perpendicular to the longitudinal axis—decreases to the same value as the diameter of the optical cable 10). Keeping the optical cables 10, 12 in a non-contacting (non-touching) but proximate position is preferable from a number of aspects (see below).

The arrangement of the optical cables 10, 12 according to the configuration shown in FIG. 4 is detailed in the following. The spherical end portion 28 can preferably penetrate into the conical (shaped) receiving space part 35 to a certain depth, and at a certain position that corresponds to its effective diameter it becomes arrested (see also the further, related condition on the cone angle that is specified below). The conical region continues to narrow even along the portion that is located further inwards than where the spherical end portion 28 is arrested. Due to the rules governing the geometry of the junction of the spherical and conical shapes, at this even narrower location the spherical shape cannot contact the side wall. Thereby, an enclosed region is formed between the spherical end portion 28 and the conical side wall 30. Due to its spherical configuration, therefore, the spherical end portion 28 has an "earlier cut-off" than the conical (linear) configuration, so the optical cable 12 led out as far as the part of the spherical end portion 28 that is situated at the centreline (in which illustrated case it does not extend as far as the outside diameter of the spherical portion—i.e. does not "continue" the curved surface of the spherical portion but instead "cuts off" the spherical end portion with a plane corresponding to the end of the optical cable 12) does not contact the optical cable 10 that extends as far as the location where the conical region narrows down to the diameter of the optical cable 10 (or more accurately, to the diameter of the conduit channel receiving it).

As illustrated in FIG. 4, in this embodiment
- a first opening 40 of the first conduit channel 45 at the conical receiving space part 35, and a second opening 50 of the second conduit channel 55 on the spherical end portion 28, have opening planes that are perpendicular, respectively, to the longitudinal axis of the first conduit channel 45 and to the second longitudinal axis of the second conduit channel 55, and are configured symmetrically about the first longitudinal axis and the second longitudinal axis, respectively, and
- a first angle formed between the first longitudinal axis and the conical side wall 30 is smaller than a second angle formed between the second longitudinal axis and a tangent to the spherical end portion 28 drawn at the edge of the second opening 50 perpendicular to the edge of the second opening 50.

The first longitudinal axis and the conical side wall 30 lie at a well-defined angle, i.e. the cone narrows uniformly (in a linear manner). However, tangent lines to the spherical end portion 28 can be drawn at many locations and in many directions; in this case the reference location is the edge of the opening 50, the tangent being drawn there. In accordance with the above constraints on the opening plane, the opening has a circular edge, with the spherical end portion 28, of which the tangents will be scrutinized, starting outside the opening. The tangent included in the above condition is therefore perpendicular to the edge of the opening (i.e. the line corresponding to the edge), while—in accordance with the definition of the tangent—it lies at a tangential direction with respect to the surface of the spherical end portion 28.

In the above discussion a requirement has been set in order to provide light blocking, that upon the connection of the first connector part 11 and the second connector part 21, the spherical end portion 28 to be circularly seated against the conical side wall 30 of the conical receiving space part 35. Therefore, this definition excludes such cases wherein a circular seating is not established upon making the connection. If, in addition to that, the above condition is also set for the appropriately defined first and second angles, then it is ensured that the end portions of the optical conduits to be connected do not come into contact. If circular seating is achieved, the optical conduits can come into contact only if their diameter is identical, or if the optical conduit terminated in the spherical end portion has a smaller diameter than the other one; otherwise the spherical end portion "gets stuck" in the conical receiving space part before the cable ends come into contact, and the spherical end portion contacts the conical receiving space part somewhere along the spherical end portion—in an extreme case, at the edge of the opening of the conduit channel.

If the above condition on the angles is to be met, then the contact will not be established at the edge of the conduit channel, but at the spherical end portion, somewhat further from the opening of the conduit channel corresponding to the optical conduit; this is also more preferable because in this case at the location where they come into contact the angle of the tangent to the spherical end portion—that intersects the longitudinal axis of the conduit channel—and the first angle corresponding to the cone are identical. The tangents run close to each other near this location—i.e. where (considering for example the cross section according to FIG. 6) the spherical end portion and the conical side wall are still close to each other. Contact is therefore brought about between mutually osculating surfaces, which is preferable for light cancelling.

If the second optical conduit corresponding to the second connector part—i.e. the conduit channel receiving it—has a smaller diameter measured perpendicularly to the longitudinal axis than the first optical conduit and the first conduit channel (the diameter of the conduit channels being measured in the head unit and the second connector part, respectively), and the above condition holds true for the angles, then the optical conduits positioned to the opening ends (i.e. not protruding from the openings) will not touch each other.

In an embodiment of the connector structure, the diameter of the first conduit channel (measured) perpendicularly to the longitudinal axis thereof is identical to the diameter of the second conduit channel perpendicularly to the longitudinal axis thereof (this is the preferred case from the aspect of signal transmission). This case, that is also illustrated in the figures, is more preferable also from the aspect of dimensioning. Here as well, the fulfilment of the above condition on the first and second angles ensures that the ends of the optical conduits to be connected do not come into contact upon making the connection, if the ends are positioned at the opening planes. In such a case, a first head element having an appropriately dimensioned conical receiving portion can be chosen for the optical conduits (and so for the conduit channel they are received in), and then, by selecting the spherical end portion also for the optical conduits such that circular seating can be achieved with the conical receiving portion and also such that the above condition on angles is fulfilled, it can be ensured that the ends of the optical conduits will not contact each other when the connection is made. The nearer the values of the above defined first and second angles are to each other, the closer the optical conduit ends (positioned to the openings) will be when the connection is made.

Therefore, the second paragraph above defines the geometrical condition for the opening planes of the openings on the first connector part 11 and on the second connector part 21 to not contact each other in case of a circular seating during connection, provided that the spherical end portion 28 is seated against the conical side wall 30. If the two angles (i.e. the angle of the side wall 30 and the angle of the tangent) were identical, then the opening planes could barely touch even with proper seating.

In the illustrated embodiments, in case the first optical cable 10 and the second optical cable 12 (in general, optical conduits) are arranged, respectively, in the first conduit channel 45 and the second conduit channel 55 (i.e. in case optical cables 10, 12 are arranged), the respective ends of the first optical cable 10 and the second optical cable 12 situated at the first opening 40 and the second opening 50 are arranged at the respective opening planes of the first opening 40 and the second opening 50. Such a positioning can be carried out utilising a special cabling tool.

If the ends of the optical cables 10 and 12 are not regularly formed (i.e. they do not lie at a plane perpendicular to the longitudinal axis of the cable but for example the plane is tilted, or the cable end is not completely flat), then the closest portions (i.e. the most protruding portions) of the optical cables 10, 12 have to be placed in the opening plane. Thereby the optical cables 10, 12 can be prevented from protruding from the connector parts 11, 21, and so are protected from damage.

If, therefore, the condition specified above for the angle corresponding to the side wall 30 and the tangent is fulfilled, and the ends of the optical cables 10, 12 are positioned according to the above described conditions, the mutually facing ends of the optical cables 10, 12 (i.e. between which the signal is transmitted) do not touch each other (for this it is also needed that the ends of the optical cables are cut perpendicular to their longitudinal axis).

In most known approaches it is an aim that the ends of the optical conduits physically contact each other at the contact location. However, contrary to this trend, in the present invention preferably such an arrangement is applied wherein a gap is intentionally produced between the ends responsible for signal transmission.

This arrangement has the following advantages over the known approaches. If the ends of the conduits do not touch each other, then light is not subjected to refraction at the contact surfaces. The conduit ends touching each other would pose problems also because—since in practice the ends of optical conduits cannot be cut perfectly perpendicular to their longitudinal direction—such ends would be brought into contact of which the deviations from the ideal shape cannot be controlled i.e. cannot be calculated with. In case the ends of the optical conduits do not touch, the signal transmission process will be more controlled, especially because—thanks to the configuration that brings together conical and spherical surfaces and to the application of the resilient element—the contact between the surfaces can be maintained and external light can be cancelled very effectively.

Also, with the preferred arrangement described above, the manufacturing tolerances of cutting the optical conduits do not have to be taken into account. Besides that, it is also preferable if such non-touching conduit ends are applied that are situated as close to each other as possible; this can be provided by choosing the relative dimensions of the conical receiving space part and the spherical end portion (for example, appropriately choosing the cone angle of the conical region).

In FIG. 4 the configuration details of the first connector part 11 of the present embodiment are also shown. A stem 19, of which the outline can also be discerned inside the connector housing element 22, protrudes from the head portion 18. A widened portion 24 dimensioned such that it cannot leave the connector housing element 22 is formed on the portion of the stem 19 that is situated inside the connector housing element 22. At the end of the connector housing element 22 facing the head portion 18 an inward extending edge portion 20 adapted to reduce the diameter of the opening of the connector housing element 22 essentially to the width of the stem 19 (such that the stem 19 can be freely moved in the opening) is formed, the widened portion 24 is retained in the internal space of the connector housing element 22 by the edge portion 20.

In FIG. 4 it can be observed that a resilient element 26 is supported against the widened portion 24 at the end of the widened portion 24 situated opposite the stem 19. The other end of the resilient element 26 is supported against the end portion of the connector housing element 22; the resilient element 26 is preferably dimensioned such that it is in a slightly biased state even when it pushes the widened portion 24 forward until it stops, i.e. into its extreme position, when the stem 19 protrudes most from the connector housing element 22. The head portion 18, the stem 19, and the widened portion 24 form a head unit, i.e. the head portion 18 is situated at one end of this head unit, the widened portion 24 is formed at the other end, the guide portion 36 is preferably also arranged there as the extension thereof, and the head portion is hold (received) by the edge portion 20 at the stem 19 (such that it encompasses the stem 19).

In the present embodiment, the resilient element 26 is preferably a helical spring, with the optical cable 10 being preferably adapted to be passed through the inner space thereof, such that it can be introduced into the connector housing element 22 through the conical introduction portion 34 of the connector housing element 22 (other details of the configuration of the connector housing element 22 are presented in the corresponding sectional drawings [FIGS. 6 and 9]).

Figure 5:
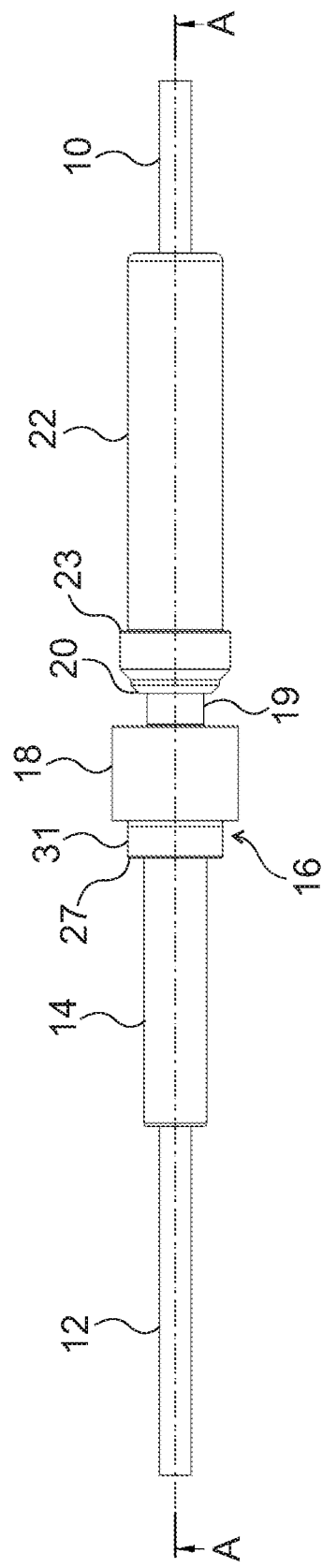
FIG. 5 is a side view illustrating the embodiment of FIG. 1 in the connected state of the connector parts.

In FIG. 5 the embodiment of FIG. 1 is shown in a side view in connected state. In FIG. 5—in accordance with FIG. 4—the head portion 16 is introduced into the conical region of the head portion 18 such that the connection is established. In FIG. 5 the configuration details of the shoulder portion 23 and the edge portion 20 are also shown. A plane A is marked in FIG. 5 (this plane is perpendicular to the plane of the figure), which plane is utilized to intersect the connector structure to obtain the sectional view of FIG. 6.

Certain configuration details are shown even more clearly in the sectional drawing according to FIG. 6, and the conduit channels 45, 55 adapted for arranging the optical cables 10, 12 are also indicated (in the figures, the optical cables 10, 12 are arranged in the conduit channels 45, 55, so the edges and side walls of the conduit channels are marked). The manner of mutually connecting the spherical end portion 28 and the conical side wall 30, i.e. the way the spherical surface is seated into the conical receiving portion, can be observed in the figure.

As shown in FIG. 6, the optical cable 12 is pushed exactly as far as the edge of the spherical end portion 28 (i.e. is positioned that way), and the optical cable 10 is pushed inwards as far as the point where the conical region starts from its diameter. A corresponding gap is thus established between the optical cables 10, 12. When the connector parts 11, 21 are connected—in case the optical cables 10, 12 to be connected are expediently aligned coaxially—the relative position of the spherical end portion 28 and the conical side wall 30 will always be the same (this is ensured by the spring of the connector part 21). Therefore, by positioning the optical cables 10, 12 in the connector parts 11, 21 as described above, the optical cables 10, 12 will also be situated at the same mutual distance when the connection is established (this is not necessarily the case in such approaches wherein the ends of the optical conduits touch each other when the connection is made, because, for example, a variable deformation can occur at the contact location under the variable compression forces).

Thanks to that, signal transmission and its bandwidth over the connector structure has reproducible characteristics every time a connection is established (in addition to that, signal transmission is typically stronger and clearer, and the transfer rate is higher compared to known approaches), it can be designed, and stays the same when the connector is utilised again and again. In known approaches, for the above described reasons (for example, because the contact surfaces of the optical conduits are not cut ideally flat), signal transmission (signal transmission loss) may vary between channels, i.e. when multiple parallel optical connections are applied, between connections.

It can also be observed in FIG. 6 (and also in FIG. 4) that, in the illustrated connected state, the stem 19 of the first connector part 11 is to some extent pressed into the connector housing element 22. In this position, the resilient element 26 is slightly compressed with respect to its base state that corresponds to the free state of the first connector part 11, wherein it is not applied for making a connection. The resilient element 26 is typically slightly biased even in the base state, such that it can press the widened portion 24 against the third end of the connector housing element 22 so that the head portion 18 is brought in its most protruding position (alternatively, the resilient element may not be biased in its base state, but this is not advantageous, because in this case the stem would have a slack fit in the connector housing element).

In FIG. 6 that illustrates the compressed state of the resilient element 26 it is shown that the widened portion 24 is slightly retracted from the edge portion 20. Thanks to the applied bias, in this connected state the resilient element 26 presses the head portion 18 having a conical receiving space part 35 to the spherical end portion 28 of the second connector part 21.

As shown in FIG. 6 (but can already be observed in FIG. 4), in the illustrated embodiment the first head unit comprises a cylindrical guide portion 36 connected to the end portion of the widened portion 24 being at the fourth end of the connector housing element 22, and encompassing the first conduit channel 45. The guide portion 36 is adapted for guiding the optical cable 10 by significantly extending guide length.

Figure 7:
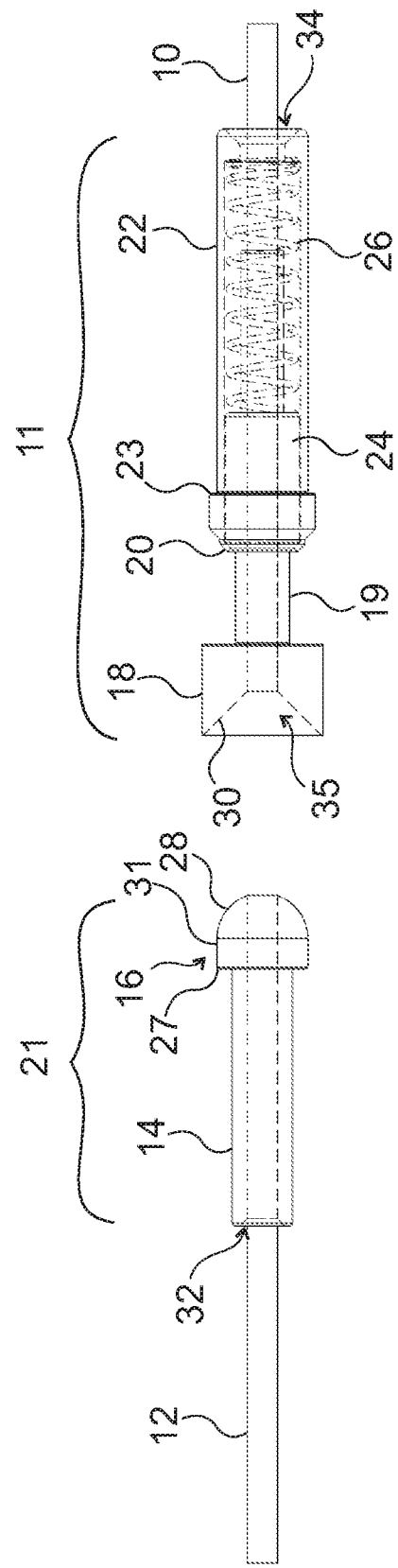
FIG. 7 is a side view illustrating the embodiment of FIG. 1 in the separated state of the connector parts, also showing internal structural components.

The above mentioned base state (unconnected state) is illustrated in FIGS. 7-9. In FIG. 7—like in FIG. 4—some internal parts are shown in dashed lines. In accordance with the base state, it is shown that the widened portion 24 is pressed against the edge portion 20 by the resilient element 26, pushing the head portion 18 outwards to its outermost position. In FIG. 7, the spring is in a more elongated (more relaxed) state than in FIG. 4, but this state is shown only schematically in FIG. 7.

In FIG. 7 the head portion 18 of the first connector part 11 is also shown in a corresponding view. As with the first conduit channel leading through the first connector part 11 (in which according to FIG. 7 an optical cable 10 is arranged), the conical receiving space part 35 is also shown in FIG. 7. In this embodiment, the conical receiving space part 35 has a frustoconical shape (the portion of the conical part narrowing to one point is cut off, the frustoconical surface being constituted by the side wall 30). The base (base circle) of the conical frustum is formed (virtually, since the shape is open due to the conical configuration) by the outward-facing end portion of the head portion 18, while the top circle thereof is constituted by the opening of the first conduit channel wherein there is arranged the first optical cable 10.

In an example, the cone angle of the conical receiving space part 35 is 90°, i.e. the conical side walls 30 lie at an angle of 45° with respect to the longitudinal axis of the connector part 11. The conical receiving portion and the conical side wall can be called, respectively, a frustoconical receiving portion and frustoconical side wall, however, the adjective "conical" is used to emphasise conicity, i.e. that a "cone-like" shape is applied.

In FIG. 7 the spherical end portion 28 of the head portion 16 can also be observed. The spherical end portion 28 assumes a substantially hemispherical shape, on which the opening of the second conduit channel, which in this embodiment is arranged about the longitudinal axis, is formed. Accordingly, the corresponding portion of the hemisphere is sliced off at the opening by a plane perpendicular to the longitudinal axis. Accordingly, this opening—into which typically the flat end portion of the optical cable 12 protrudes—is formed in the spherical end portion 28. In FIG. 7 the cylindrical portion 31 of the head portion 16 that constitutes an extension of the spherical end portion 28 is also shown; the radius of the cylinder is equal to the radius of the hemisphere corresponding to the spherical end portion 28.

In FIG. 8 the connector parts 11 and 21 of the connector structure are shown in a side view. By comparing FIG. 8 and FIG. 5, it can be observed that in FIG. 8 the head portion 18 is pushed further out, i.e. a longer portion of the stem 19 is visible.

FIG. 9 shows a sectional view of the released state of the connector structure. As it can be clearly seen in FIG. 9, the end of the widened portion 24 facing the head portion 18 is seated on the edge portion 20 as it is pressed against it by the resilient element 26.

In FIG. 9 the first and second conduit channels and the optical cables 10 and 12 arranged therein can be clearly observed. The second optical cable 12 simply passes through the connector part 21, extending along the longitudinal axis thereof through the cylindrical body 14 and the head portion 16 as far as the opening disposed on the spherical end portion 28. The first optical cable 10 also passes through the first connector part 11, i.e. the first head unit (the stem 19, the head portion 18 and the widened portion 24), and also through the guide portion 36 attached to the stem 19 on its side facing the resilient element 26. The guide portion 36 is arranged in the inner space of the resilient element 26 (between the coils of the helix), about the optical cable 10. It also passes through such a portion in the connector housing element 22 in the inner space of the resilient element 26, and through the rear opening thereof, where a guide portion 36 is not arranged.

As shown in FIG. 9, the opening formed by the introduction portion 34, formed at the end of the connector housing element 22 situated opposite the head portion 18, is widened to such an extent that the guide portion 36 could be passed through it. It can also be seen from the dimensioning according to the figure that the head portion 18 would essentially abut against the edge portion 20 at the same time that the guide portion 36 crosses the rear opening of the connector housing element 22. The guide portion 36, therefore, preferably does not project from the connector housing element 22 even when the head portion 18 is pressed in to a great extent, and, due to its configuration, the guide portion 36 does not get seated on the second inward extending edge portion 29, i.e. it would have space between the inward hanging parts of the edge 29. The conical introduction portion 34 corresponding to the edge 29 is adapted for introducing the optical cable 10 into the bore during the installation of the optical cable 10. The optical cable 10 is inserted into the bore preferably in a compressed state, is then positioned and crimped.

Figure 10:
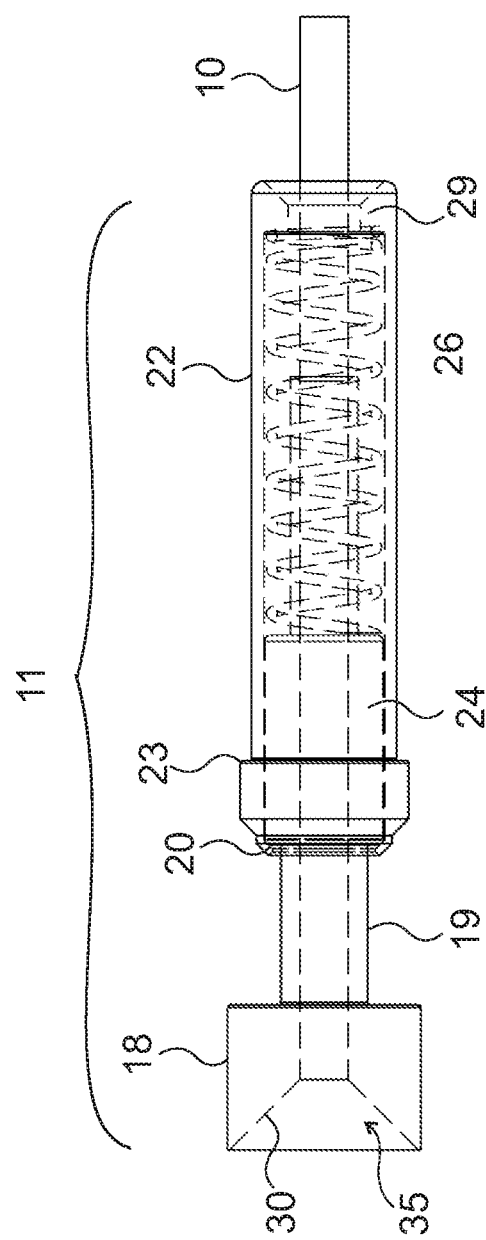
FIG. 10 is a side view illustrating the first connector part of the embodiment of FIG. 1, also showing internal structural components.
Figure 11:
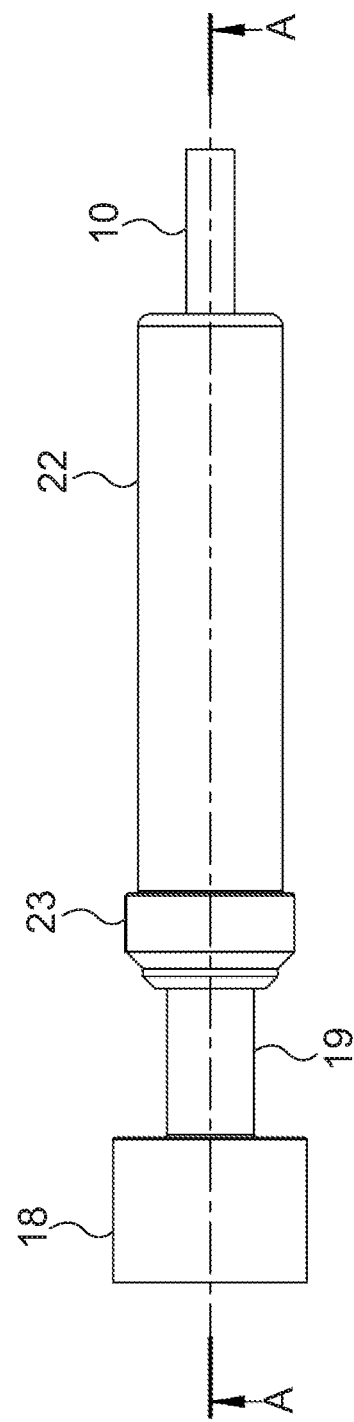
FIG. 11 is a side view illustrating the first connector part of the embodiment of FIG. 1.

FIGS. 10-12 show the first connector part 11 in a side view also showing internal details, in a side view, in a simple side elevation view, and in a sectional view (the sectional view of FIG. 12 is taken along a section A of FIG. 11). As shown in FIG. 12, a conical introduction portion is formed also on the guide portion 36 such that it narrows inwardly from the end portion thereof. Like in FIG. 6, in FIG. 12 there is also shown the first conduit channel 45 (marking the side wall thereof), and the first opening 40 (marking its edge). In FIGS. 10-12 there can easily be seen the base position (i.e. the unconnected state) of the various components.

FIGS. 13-15 show the second connector part 21 in a side view also showing internal details, in a side view, a simple side view, and in a sectional view (the sectional view of FIG. 15 is taken along a section A of FIG. 14). In FIG. 13 the configuration of the spherical end portion 28, with the end of the optical cable 12 being arranged inside an opening thereof, and also the configuration of the conical introduction portion 32 can be observed. Like in FIG. 6, in FIG. 15 there is also shown the second conduit channel 55 (marking the side wall thereof), and the second opening 50 (marking its edge).

In the embodiment according to FIG. 1 and the subsequent figures, the following dimensioning is applied in an example. In this example, the conical receiving space part 35 of the first connector part 11 has the same cone angle as mentioned above. In the example, the dimension of the head portion 18 adapted to encompass the conical receiving space part 35, measured perpendicularly to the longitudinal axis, i.e. its diameter, is 4 mm, while its dimension along the longitudinal axis is 3 mm. Also in the present example, the diameter of the stem 19 interconnecting the head portion 18 and the widened portion 24, measured perpendicularly to the longitudinal axis, is 1.8 mm, the length of the stem 19 measured between the head portion 18 and the edge portion 20 (or more accurately, the third end of the connector housing element 22) is 3 mm, the distance of the flange belonging to the shoulder portion 23 measured from the third end of the connector housing element 22 is 2 mm, the residual length of the connector housing element 22 being 12 mm. In this example, the outside diameter of the connector housing element 22 is 3 mm, and the outside diameter of the shoulder portion 23 is 3.5 mm. In the example, the overall length of the first connector part 11, measured along its longitudinal axis, is 20 mm+/−0.1 mm with tolerance (this latter can also result from the inclusion of a moving part, i.e. of the stem 19 fitted with the head portion 18).

The diameter of the optical cable 10 in this example is 1 mm, more accurately the dimension is Ø1.0 g7, i.e. the dimension has a lower limit of 0.988 mm and an upper limit of 0.998 mm. In the example, the inside diameter of the conduit channel 45 is also 1 mm, however, contrary to the optical cable, this is an upper approximation, i.e. more accurately the diameter of the conduit channel 45 is Ø1.0 H9 (the lower limit of the dimension being 1.00 mm, and the upper limit being 1.025 mm). Generally, other such tolerance classes (dimensions) can be applied that provide that the inside diameter of the conduit channel is greater than the outside diameter of the optical conduit; and even with a basic size other than 1 mm, the ratio of the diameter of the conduit and of the channel can be the same. Applying the exemplary tolerance classes (H9/g7), it is provided that the arrangement can be assembled (the inside diameter of the channel is larger than the outside diameter of the conduit), because with these values a gap is left between the bore of the channel and the conduit. Thus, the conduit can be freely introduced into the bore of the channel.

In the example described above, the overall length of the connector part 21, measured along its longitudinal axis, is 11 mm. Of that, the length of the head portion 16 is 2.5 mm, the length of the adjacent cylindrical body 14 being 8.5 mm. The diameter of the head portion 16 is 3 mm, the diameter of the cylindrical body 14, measured perpendicularly to the longitudinal axis, is 2 mm. Therefore, in the example the diameter of the optical cable 12 is 1 mm (the more precise relation between that and the conduit channel 55 receiving it is the same as with the optical cable 10 and the conduit channel 45 receiving it).

The connector structure described herein can be very preferably applied as a testing connector structure (at the same time it is also suitable for making long-term connections; the pressing of the connector parts against each other by means of the resilient element preferably also allows for that). In the above example, therefore, the head portion 18 can be depressed by maximum 3 mm, and the operational depression in the test is 2 mm. Also in the above example, the spring force for the pre-depression, the operational depression and the maximum depression of the head portion 18 is, respectively, 0.5 N, 1 N, and 1.25 N.

Figure 16:
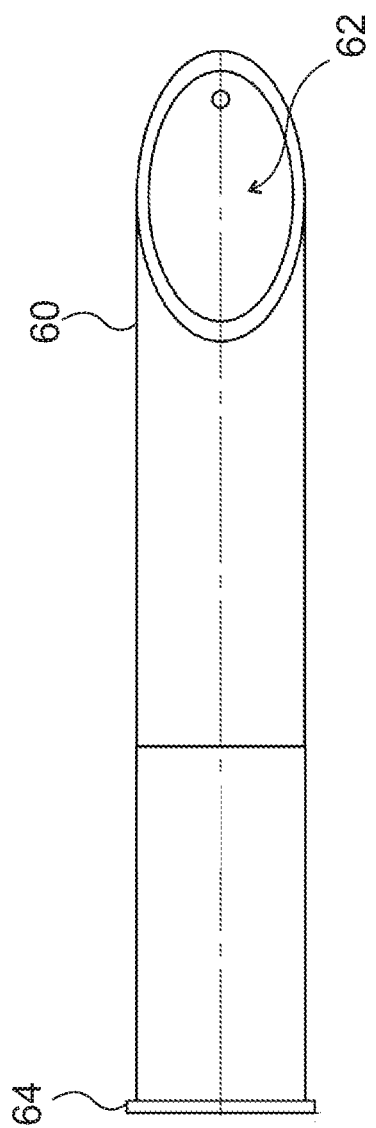
FIG. 16 is a drawing illustrating a connector insert applicable in an embodiment of the invention.

The testing application is illustrated in the subsequent figures. In FIG. 16 a first connector insert 60 is shown that can be preferably utilized in the connector board application illustrated in the subsequent figures. Both ends of the connector insert 60 (or to use an alternative term, open—quick-replacement—connector sleeve) is opened, with one of the ends being fitted with an oblique opening 62 in order that the optical conduit extending through the opening 62 has as small risk of damage as possible (see the subsequent figures). The other open end of the connector insert 60 is configured to be perpendicular to the longitudinal axis of the connector insert 60, and has a circumferential rim 64. As illustrated in the subsequent drawings, the rim 64 abuts against the flat of the connector board when the connector insert is introduced into the corresponding opening of the connector board (see below in more detail).

In an example fitting to the above, the length of the connector insert 60 is 22 mm, its overall outside diameter is 3.5 mm, its diameter at the outer portion of the rim 64 is 3.9 mm, and the dimension of the rim 64 measured along the length of the connector insert 60 is 0.25 mm.

Figure 18B:
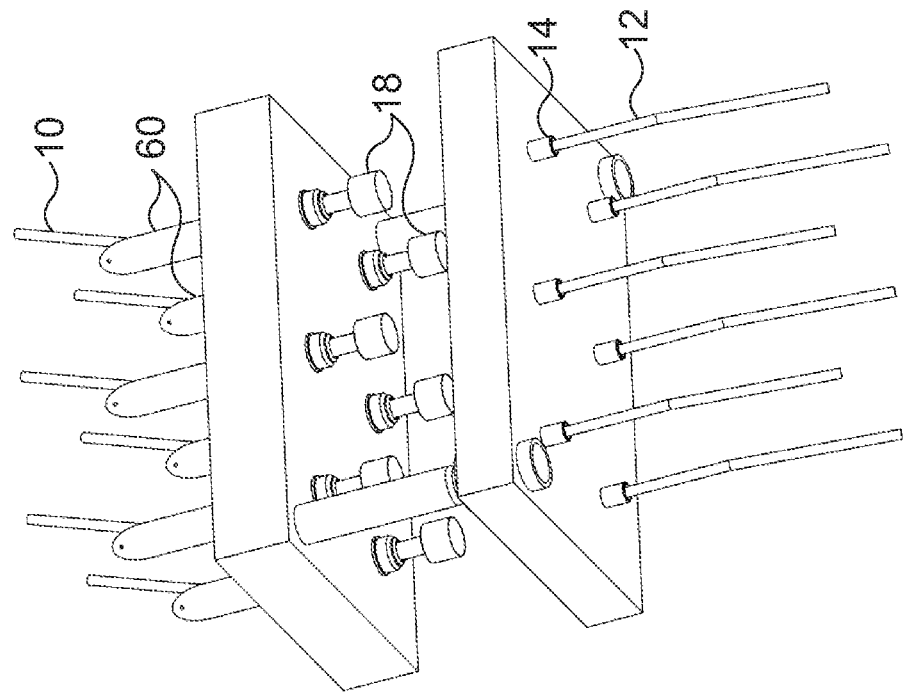
FIGS. 18A-18D show various views illustrating a further state of a group of connector structures according to an embodiment of the invention is inserted into connector boards.
Figure 18A:
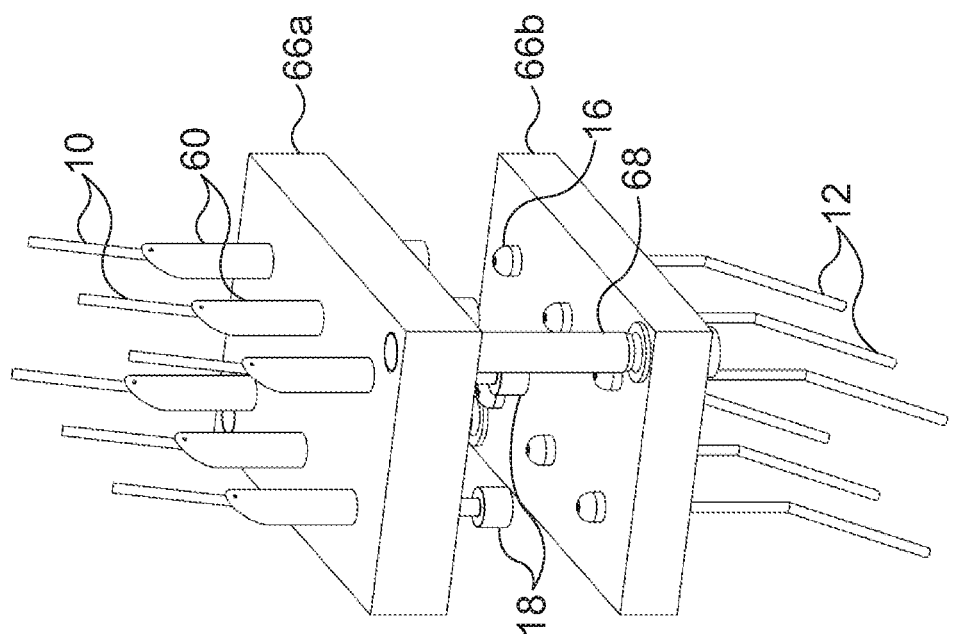

FIGS. 17A-17D show a first state in a connection-making process applying a connector board in a drawing showing a first view (slightly from above), a drawing showing a second view (slightly from the bottom), a drawing showing a first side view and a drawing showing a second side view (the states depicted in FIGS. 18A-18B and in 19A-19D can be seen in the same views).

In FIGS. 17A-17D, therefore, a state before assembly is shown. In the figures, the components of the embodiment of the connector structure that is also illustrated above are arranged between first and second connector boards 66a and 66b, with a respective connector insert 60 being further included for each first connector part 11. In this embodiment, therefore, the connector structure comprises a connector insert 60 having a cylindrical insert body adapted to be fitted, via a first end of it, onto the connector housing element 22 of the first connector part 11 (other types of connector insert can also be preferably applied, e.g. see the connector insert 80 below). A 3×2 pattern formed by first openings 65a and second openings 65b is formed in the first connector board 66a and the second connector board 66b, respectively. These figures are of course only intended to illustrate the connector-board arrangement of the connector structure; in actual practice connector boards including a lot more openings can be conceived. A respective interconnection rod 68—adapted for being introduced into respective connection openings 70 formed in the second connector board 66b—is arranged, connected to the connector board 66a, in two opposite corners of the rectangular block-shaped first connector board 66a (the first and second connector boards 66a and 66b can be brought closer to each other by pushing the rods further into the openings; maintaining them in a mutually fixed position can also be implemented in order to adjust the distance between the connector boards).

In FIGS. 17A-17D under the connector board 66a connector inserts 60 are shown, one insert corresponding to each opening 65a. The first connector part 11 can be seen under the connector inserts 60, showing an exemplary section of the optical cable 10 (in reality, the optical cables leading up to the connector parts 11 and 21 can be of any length). The second connector parts 21 can be seen opposite the first connector parts 11. Corresponding to the number of openings 65a, 65b, six pairs of connector parts, each formed by a connector part 11 and a connector part 21, are shown. In FIG. 17C, three pairs of connector parts 11 and 21, and three connector inserts 60 is shown, with FIG. 17D showing two pairs and two inserts corresponding to the view.

In FIGS. 18A-18D such a state of the connector-board connector arrangement is shown wherein the first connector parts 11 and the second connector parts 21 have already been introduced into the mutually facing connector boards 66a and 66b.

The connector part 11 is connected to the first connector board 66a as follows. First, starting from their state illustrated in FIGS. 17A-17D (i.e. from under the connector board 66a) the connector inserts 60 are introduced into the openings 65a shown in FIGS. 17A and 17B. The rim 64 of each of the connector inserts 60 then abuts against the underside of the connector board 66a (as shown e.g. in FIG. 18B), while the connector inserts 60 get stuck in the openings 65a (due to the relative dimensions of the connector board 66a and the connector inserts 60).

The optical cables 10 are then passed through the connector inserts 60, followed by introducing therein the first connector parts 11, i.e. the connector housing elements 22. As illustrated in FIG. 18B, the shoulder portion 23 of the connector housing element 22 is seated on the connector board 66a (or more accurately, on the rim 64 seated thereon), this is how the first connector part 11 is clamped utilizing the shoulder portion 23. In addition to that, the connector housing element 22 gets also stuck into the connector insert 60 such that it is secured in place.

The second connector parts 21 are retained in the second connector board 66b. As illustrated in FIGS. 18A-18D, the body 14 of the second connector parts 21 is slid into the corresponding openings 65b shown in FIGS. 17A and 17B (of course, first the optical cables 12 have to be passed through the openings 65b), and the shoulder portion 27 formed on the head portion 16 is abutted against the side of the connector board 66b. The second connector parts 21 also remain in their connected position because they are firmly fitted in the openings 65b.

Figure 18D:
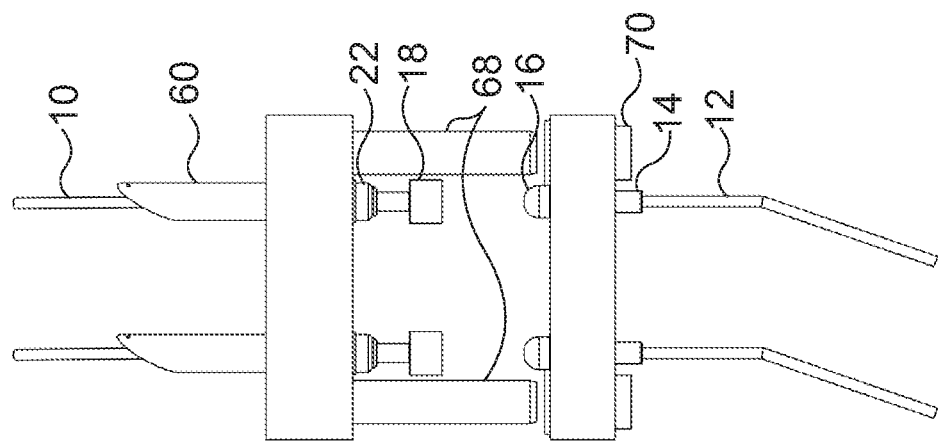
Figure 18C:
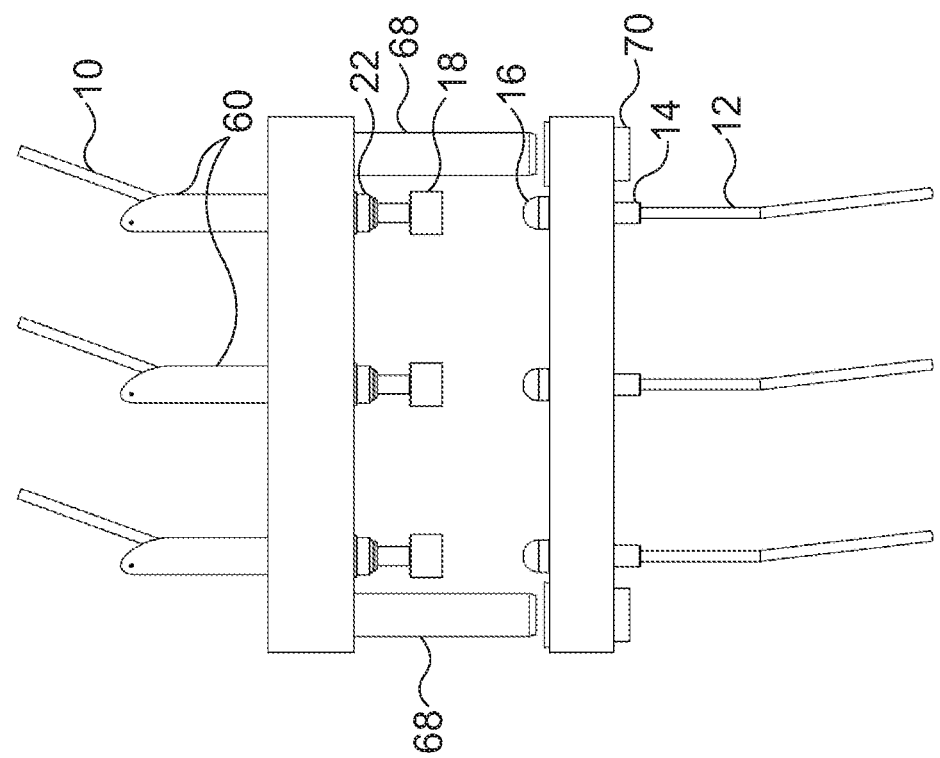

In FIGS. 18A-18D, the interconnection rods 68 are led on the connection openings 70. In FIG. 18A the abutting head portions 16 of the second connector parts 21, while in FIG. 18B the bodies 14 thereof extending through the openings are shown. In the view of FIG. 18B, the abutting of the first connector parts 11 is observable. It is also illustrated in FIGS. 18A-18D how the optical cable 10 extends from the connector parts 60. In FIGS. 18C and 18D, the abutting head portions 16 and connector housing elements 22 are shown in a side view that also shows the portion of the first head unit that protrudes from the connector housing elements 22, and the joining of the interconnection rods 68 and the connection openings 70.

In FIGS. 19A-19E, the arrangement shown in the previous figures is shown in a connected state. That way, when the connector boards 66a and 66b are led to each other (the interconnection rods 68 penetrating the connection openings 70) the head portions 18 and 16 of the connector parts 11 and 21 assume their connection position, i.e. the conical side wall 30 of the conical receiving space part 35 of the head portion 18 comes into contact with the spherical end portion 28 of the head portion 16. By bringing the connector boards 66a and 66b closer to each other it is sufficient to achieve a state wherein the head portions 16 and 18 touch each other, and the resilient element 26 of the connector part 11 is compressed to some extent, because in such a position the resilient force of the resilient element 26 ensures that the head portions 16 and 18 are pressed together, i.e. that the contact is maintained.

Figure 19B:
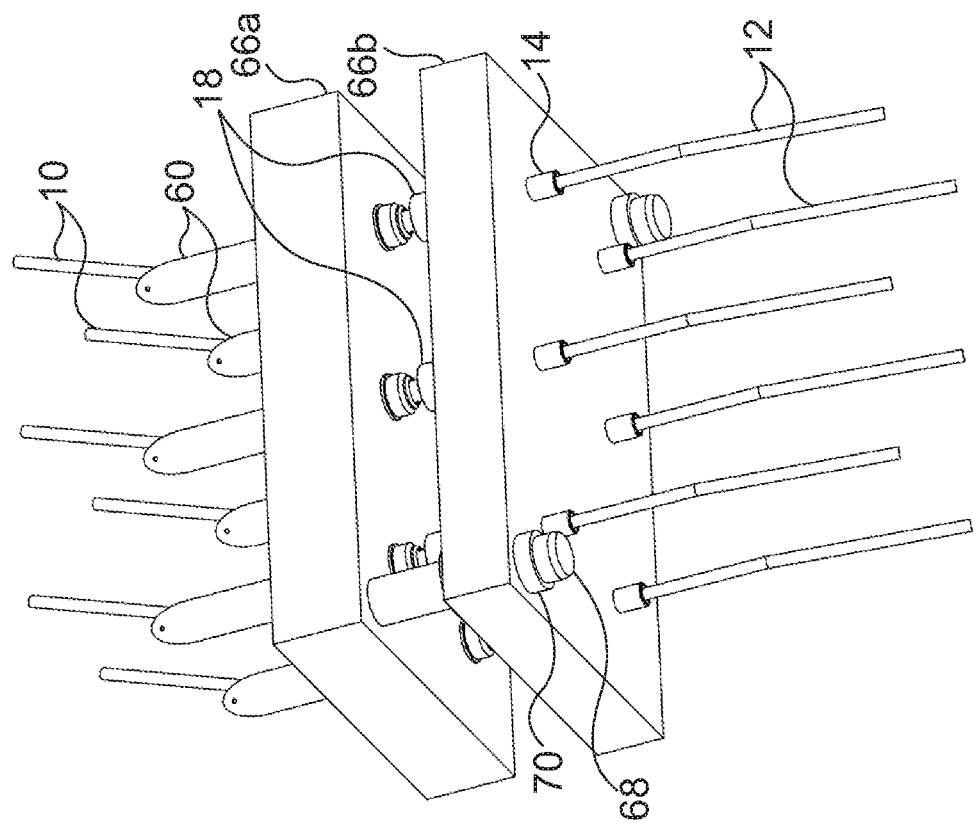
FIGS. 19A-19D show various views illustrating a still further state of a group of connector structures according to an embodiment of the invention is inserted into connector boards.
Figure 19A:
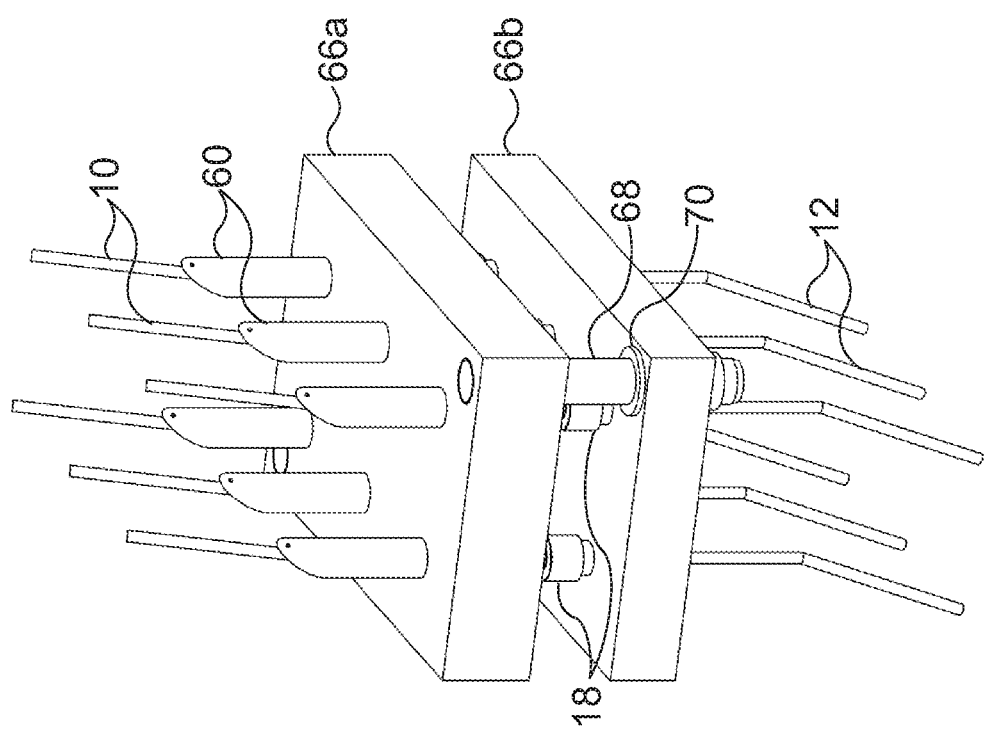
Figure 19D:
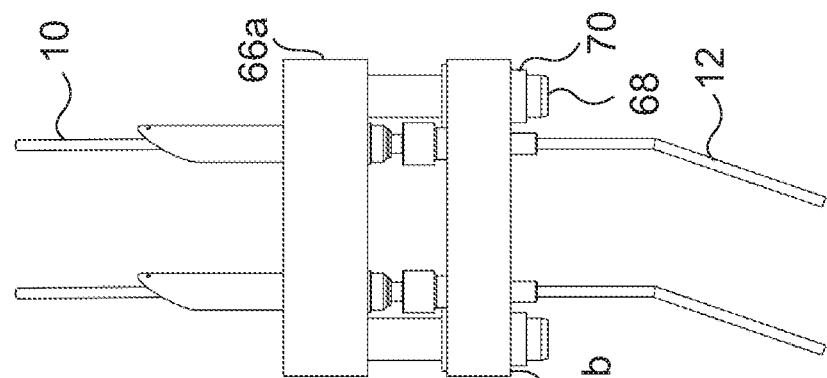
Figure 19C:
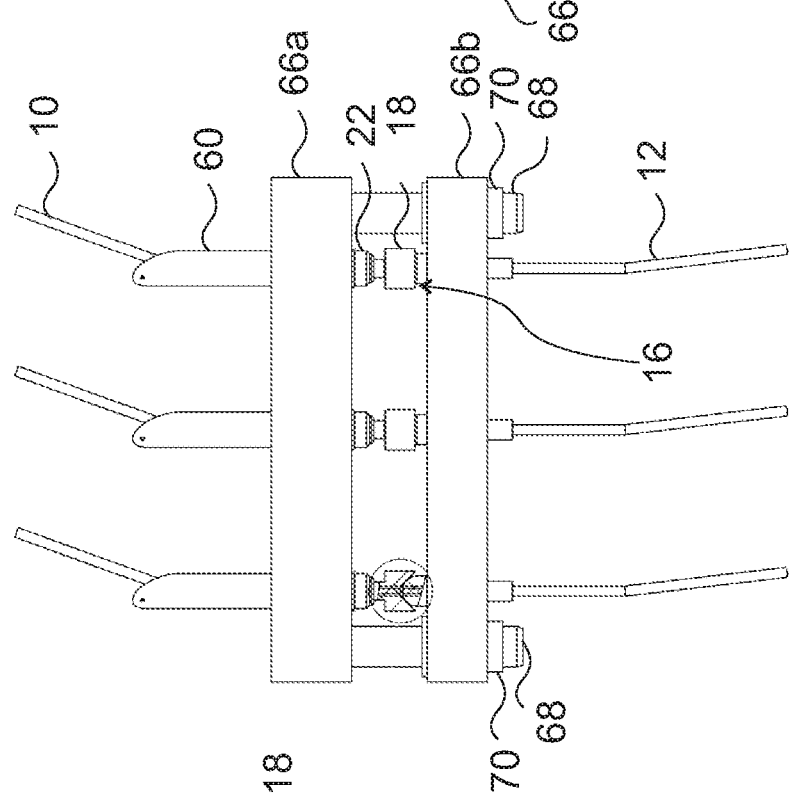

In FIGS. 19A-19E, therefore, the connector structures according to the invention are in a connected state. Due to being obstructed by the connector boards 66a, 66b, the interconnection of the head portions 16 and 18 can be observed in FIGS. 19C and 19D, while in FIG. 19E the interconnected head portions 16 and 18 are shown in a magnified view. In FIGS. 19C and 19D, therefore, it can be seen that the head portions 18 of the first connector parts 11 are pulled onto the second head portions 16 of the second connector parts 21 (in the side views the connector housing elements 22 seated on the connector board 66a are shown, and the head portion 16 is also visible to some extent). In the side views of FIGS. 19C and 19D, it can also be clearly seen to what extent in this connected state the interconnection rods 68 penetrate through the connection openings 70.

Figure 19E:
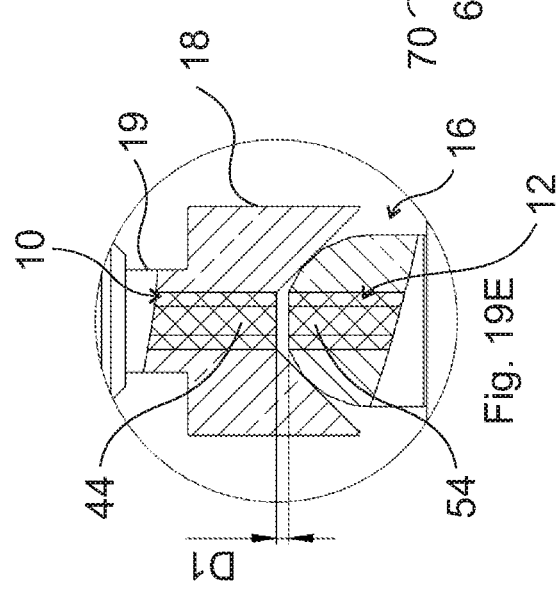
FIG. 19E shows a magnified view of the detail of FIG. 19C that is shown in an exploded manner.

As in FIG. 6, in FIG. 19E the interconnection of the head portions 16 and 18 is illustrated in a sectional view (the interconnection portion is shown in an exploded view, and the surrounding portions in a simple view), but in FIG. 19E the internal structure of the optical cables 10 and 12 is also shown (it is also shown in FIGS. 1 and 3). In FIG. 19E, a distance D1 is also indicated (it was also referred to above as a gap), the value of which may vary between 0.15 and 0.4 mm for the conduit applied in the example having the above specified dimensions that has a diameter of 1 mm with the tolerances specified above (in the example illustrated in the figure, the distance D1 being 0.22 mm for the 1-mm-diameter conduit shown).

The gap (the distance between the frontal faces of the two optical conduits) is typically smaller than the diameter of the optically conducting part of the applied optical conduit; the size of the gap is preferably 10-60% of the diameter of the optically conducting part of the conduit (in FIG. 19E, the optically conducting part of the optical conduits are the optical fibres represented by the cores 44 and 54; as with FIGS. 1 and 3, the clad is not visible in this figure either; in accordance with the above described principles of including reference numerals, the numerals 44 and 54 could even refer to entire optical fibres extending inside the jacket). Staying in this dimension range ensures that the losses remain low (the conditions for light transmission are optimal), and this range is also feasible from the aspect of manufacturing technology. For example, the conduits have a numeric aperture of 0.5, i.e. an incoming/outgoing angle of 30°.

Because losses are dependent basically on the diameter of the optically conducting part, in case optical conduits having a jacket are applied (such as in the case of the optical conduits shown in FIG. 19E), the above specified percentage has to be understood to refer to the diameter of the optical fibre situated inside the jacket. In case the optical conduit has no jacket, a gap (spacing) having a dimension of 10-60% of the size of the optically conducting part (i.e. in this case, the overall diameter of the optical conduit) is to be used also.

In FIG. 20A, the manner of securing the optical cables 10, 12 to the connector parts 11 and 21 is illustrated in a sectional drawing; in the example of the figure, securing is implemented applying crimping. In FIG. 20A, on the first connector part 11 first crimping protrusions 74 (projections, protruding portions) adapted to be pressed into the optical cable 10, and on the second connector part 21, second crimping protrusions 72 adapted to be pressed into the second optical cable 12 are shown. It has to be underlined here that the amount to which the crimping protrusions 72, 74 protrude from the wall of the corresponding conduit channel is shown by way of illustration only, i.e. it may be that the protrusion has this relative size, but it can also be smaller or greater than that. We will return later on to the exemplary value of the amount of protrusion.

According to the figure, the crimping protrusions 72 are formed on the portion of the channel receiving the optical cable 10 that extends between the head portion 18 and the widened portion 24 (the head unit of the connector part 11 is pressed in along this portion), while on the connector part 21, on the channel section extending inside the body 14. Accordingly, crimping is preferably not carried out at the head portions (where the material is thicker), but at the narrower, stem-like portions that are left free.

Corresponding to the two crimping protrusions 72, 74 on each connector part 11, 21, the crimped attachment of FIG. 20A has been made applying such a crimping device that is adapted for crimping the corresponding connector part on the optical cables 10, 12 from both sides. Such a crimping device is for example shown in FIGS. 35 and 36 that are described in detail herebelow.

In FIG. 20B, the crimping protrusions 72 formed on the connector part 21 are shown in a magnified view, allowing for their better observation. As illustrated in the figure, the oppositely formed crimping protrusions 72 are at a distance D2 from each other, which is smaller than the diameter of the conduit channel, wherein in this case the optical cable 12 is crimped. The crimping protrusions of course narrow down the conduit channel adapted for receiving the optical conduit such that the optical conduit gets stuck therein. In FIG. 20B, the conduit channel 55 and the optical cable 12 received therein cannot be distinguished from each other, because due to the applied tolerances there is a very small gap between them. In addition to that, in FIG. 20B it is also illustrated that the crimping protrusions 72 are sunk into the optical cable 12 (the amount thereof is not necessarily shown to scale).

In an example, the distance D2 is 0.95 mm (usually it is between 0.93 mm and 0.98 mm, so a tolerance range of 0.05 mm is applied for manufacturing) in case the diameter of the channel receiving the optical cable 12 is 1 mm (more precisely, Ø1.0 H9) at the non-crimped sections, i.e. at the crimped section the diameter of the channel—for example if the lower limit (1 mm) of the tolerance range is taken into account—is narrowed down to 93-98%, preferably 95% of its inside diameter (and, in accordance with the tolerance applied for the conduit it is pressed into the conduit in any case). Crimping is preferably performed by applying pressure on the optical cable such that only the plastic jacket of the cable is compressed, so compression does not reach as far as the optically conducting portion. The diameter of the conduit channel is preferably only a little smaller than the inside diameter of the conduit channel, such that the conduit can be securely clamped by crimping by producing a relatively small crimping protrusion.

In contrast to the sectional drawings of FIGS. 20A and 20B, in FIG. 21 crimping is illustrated in a spatial drawing. In FIG. 21 the outside traces of crimping, i.e. on the connector parts 11 and 21, respectively, first and second crimping indentations 76, 78 are shown (of course, two such crimping indentations are produced by each of the two crimping protrusions 72, 74, but in FIG. 21 only those are visible that are not obstructed in the particular view). The crimping indentations 76, 78 are shown schematically in FIG. 21, in the depiction one is bigger than the other, but this is not necessarily so; likewise, their size relative to the other components can also be different than what is shown in the figure.

In accordance with FIGS. 20A-20B, in FIG. 21 it is also illustrated that crimping is performed on the connector part directly beside the head portion. Crimping performed on the connector part 11 does not modify the movement of the head unit inside the connector housing element 22. More generally, it does not change the configuration of the connector parts to an extent that would affect their application.

FIGS. 22A-22B and 23 illustrate the application of a second connector insert 80. The connector insert 60 and its application have been described above. The connector insert 80 has even more preferable characteristics than the connector insert 60.

In FIG. 22A, the connector insert 80 can be seen applied to the connector part 11, pushed as far as the shoulder portion 23 thereof along the connector housing element 22. As illustrated also in FIG. 22A, the connector insert 80 encompasses the connector housing element 22 and, in the position shown in FIG. 22A—i.e. when it is pushed forward as far as the shoulder portion 23—it preferably gets stuck onto the connector housing element 22.

FIGS. 22A and 22B basically illustrate the configuration of the end portion of the connector insert 80, i.e. the portion where the optical cable 10 is introduced into the connector part 11. This region is shown in a magnified view in FIG. 22B Accordingly, in FIGS. 22A and 22B the end of the connector part 11 through which the optical cable 10 can be introduced is shown in a sectional view inside the connector insert 80, while the other portions are shown in a view (the sectional portion is actually a part of the spatial drawing shown in an exploded view).

As shown in FIGS. 22A, 22B, the optical cable 10 is guided on a section by the connector insert 80. To allow for that, the latter has a cylindrical outlet channel 82 (in other words, a guide body) with an outside diameter that is smaller than the outside diameter of the connector insert 80, and also than the outside diameter of the connector housing element 22. Besides that, the inner diameter of the outlet channel 82 is greater than the outer diameter of the optical cable 10 to be connected; this is because in this embodiment an insert ring 84 (sliding ring) is arranged in the outlet channel 82. The inner diameter of the insert ring 84 is nearly identical to the outer diameter of the optical cable 10, but for reasons of practical applicability these are dimensioned such that a gap (clearance) is left between them, i.e. the inner diameter of the insert ring 84 is somewhat (to a small extent) greater than the outer diameter of the optical cable 10 to be received therein.

In this embodiment, furthermore, a through opening 86 that has a much smaller diameter than the axial length of the outlet channel 82 is preferably formed in the side wall of the outlet channel 82. Additionally, in this embodiment the insert ring 84 has an inset recess 88 (indentation, groove) extending circumferentially along its outside face. The length of the insert ring 84 preferably corresponds to the length of the outlet channel 82, i.e. it extends along the full length thereof. The circumferential inset recess 88 is arranged on the insert ring 84 such that, when the insert ring 84 is inserted into the outlet channel 82 the inset recess 88 is situated near the through opening 86. The width of the inset recess 88 is preferably smaller than the diameter of the through opening 86.

The arrangement of the inset recess 88 and the through opening 86 according to the figure facilitates, in a manner described below, that the insert ring 84 is retained in place. The insert ring 84 fitted tightly into the outlet channel 82 (it can even have a slightly greater outside diameter than the channel) will preferably be "wedged" into through opening 86 to some extent. This "wedging" is facilitated by the arrangement of the inset recess 88 that provides that the material of the insert ring 84 undergoes deformation at the through opening 86, and is wedged therein along the edges of the inset recess 88.

There cannot be too great an overlap between the insert ring 84 and the inside diameter of the outlet channel 82. The outlet channel 82 has a thin wall, so in case there was too big an overlap between the two components, the outlet channel 82 could break off during assembly. The configuration of the through opening 86 allows that the insert ring 84 can be installed not by applying an overlap (tight fit) but for example by applying adhesive bonding through the through opening 86.

In FIGS. 22A and 22B, therefore, such an embodiment is illustrated wherein the connector structure comprises a connector insert 80 having a cylindrical insert body 81 adapted to be fitted, via one of its ends, onto the connector housing element 22 of the first connector part 11 (in use, it is in fact fitted thereon via the connector insert 80 and the connector part 11 is clamped into the connector board via the connector insert 80), and a cylindrical outlet channel 82 connected to the a second end thereof, and an insert ring 84 pressed against the inside wall of the outlet channel 82, being coaxial with the outlet channel 82, being adapted for guiding the first optical conduit (in the figure, an optical cable 10) is arranged in the outlet channel 82 (it can therefore be preferable to arrange it in a fixed manner, for example by adhesively bonding it to the outlet channel 82, but a tight fit can also be sufficient for securing it; the outlet channel 82 and the insert ring 84 have to be fixed in place relative to each other).

In this embodiment, furthermore, a through opening 86 is preferably formed in the side wall of the outlet channel 82, and an inset recess 88 that is narrower than the through opening 86 is formed on the insert ring 84. The inset recess does not have to extend fully circumferentially, it is sufficient if it is arranged at the through opening such that it can be "wedged" therein, i.e. it is narrower than the opening.

The connector insert 80 (sleeve) is seated/mounted into the holding board (into the connector board, like the connector insert 60 inserted into the connector board 66a) fixedly, preferably by a tight fit or a non-releasable joint. Therefore, one of the connector parts (in accordance with the figures, preferably the connector part 11 (optical pin)) is therefore seated into the connector insert 80, which retains it in place until it fails and has to be replaced.

For replacement, the connector part (optical pin) is pulled out from the sleeve (while the sleeve is kept in the board). The optical conduit (e.g. optical cable or fibre) is dismounted from the retrieved pin (exemplary ways of removing the pin are described below in the description of the push-out device). In such a state, in case of too big a gap is left with respect to the insert ring, the optical conduit could slip behind the board.

Therefore, the bore diameter of the insert ring is chosen such that it is greater by 0.10 mm (in general, by approx. 10%) than the outside diameter of the optical conduit. This small gap allows the movement of the seated head unit (pin) and of the optical conduit, i.e. when for example the head unit is depressed relative to the connector housing element, the optical conduit can also be displaced relative to the connector housing element (and thus, relative to the sleeve).

When, however, the connector part is removed (with the optical conduit that has been pulled out therefrom being pulled forward and left hanging in that position), then the optical conduit assumes a curved shape and is seated onto the bore of the insert ring. It thereby prevents the end of the optical conduit from slipping behind the connector board, i.e. prevents the optical conduit from slipping out from the sleeve. The connector insert 80 (receiving sleeve) can for example be made of a copper alloy material, so this component is rigid. The material of the insert ring 84 (sliding ring) can for example be PEEK (polyether ether ketone), a non-resilient—i.e. rigid—plastic (the requirements of providing a tight fit in the outlet channel 82 and the formation of a rim at the through opening 86 are fulfilled applying a non-resilient plastic) that has favourable sliding characteristics (the optical conduit can be slid easily along its internal part), is not or less prone to wear (resistant to wear) and has a low abrasive effect (is does not cause abrasion or only causes a low amount thereof).

According to the above, another purpose of the insert ring is guiding. The connector part 11 (measurement pin) is depressed against the spring, and is then released when it is let go. This displacement is followed also by the optical conduit (e.g. optical cable) inserted therein. If the optical conduit was constantly rubbing at a high angle against a copper alloy surface (i.e. to the rear outlet of the connector part 11 itself), it would wear out in a short time and it would have to be replaced. This is prevented by the inclusion of the insert ring 84 in the outlet channel 82 that is applied for guiding the optical conduit so that it is not broken at a high angle at the location where it is connected to the connector part 11.

So, another function of it can be preventing the breaking of the cable in the assembled state of the connector part. The optical conduit does not become broken even in that case. In operation, thanks to the inclusion of the outlet channel 82 and the insert ring 84, the connector part 11 (pin) is relieved of the loads caused by the weight of the optical conduit (the weight of the—often very long—optical conduit is thus supported by the connector insert 80 and through it, by the connector board). Load relief is necessary also because for the appropriate operation of the optical pin it is essential that it is positioned accurately with respect to the contact terminal, i.e. in the case of the connector part 11, with respect to the connector part 21. Because the head portion 18 of the connector part 11 can move, a gap is left between the body of the connector part 11 (the connector housing element 22) and the head unit comprising the head portion 18. Thus, the head unit would be kept tilted by the weight of the optical conduit with respect to its (coaxial) base position, i.e. it would be displaced into the gap by the conduit (for example, optical cable) hanging down from the end of the head unit. Thereby it could prevent the coaxial alignment between the head unit of the connector part 11 and the connector part 21 (contact terminal). In extreme cases this could also lead to external light penetrating as far as the contact surfaces (i.e. in extreme cases, external light pollution could penetrate the system), and the mutually contacting surfaces of the connector parts 11 and 21 would be subjected to increased wear and tear. Therefore, in accordance also with FIGS. 22A-22B, utilising the connector insert 80 facilitates the prevention of such unwanted effects, such that—by guiding the optical cable 10 inside the insert ring 84—the weight of the optical cable 10 (and even of a long continuing section thereof) is transferred to the connector insert 80 through the outlet channel 82. Therefore, by applying the connector insert 80, the coaxial alignment of the connector parts 11 and 21 to be connected can be ensured in a very preferable manner. Although these advantages (prevention of breaking, load transfer from the connector part to the connector insert) can also be provided to some extent by means of the connector insert 60 shown in FIG. 16, the advantages are more effectively provided by the connector insert 80.

The connector insert 80 is also shown in FIG. 23; in the drawing a rim 90 can be observed at one end of the cylindrical connector insert 80 (it can be inserted into the connector board like the rim 64 of the connector insert 60), an outlet channel 82 at its other end, and a through opening 86 formed therein.

The connector parts (in the first connector part, the stem, the connector housing element, the resilient element, as well as the second connector part) can for example be made of metal (e.g. copper), or a—typically wear-resistant—plastic material (for example, PEEK—polyether ether ketone, PEI—polyether imide, PAI—polyamide imide) or ceramic, but other non-transparent materials, i.e. materials suitable for blocking light (this latter feature is of course the most important for the material of the head portions 16 and 18) can also be conceivably applied.

The above described connector structure can be widely applied for example in measurement technology, when a contact to be tested is connected, via another contact, to a test system (a so called test fixture+test system) utilising a so-called mass interconnect interfacing technique. The connector structure can be applied for example in digital TV receiver units, either soldered to a PCB, pressed into an industrial plastic part, or arranged in a connection enclosure, while only the second connector part has to be crimped or soldered to the other end of the cable pulled to the intended location (for example, a house) in order to realise a very effective, high-quality optical contact between them. Thereby, the two units can even be connected and disconnected multiple hundred thousand times. Of course, the connector parts of the above mentioned connector structure can be inserted in a die-cast plastic housing, in a 3D-printed plastic or metal housing, or in a cast metal (for example, aluminium alloy) or CNC (computer numerical control) machined metal housing. These housings can be manufactured according to various standards, e.g. IP69K (DIN40050), or to comply with the ECOLAB certification.

The solution can be customised or tailored for any type of small- and large-diameter optical conduit (fibre, cable—the diameter of the optical conduits can be for example between 100 μm-20 mm).

It can be installed in connector enclosures, and connectivity solutions can also be supplied for any number of optical connections to satisfy specific demands. In large-scale connector systems, as many as multiple thousands or even tens of thousands of connector structures for optical conduits can be installed.

Our product based on the connector structure according to the invention is preferably suited for providing high-amperage connections while integrating an optical fibre (by this it is meant that a current can be carried for example by the metal stem made of copper; and because the optical conduit is encompassed by a jacket made of an insulating material, even high currents can be transmitted), while it is also possible to integrate high-temperature optical fibres in the optical connector structure.

Certain embodiments of the invention relate to a crimping device adapted for crimping a connector part, and to a push-out device. FIGS. 24-34 illustrate an embodiment of the crimping device according to the invention, while in FIGS. 35 and 36 another embodiment of the crimping device is illustrated. An embodiment of the push-out device according to the invention is illustrated in FIGS. 37-43.

The crimping device according to the invention is intended for securing the optical conduit (the crimping device could also be called simply a securing device or a securing device for an optical conduit) in a connector part, which connector part comprises a head unit comprising a stem and a head portion, a conical receiving space part in the head portion, having a conical side wall and widening in the direction of the end portion of the head portion situated opposite the connection thereof to the stem, and a conduit channel configured to open into the end portion of the conical receiving space part being at the stem and adapted for arranging an optical conduit.

In particular, the first connector part 11 of the connector structure according to the invention described above is such a connector part (the embodiments of the crimping device and the push-out device are presented applying this; it was referred to above as the first connector part), however, the crimping device according to the invention is also suitable for application with all such connector parts that have the above described features. The crimping device is intended to be used with such a connector device; the connector part of course does not form a part of the crimping device.

Figure 24:
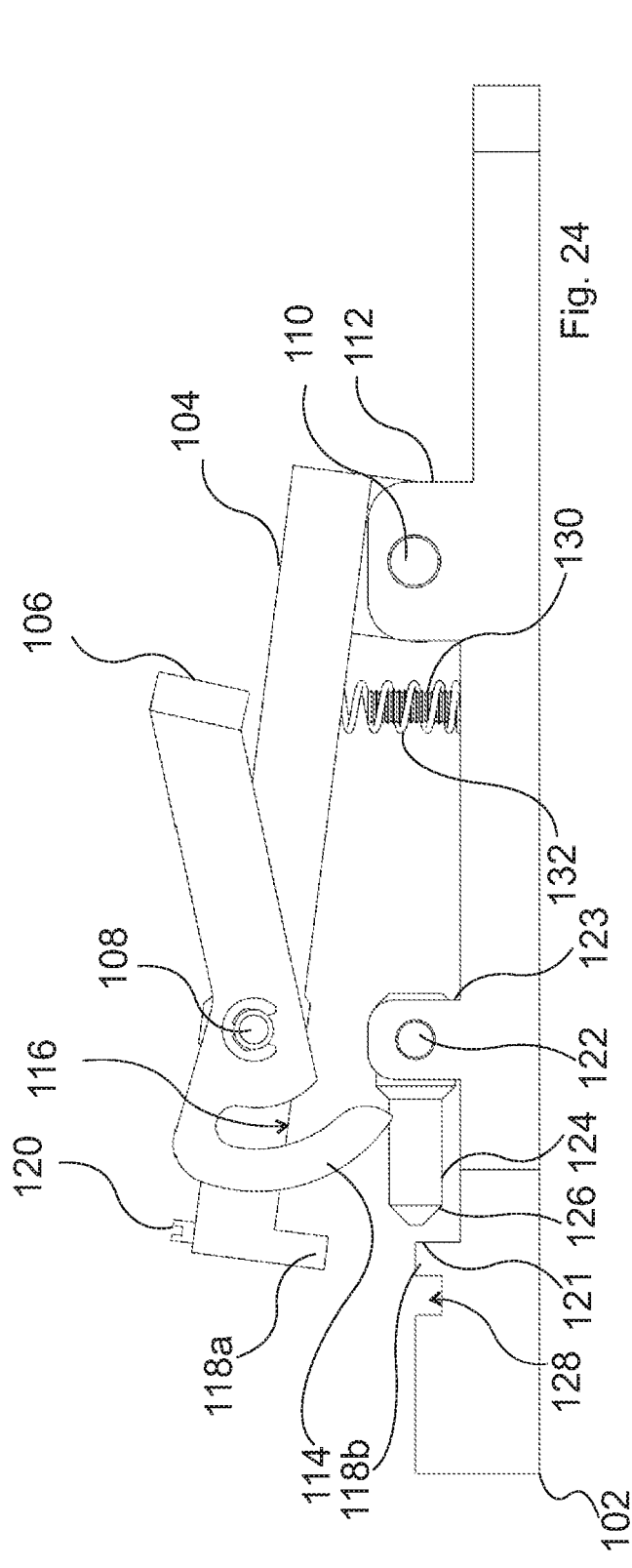
FIG. 24 is a spatial drawing showing an embodiment of the crimping device according to the invention in an open state.
Figure 35:
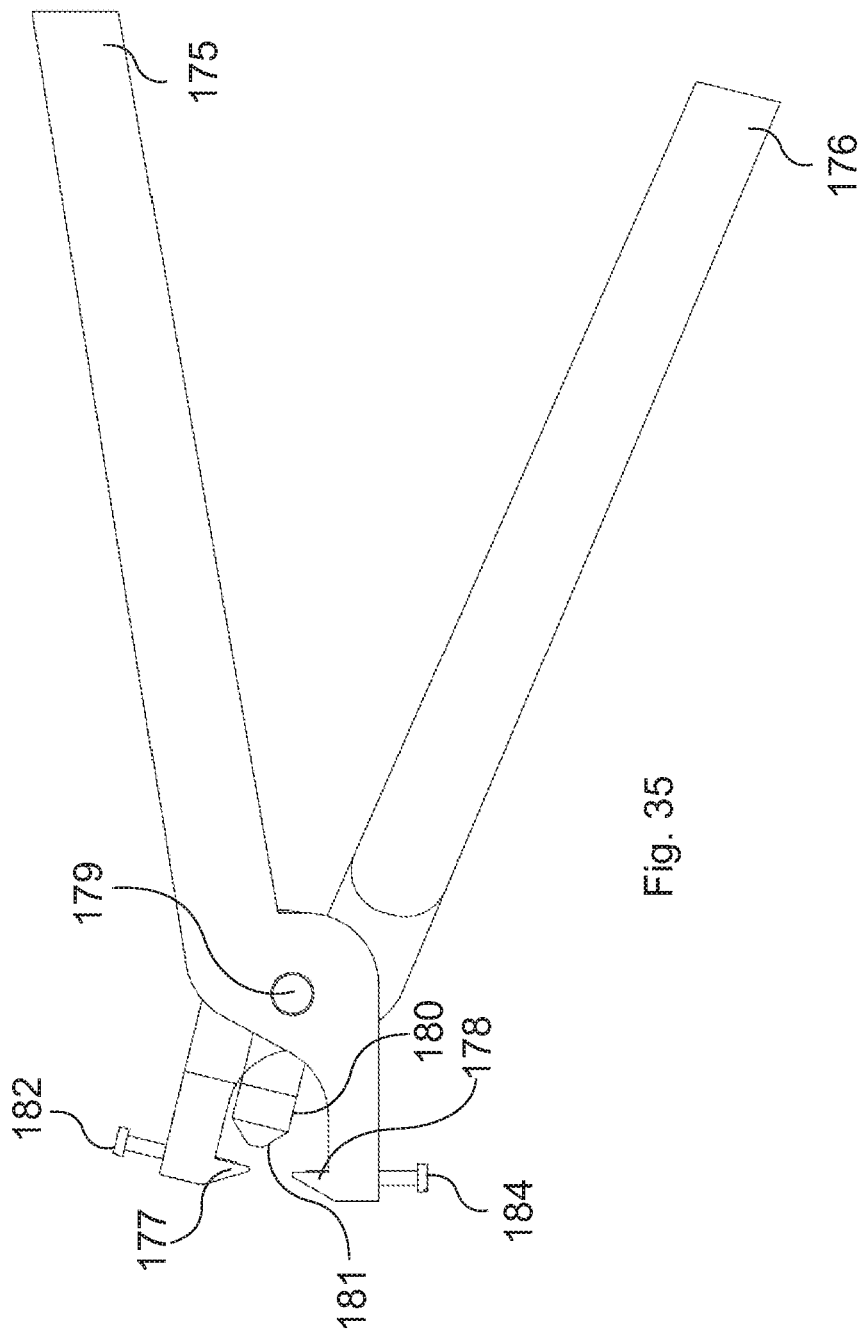
FIG. 35 is a side elevation drawing of a further embodiment of the crimping device according to the invention.
Figure 36:
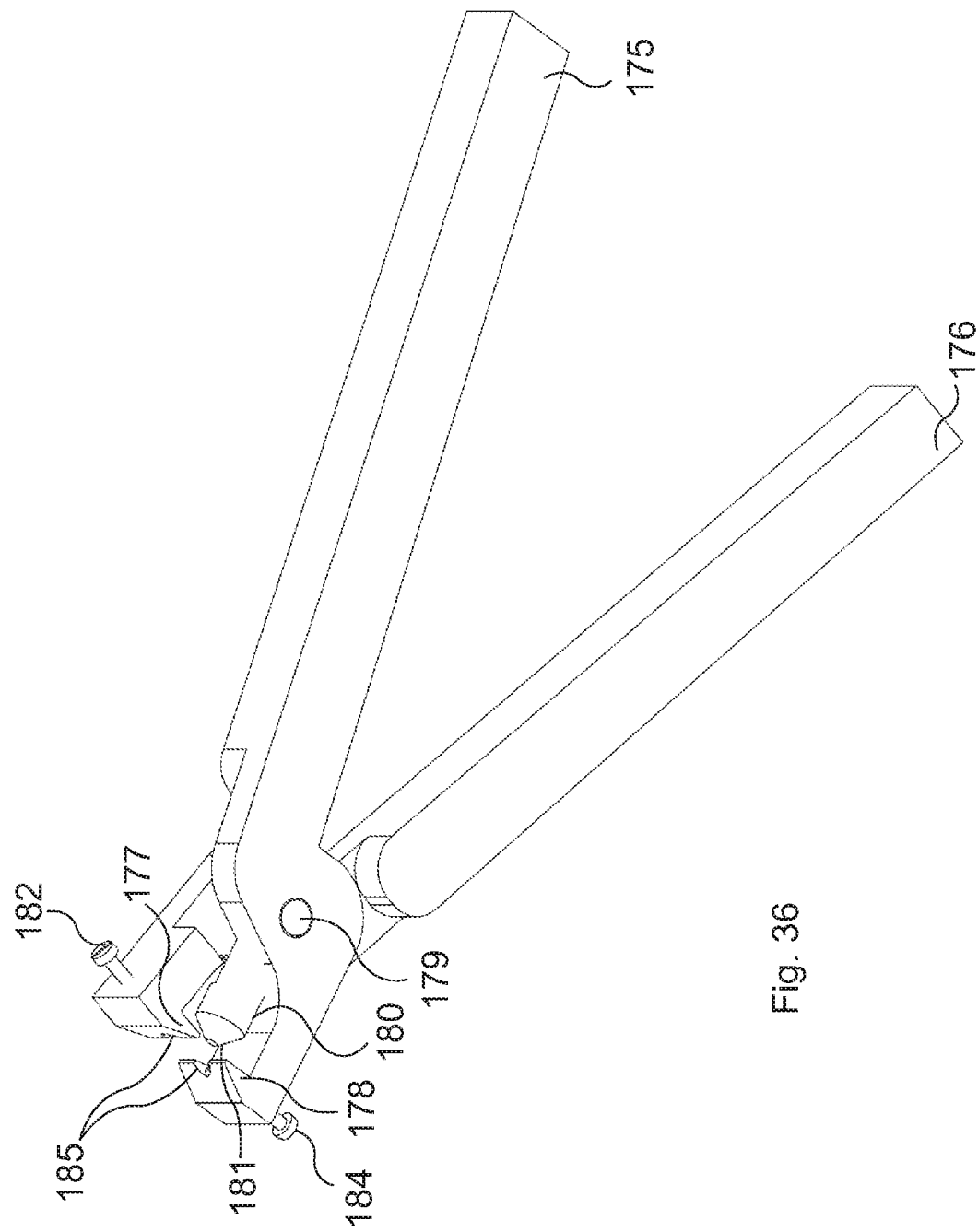
FIG. 36 is a spatial drawing of the embodiment shown in FIG. 35.
Figure 37:
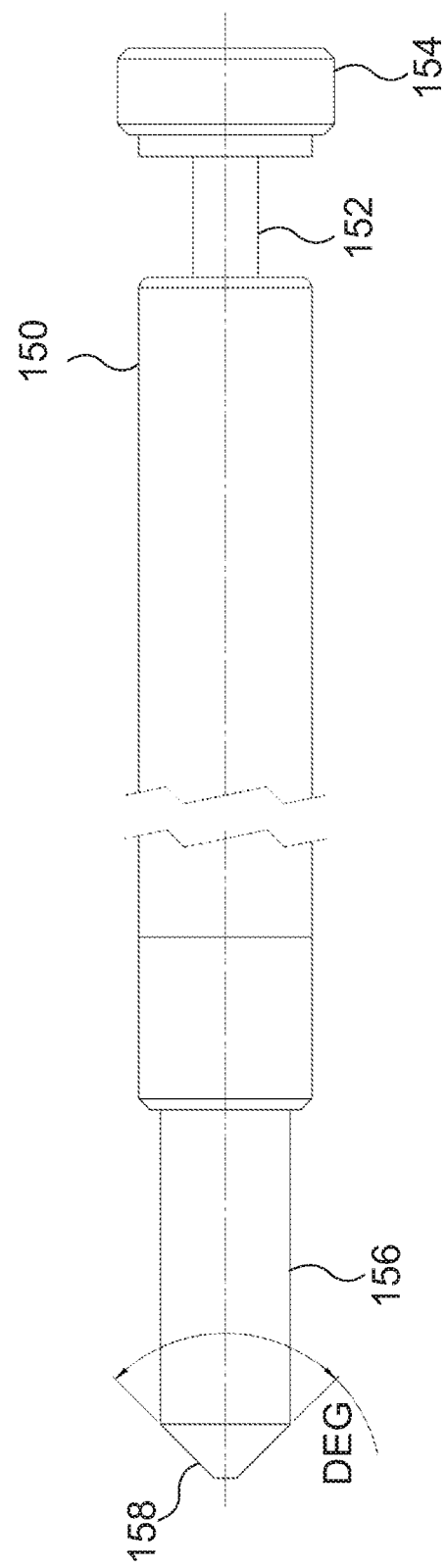
FIG. 37 is a detail drawing showing an embodiment of the push-out device according to the invention.

In the embodiment shown in FIG. 24 (and in the subsequent figures), the crimping device (tool) comprises
a first clamping portion (grip portion) and a second clamping portion being mutually displaceable (in the illustrated embodiments, rotatable) and adapted for clamping the stem of the head unit of the connector part (in the figures, the first connector part 11—in other words, a first and second clamping jaw adapted for clamping, respectively, in the embodiment of FIG. 24, clamping portions 118a and 118b), a crimping pin (in other words, a crimping stud or crimping needle element), on at least one of the first clamping portion and the second clamping portion, extending or adapted to be led out of in the direction of the other (in the embodiment shown in FIG. 24, of the two clamping portions the crimping pin is arranged on the first clamping portion 118a, but in the embodiment shown in FIGS. 35 and 36 a respective crimping pin is arranged on both clamping portions; crimping from at least one side is required), a support element having a conical support end fittingly supporting the conical side wall of the conical receiving space part of the head portion of the connector part (in the figures, the connector part 11) in case the stem thereof is clamped by the clamping portions (in the embodiment of FIG. 24, the crimping device comprises a support element 124 having a support end 126; whereas the embodiment of FIGS. 36 and 37 comprises a support element 180 having a support end 181).

The conical side wall of the conical receiving space part of the connector part is supported by the support end in case the stem of the connector part is clamped by the clamping portions, i.e. in case the connector part is arranged in the crimping device. The support is a fit support, as it is illustrated e.g. in FIG. 26, i.e. the geometrical parameters (such as the cone angle) of contacting conical surfaces are identical, and the conical support end fits closely against the conical side wall of the conical receiving space part. In accordance with the figures, the conical support end preferably has a frustoconical shape, i.e. its end is sliced off such that it can fit into the conical receiving space part, more precisely, such that it does not push the optical conduit further outward inside the connector part.

The crimping pin protrudes or can be led out in the direction of the other clamping portion. The crimping pin can be fixed or adjustable; in case it has a fixed configuration, then it protrudes fixedly in the direction of the other clamping portion. If it is adjustable, then the crimping pin can assume such a position wherein it does not protrude at all, in this case the for example semicircle-shaped portions of the clamping portions are suitable only for clamping the stem but not for crimping. However, the most important function of adjustability is the adjustment of crimping depth, this way the adjustable crimping pin will protrude to a smaller or greater extent in the direction of the other clamping portion.

In the illustrated embodiments of the crimping device, a first clamping recess and a second clamping recess opposing each other and having a semicircular cross-section is formed on the first clamping portion and the second clamping portion, respectively (see the clamping recesses 117a and 117b in FIG. 34, and the clamping recesses 185 in FIG. 36), for clamping the stem of the head unit of the connector part, and the crimping pin extends into or is introducible into the clamping recess formed on the corresponding clamping portion.

If a single crimping pin is included, then it extends or is introducible into the recess corresponding thereto, see FIGS. 30A-30B, and in case a respective crimping pin is arranged corresponding to both clamping portions, then it extends or is introducible into the corresponding clamping recesses, see FIG. 36. As illustrated also in these figures, by the phrase "protrudes or is adapted to be led out in the direction of the other clamping portion" it is meant that it will protrude from the clamping portion, but if a clamping recess is included, then, when looking at the clamping portion from the side, the protrusion of the crimping pin cannot be seen, because the recess into which it protrudes is not visible from the side. The clamping portions fitted with clamping recesses are particularly suitable for clamping the stem. The preferably applied clamping recess therefore has a semicircular cross section with a diameter that fits to the diameter of the stem to be clamped. This circular cross-section clamping recess has such a configuration that, preferably in the closed state of the crimping device the inside face of the recess is fitted on the outside wall of the stem (because it is rotated then to the required extent).

The corresponding clamping recesses on the first clamping portion and on the second clamping portion are arranged opposite to each other, complementing each other to form together an essentially circular cross-section opening (the aim is that they are not misaligned sideways during crimping) in the closed state. They are situated in a mutually opposite position in both the open and the closed position of the crimping device, only in the latter case they are somewhat further from each other.

Because it is the stem of the head unit to be clamped on which crimping can be performed effectively, this is the component that will be clamped. The diameter of the head portion (i.e. its dimension perpendicular to its axis) is larger than that of the stem, and, because the diameter of the conduit channel extending along both for receiving the optical conduit is the same, the stem can be crimped much more effectively than the head portion because there the conduit channel is surrounded by a lot less material. In the illustrated embodiments, the clamping portions are made capable of clamping the circular cross-section stem by semicircular clamping recesses, where the diameter of the clamping recesses corresponds to the diameter of the stem.

In the embodiment of the crimping device shown in FIG. 24, furthermore, preferably the second clamping portion 118b is formed on a base portion 102 adapted to be seated on a support surface (the underside of the base portion 102 is flat, so that it can be placed on a flat support surface, e.g. on a table or a working surface), and the first clamping portion 118a is formed on a moving portion 104 being connectible to the base portion 102 via a first axis of rotation 110 and being rotatable vis-à-vis the base portion 102 (in the embodiment of FIG. 24, the upper portion of the device—adapted to be depressed on the base portion 102—is referred to as a moving portion), and the support element 124 is rotatably connected to the base portion 102 via a third axis of rotation (in the embodiment of FIG. 24, the third axis of rotation is preferably implemented as a hooking shaft 122, see below). This latter feature is not necessarily used together with the above described further features.

In the embodiment of FIG. 24, furthermore, preferably a hooking handle 106 is connected to the moving portion 104 via a second axis of rotation 108 parallel to the first axis of rotation 110, the third axis of rotation is configured as a hooking shaft 122, and a hooking recess 116 adapted for clamping the hooking shaft 122 by rotation of the hooking handle 106 about the second axis of rotation 108 is formed on the hooking handle 106, and the stem of the head unit of the connector part (for example, a first connector part 11) is clamped by first clamping portion and the second clamping portion in case the hooking shaft 122 is clamped in the hooking recess 116 and the connector part is arranged by fittingly arranging the conical side wall on the support end 126.

In the embodiment of FIG. 24, furthermore, an elongated opening (see an elongated opening 141 in FIG. 28B) elongated along the longitudinal direction of the support element 124 and is adapted for allowing the displacement of the support element 124 in a direction perpendicular to the third axis of rotation is formed on the support element 124 for passing the third axis of rotation (in the illustrated embodiment, a hooking shaft 122) therethrough, and a third resilient element 140 is arranged between (i.e. is introduced between) the support end 126 of the support element 124 and the third axis of rotation.

In the embodiment of FIG. 24, furthermore, preferably the second clamping portion 118*b* has a shoulder portion 121 facing the support element 124 (see the shoulder portion e.g. in FIG. 32), and the head portion of the connector part (for example, the head portion 18 of the first connector part 11) is insertable between the shoulder portion 121 and the support element 124 such that the conical side wall 30 of the receiving space part 35 of the head portion is fitted against the support end 126 of the support element 124, and the end of the head portion situated opposite the conical receiving space part 35 is abutted against the shoulder portion 121 of the second clamping portion 118*b*. In the embodiment of FIG. 35, the functionality provided by the shoulder portion can preferably be provided also by the configuration of the clamping portions 177 and 178, thanks to which the connector part can be arranged according to the above also in the crimping device of FIG. 35.

The above described details are therefore visible in FIG. 24 that shows the crimping device in a spatial drawing. In FIG. 24 a base portion 102 is shown that preferably has a flat underside. On the flat underside there can be expediently arranged such components, for example made of rubber, that prevent the device from slipping on the flat support surface. In this embodiment, conforming also to the applied terminology, the base portion 102 is fixedly arranged during use, while the moving portion 104 is moved for crimping. According to the configuration of FIG. 24, a number of components required for crimping are arranged on the base portion 102, for example, the connector part to be crimped can also be arranged by lying it on the base portion. To facilitate that, a first trough 128 is formed, and the relative arrangement of the clamping portion 118*b* and the support element 124. Further configuration details related to the trough 128 and further construction details for the arrangement of the connector part are described herebelow.

In the crimping device according to FIG. 24, a first connector part 11 according to the above described embodiment of the connector structure can be arranged such that its head portion 18 is clamped between the support element 124 and the clamping portion 118*b*; the manner of arranging the connector part 11 will be detailed later on. The support element 124 can be rotated about the third axis of rotation implemented as a hooking shaft 122 such that the head portion 18 of the connector part 11 can be arranged more easily between the support element 124 and the clamping portion 118*b*.

It is shown in FIG. 24, that a guide pin 130 protruding between the base portion 102 and the moving portion 104 is arranged on the base portion 102, and a second resilient element 132—according to the figure preferably implemented as a helical spring—supported on the base portion 102 and extending beyond (over) the guide pin 130 is arranged around the guide pin 130.

In its base position, therefore, the resilient element 132 extends beyond the guide pin 130, so when the moving portion 104 is pressed downwards, it abuts against the resilient element 132, and from then on the resistance of the latter also has to be countered when pressing the moving portion 104 further downwards (before the moving portion 104 would abut against the guide pin 130, the clamping portions 118*a* and 118*b* come closed together, so the resilient element 132 extends beyond the guide pin 130 even in its compressed state). Thus, when pressing down on the moving portion 104, the user can feel when it is depressed close to the degree that is necessary for performing crimping. Besides that, the resilient element 132 keeps urging the moving portion 104 further from the base portion 102, so in the resting state the moving portion 104 will be distanced from the base portion 102. This also facilitates the introduction of the connector part 11 into the crimping device, because during the insertion the moving portion 104 will not return to the closed position against the will of the user.

Figure 25:
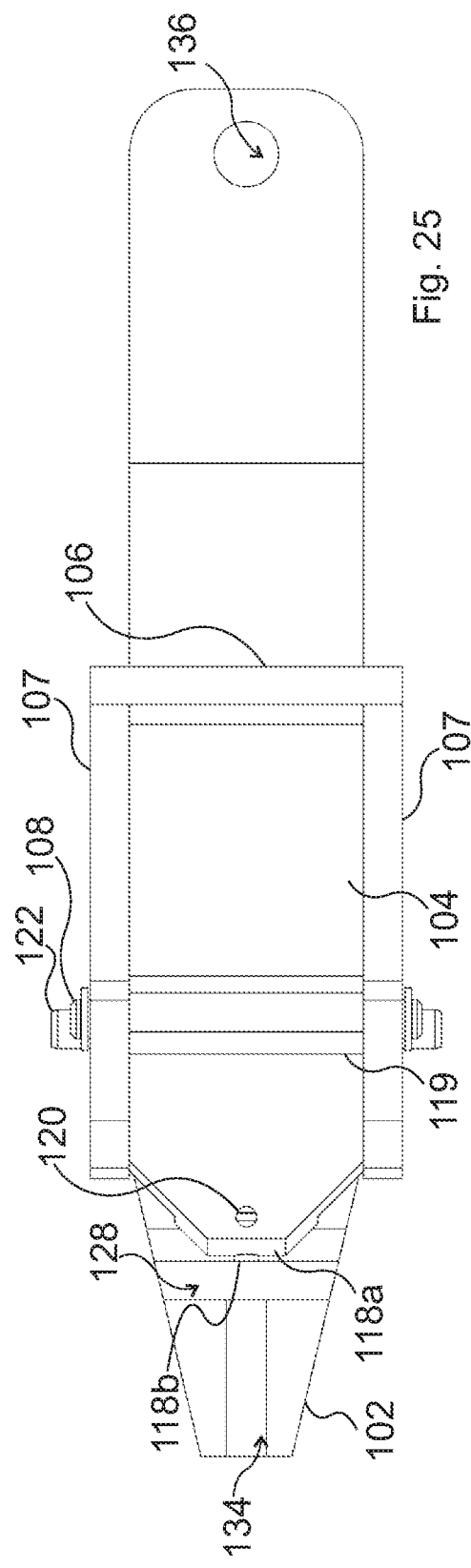
FIG. 25 is a top view drawing showing the embodiment of the crimping device shown in FIG. 24.

In FIG. 24 the hooking handle 106 is also shown that is rotatably attached to the outside of the moving portion (preferably at both sides, as shown e.g. in FIG. 25). Being rotated about the axis of rotation 108 to a certain degree, the hooking handle 106 reaches the hooking shaft 122 that is introduced into the hooking recess 116, wherein it gets stuck if a sufficient tightening is applied. The hooking recess 116 is formed such that a hooking portion 114—that encompasses the hooking recess 116 that is open at one side (i.e. the side facing the hooking shaft 122)—is formed on the corresponding handle shank 107 of the hooking handle 106 (see e.g. in FIG. 25). The hooking recess 116 preferably has an arcuate configuration, such that when being rotated, the hooking handle 106 can be pulled as far on the hooking shaft 122 as possible, with the centre of the circle arc corresponding to the hooking recess 116 not being coincident with the axis of rotation of the hooking handle 106. So, while rotating the hooking handle 106, the upper moving portion 104 can be pulled towards the fixed bottom base portion 102 as much as possible, thereby preparing the crimping operation.

As illustrated also in FIG. 24 (the ends of the shafts being shown as circles) the axes of rotation 108 and 110 and the hooking shaft 122 are preferably arranged parallel to each other. Thanks to this, a situation may occur wherein the moving portion 104 can be turned onto the base portion 102, followed by turning the two handle shanks 107 of the hooking handle 106 onto both ends of the hooking shaft 122. The operation of the hooking handle 106 is illustrated in further figures, also showing various rotational positions thereof.

In FIG. 24 a crimping pin 120 is also shown that is arranged at the clamping portion 118*a*. At the end of the crimping pin 120 protruding from the moving portion 104 an incision is shown (see FIG. 26) that can be engaged by a screwdriver for rotating the pin. As illustrated in certain further figures (e.g. FIG. 26), a threading is preferably disposed on the side wall of the crimping pin 120 such that by rotation it can be screwed further inward or more outward inside the through bore fitted with a counterthreading into which it is introduced. It can thereby be led out through the through bore in the direction of the second clamping portion 118*b* such that its end protrudes from the clamping portion 118*a* and is thus adapted for crimping. The protrusion is not visible in FIG. 24 because—as can be observed e.g. in FIG. 34—the end of the crimping pin 120 protrudes into an arcuate recess in the clamping portion 118*b*. This arcuate portion will encompass the stem to be crimped.

In FIG. 25, the embodiment of the crimping device of FIG. 24 is shown in a top view. In FIG. 25, the moving portion 104 is in the same open position as in FIG. 24. The crimping device is adapted for crimping the connector part 11 shown in the figures described above, or for crimping a similar connector part. In FIG. 25 a first trough 128 adapted for receiving the shoulder portion 23 of the connector part 11 is shown, while the connector housing element 22 is seated in a second trough 134. Accordingly, the trough 128 extends deeper into the base portion 102 than the trough 134 (this is also illustrated in FIGS. 26 and 30A). To some extent, in FIG. 25 there can also be observed the location where the stem of the connector part 11 will be laid between the clamping portions 118a, 118b.

As can be observed in FIG. 25, the hooking shaft 122 extends sideways over the handle shanks 107 of the hooking handle 106, such that, when rotated appropriately, they can be hooked effectively (the hooking shaft 122 also extends sideways over the axis of rotation 108). In FIG. 25 a protrusion 119 formed on the moving portion 104 about the axis of rotation 108 is also shown. A securing opening 136 through which the base portion 102 can be secured on a support surface can also be seen.

In FIG. 26, the embodiment of FIG. 24 is shown such that the connector part 11 to be crimped is arranged in the crimping device (its head portion 18 is inserted between the clamping portion 118b and the support element 124), and the clamping portion 118a is closed against the stem 19 of the connector part 11 by rotating the moving portion 104. More particularly, FIG. 26 shows the state wherein the crimping end 144 of the crimping pin 120 protruding the furthest from the clamping portion 118a has just come into contact with the stem 19 of the connector part 11. According to FIG. 26, crimping has not yet been performed because, although the moving portion 104 has been folded down, the hooking handle 106 has not yet been hooked in the hooking shaft 122, so the crimping end 144 has not yet been pressed into the stem 19 (and the clamping portions 118a, 118b also have not closed together).

In FIG. 26 the arrangement of the connector part 11 in the crimping device can be clearly observed. Due to the sectional view, the connector housing element 22 is shown lying in the trough 134, with the portion of the shoulder portion 23 facing the base portion 102 extending into the trough 128. In FIG. 26 the incision 142 of the crimping pin 120 is also shown.

A well-defined crimping location is formed on the stem 19 of the connector part 11 such that the head portion 18 thereof is inserted, as shown in the figure, between the clamping portions 118a, 118b and the support element 124. The head portion 18 is brought into this position by fitting the conical side wall of the head portion 18 against the support end 126 of the support element 124 in the open state of the moving portion 104 (even by slightly rotating the support element 124 about the hooking shaft 122 that forms the axis of rotation of the support element 124), and then by pushing the support element 124 inwards against the resilient element 140 such that the end of the head portion 18 facing the connector housing element 22 is supported in the shoulder portion that is formed by the clamping portion 118b to face the support element 124, i.e. the head portion 18 is "hooked" in the clamping portion 118b. The resilient element 140 is preferably dimensioned such that it is also biased in this position, i.e. it presses the head portion 18 against the clamping portion 118b.

In this state, therefore, the moving portion 104 is still open, but the head unit of the connector part 11 is fixed in a position wherein the crimping operation can be carried out, and the connector housing element 22 thereof lays fixedly in the trough 134. Therefore, when the moving portion 104 is folded down, the clamping portion 118a is brought near the stem 19, against which it fits in the folded-down state due to its configuration. After that, the crimping operation—which is illustrated in the subsequent figures—can be performed by operating the hooking handle 106. Based on FIG. 26 it can also be understood that the amount of the crimping indentation formed on the stem 19 can be adjusted by crimping pin 120 (i.e., by screwing it inwards or outwards, modifying the extent to which it protrudes from the clamping portion 118a).

In FIG. 26, therefore, the internal configuration of the support element 124 and the arrangement of related elements is shown. The hooking shaft 122 is supported by shaft holders 123, one of which can be observed in FIG. 26 (in FIG. 24, the shaft holder 123 being in the front in the view is shown). In this embodiment, the shaft holders 123 encompass the body of the support element 124. A cavity 125 closed-off at the support end 126 and opened at the other end the elongated support element 124 is formed in the support element 124.

Accordingly, the support element 124 is arranged at its intended location such that first the resilient element 140 is arranged inside the cavity 125, and then the hooking shaft 122 is pushed through the support element 124 (and thus through the cavity 125), whereby both ends of the hooking shaft 122 are introduced into the shaft holders 123. As shown in FIG. 26 and also in details in FIGS. 28A and 28B, on the support element 124 the hooking shafts 122 extend through an opening 141 elongated in the longitudinal direction of the support element 124 (along the longitudinal direction of the cavity 125) into the shaft holders 123 (the opening 141 is indicated in FIG. 28B and has a shape of a circle elongated in a particular direction). The resilient element 140 and the support element 124 are thus kept in place by the hooking shaft 122, while the support element 124 is able to move in the longitudinal direction of the support element 124. Therefore, it is not necessary to close off the open end of the cavity 125.

In FIG. 26 in a sectional view the expedient configuration of the guide pin 130 is also shown. In this configuration, the guide pin 130 is screwed in the base portion 102 from the bottom (the head of the screw and the thread extending inside the base portion 102 is observable), so the amount of its extension in between the base portion 102 and the moving portion 104 can be adjusted by rotating it. In FIG. 26 it is also shown that an adjustment screw 138 is also included, screwed in the base portion 102. The sectional drawing of FIG. 26 also shows the arrangement of the moving portion 104 and the axis of rotation 110. The adjustment screw 138 is adapted to be screwed into a gap formed between the base portion 102 and the moving portion 104, i.e. between the axis of rotation 110 and the base portion 102; that is in the driven-in state its end protrudes therein. By modifying the amount of the protrusion the degree to which the moving portion 104 can be rotated about the axes of rotation 110 can be adjusted, i.e. indirectly also the degree to which the moving portion 104 is distanced in the base position (i.e. when no crimping is performed) by the resilient element 132 arranged about the guide pin 130, or the degree to which the moving portion 104 can be rotated outward. In FIG. 26, the thread of the adjustment screw 138 and the incision formed for driving in the screw on the head thereof can be observed.

In this embodiment, therefore an adjustment screw 138 adapted to be led out of the base portion 102 towards the moving portion 104 and adapted to provide abutment for the moving portion 104 in case the first clamping portion 118a is distanced from the second clamping portion 118b, is arranged at the first axis of rotation 110.

FIG. 27 also shows the crimping device in the position illustrated in FIG. 26, but in a top view. The connector part 11 is also shown in FIG. 27. Compared to FIG. 25, the moving portion 104 is folded further downwards as it is folded onto the stem 19 of the connector part 11. The section line C-C along which the sectional view of FIG. 26 is drawn is indicated in FIG. 27.

In FIG. 28A, and in FIG. 28B which illustrates a detail thereof situated at the hooking shaft 122, the mutual arrangement of the support element 124 and the hooking shaft 122 can be observed, and the function/role of the resilient element 140 can also be understood. In FIG. 28A, an "almost closed" state of the moving portion 104 is shown, corresponding to the orientation of the hooking handle 106 (accordingly, a small gap is still present between the clamping portions 118a, 118b). Based on FIGS. 28A and 28B it can be understood that the support element 124 can be displaced inside the elongated opening 141 against the resilient element 140. As the resilient element 140 is preferably biased in the position wherein the hooking shaft 122 is arranged (and kept inside) the cavity 125 of the support element 124, i.e. it is pressed against the hooking shaft 122, and can preferably push the hooking shaft 122 to the position at which it abuts against the right side (as shown in the figure) of the elongated opening 141 (even in this state it remains in a slightly biased state).

Therefore, a path formed on the support element 124 by way of the elongated opening 141 ensures that the hooking shaft 122 can be returned against the resilient element 140 (pulling back the support element 124 toward the right side of the figure), instead of providing a respective circular bore (i.e. bore having a shape corresponding to the shape of the end of the of the hooking shaft 122) for receiving the hooking shaft 122. Accordingly, the support element 124 is pressed against the inserted head portion 18 by the resilient element 140, thereby retaining it in place because the resilient element 140 "intends" to assume its largest extension, i.e. the rest state of the support element 124 is the position pushed as far to the left as possible (according to the figure).

In FIG. 29 that state of the crimping device is shown wherein the crimping operation is performed. For the sake of simplicity, in FIG. 29 there is not shown the connector part 11, so according to FIG. 29 crimping is not actually performed, the crimping device only assumes the crimping position. The actual crimping process is illustrated in the subsequent figures.

In FIG. 29, therefore, the hooking handle 106 is rotated to the position wherein the hooking shaft 122 is introduced into the hooking recess 116. The hooking handle 106 is pulled on the hooking shaft 122 as much as possible, in which position the clamping portions 118a, 118b contact each other, and the resilient element 132 is compressed. The appropriate configuration of the hooking recess 116 can make it easier to find the end position (for example, the hooking shaft 122 gets stuck therein in the end position; however, the hooking shaft 122 can also proceed along the arc of the hooking recess 116 such that the crimping end of the crimping pin 120 does not get any closer to the clamping portion 118b), but in the end position the clamping portions 118a, 118b cannot be brought any closer anyway due to the clamping portions 118a, 118b coming into contact with each other.

The crimping device is therefore operated by turning the hooking handle 106 forward (to the position that is shown in FIG. 29) to perform the actual crimping, then, by turning the hooking handle 106 backwards the moving portion 104 is removed from the base portion 102, and then the connector part 11 (together with the optical conduit fixed therein by crimping) can be removed from the crimping device. After that, another optical conduit can be crimped in another connector part 11. The connector part 11 is of course arranged in the crimping device such that the optical conduit is arranged in the conduit channel thereof (in the conduit channel 45, see FIG. 6; for the sake of simplicity the conduit is in many cases not shown in the figures), because without it the crimping would not make sense. Due to the configuration of the support end 126 of the support element 124, in case the optical conduit extends into the conical region of the head portion 18 (with the connector part 11 being inserted), it will be pushed in place by the support end 126 pushed forward by the resilient element 140. Because of that, it could be expedient to push the cable end into the conical region to some extent, because in such a case it can be positioned accurately applying the crimping device.

The position in which the crimping operation is performed is shown in FIGS. 30A and 30B. Here, the hooking handle 106 is in the same orientation as in FIG. 29, but in these figures there is also shown the connector part 11 to be crimped, i.e. wherein the optical conduit (for example, optical cable) is secured by crimping.

As shown in FIG. 30A but can be better observed in FIG. 30B, the crimping end 144 is pressed into the stem 19 of the connector part 11. Said crimping end is preferably pressed in the stem by being pressed into the stem 19 that is made of a first metal the crimping end 144 of the crimping pin 120 made of a second metal that is harder compared to the first metal. The material of the stem 19 is preferably selected such that the pressing-in of the crimping end also causes the indentation of the conduit channel extending along the stem 19 in order that the optical conduit arranged therein is secured in a given position. In FIG. 30B, a distance D3 corresponds to the value of the crimping indentation. This value is essentially identical to the size of the crimping protrusion indicated in FIG. 20B (with a conduit channel of the same size, it can have the same absolute value, or more generally, can have the same ratio relative to the diameter of the conduit channel).

As shown in FIG. 30B, the crimping end 144 has an essentially frustoconical shape (conically narrowing towards the apex and sliced off by a plane perpendicular to the longitudinal axis). A crimping end having such a shape is expediently applied because due to the conical shape it can be effectively applied for making an indentation, while thanks to the blunt configuration terminated in a flat face it typically does not cut into the crimped material and only forms an indentation with well-defined dimensions.

In FIG. 30B it is also shown that in the illustrated crimping position the clamping portions 118a, 118b are closed together around the stem 19 (with the clamping portion 118a already being fitted against the facing edge of the head portion 18) as they are provided with a notch corresponding to the stem 19 (see also in the subsequent figures), from which the crimping end 144 protrudes. Thereby, the clamping portions 118a, 118b can be closed together in the crimping end position, and only the crimping end 144 gives an effect, makes a permanent deformation in the stem. In the above described manner, a high-quality, well-controllable crimped joint of the optical conduit and the connector part can be produced.

Figure 31:
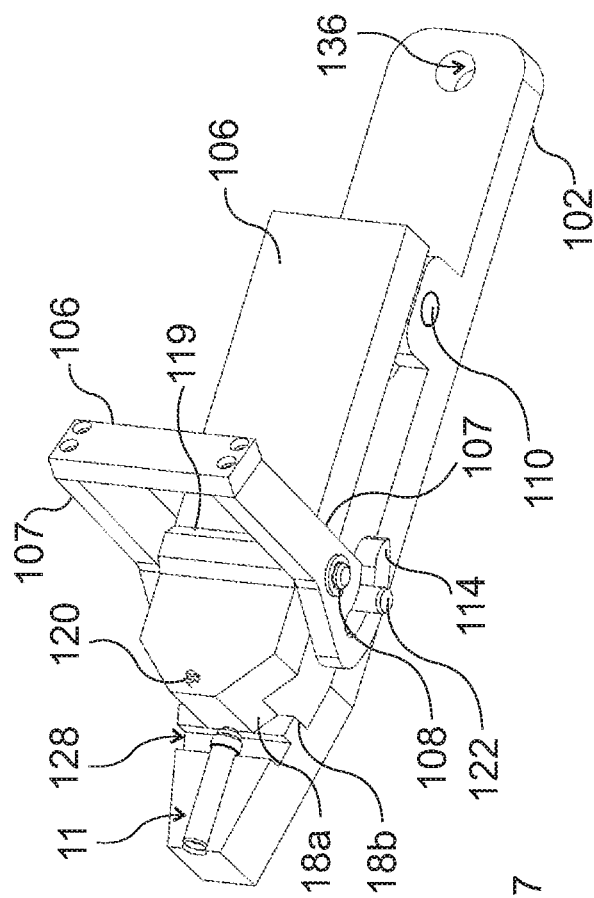
FIG. 31 shows a first view of the embodiment of the crimping device shown in FIG. 24.
Figure 32:
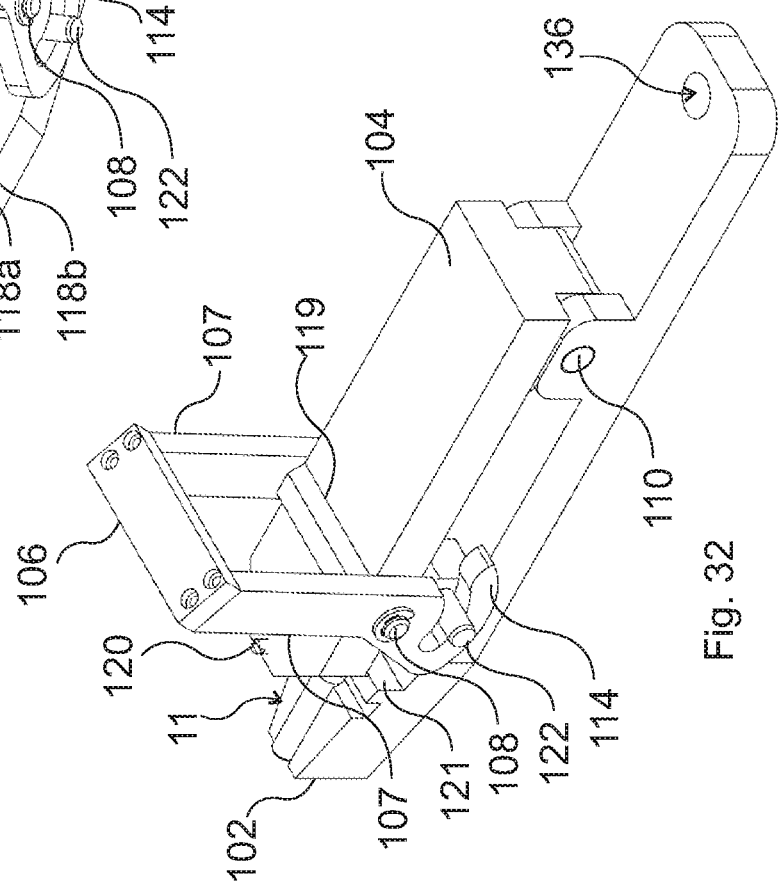
FIG. 32 shows a second view of the embodiment of the crimping device shown in FIG. 24.

In FIGS. 31 and 32, the embodiment of the crimping device illustrated above can be seen in spatial drawings, in the state wherein crimping of the connector part 11 is being performed, i.e. when a respective handle shank 107 of the hooking handle 106 is hooked in each end of the hooking shaft 122. It is shown in FIG. 31 that the moving portion 104, which, starting at the axis of rotation 110, forms a wide component adapted to exert a large force, slightly narrows down at the clamping portion 118a. Such narrowing does not affect the force that can be exerted, because in that region a concentration of force is required. Likewise, the base portion 102 also has a robust configuration.

FIG. 31 therefore also illustrates that the clamping portions 118a, 118b are pressed against each other such that, as soon as the hooking handle 106 is hooked in the hooking shaft 122 at both ends in order to exert a larger force, the connector part 11 is clamped by them. Based on the configuration it can be seen that, due to the robust configuration and to the mechanism applied at the hooking handle 106, the illustrated crimping device can exert a very large pressure force during crimping.

In FIG. 32 it is also shown that the base portion of the hooking handle 106 is affixed to the handle shanks 107 by screws (four screws on each side), while the configuration of the protrusion 119 situated at the axis of rotation 108 can also be observed. In FIG. 32 the manner of clamping the axis of rotation 110 is also shown: the shaft ends are introduced in a respective protrusion, and a pass-through portion of the protrusion arranged on the corresponding end of the moving portion 104 extends between these two protrusions, where the axis of rotation 110 (shaft) extends further outward from the pass-through portion.

Figure 33:
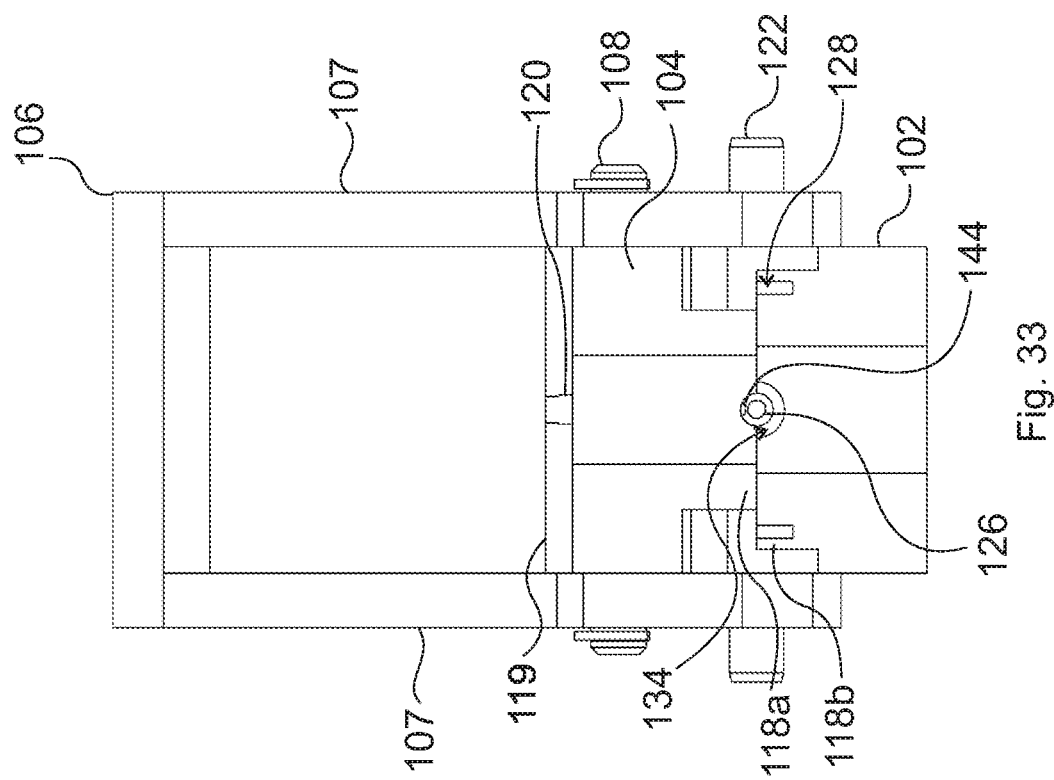
FIG. 33 is a front view illustrating the embodiment of the crimping device illustrated in FIG. 24 in a closed state.

In FIG. 33, like in FIGS. 31-32, the crimping device is shown in the crimping position, but this figure shows it in front view (i.e. looking from the outward end of the trough 134) with the connector part 11 not being arranged in the crimping device. In this view, the widening end of the base portion 102 and the trough 128 formed therein at a certain width are shown head-on. Because the device is viewed head-on, the trough 134 appears to have an exactly semicircular shape.

Figure 34:
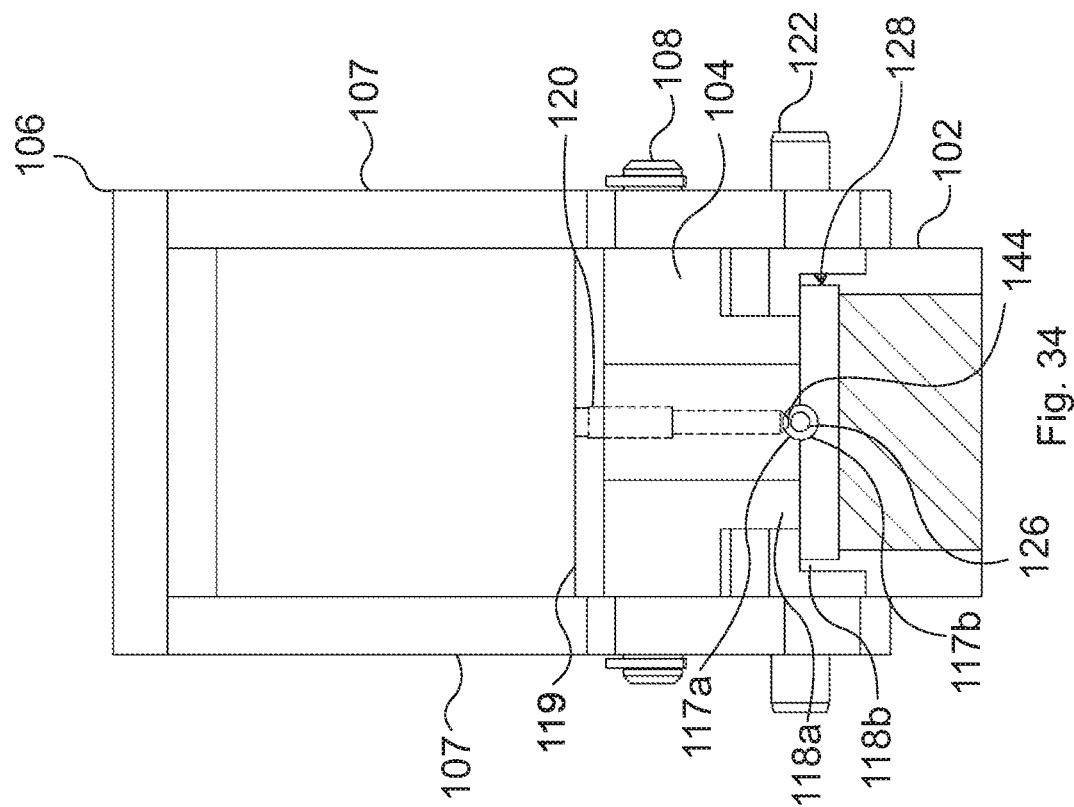
FIG. 34 is a drawing showing a sectional view that is taken along a plane perpendicular to the longitudinal axis of the embodiment of the crimping device of in FIG. 24

In FIG. 33, through the trough 134 the mutually contacting edges of the clamping portions 118a, 118b are visible, and furthermore, as the connector part 11 is not included in the figure, we can see through the circular opening that is formed, at the location where the clamping portions 118a, 118b meet each other, by the semicircular cross-section clamping recesses formed therein (see also FIG. 34). These clamping recesses are adapted for receiving the stem 19 of the connector part 11, i.e. the clamping portions 118a, 118b encompass the stem 19 by means of the clamping recesses. Because in FIG. 33 the connector part 11 is not included, it can also be observed that the crimping end 144 of the crimping pin 120 protrudes into this circular opening, i.e., if the connector part 11 was included, then said end would protrude into the stem 19 thereof. Through the circular opening the circular, blunt end portion of the support end 126 of the support element 124 is visible that is fitted against the conical side wall of the head portion 18 of the connector part 11. In FIG. 33 the narrowing end of the moving portion 104 is also shown, and the crimping pin 120 is also shown in addition to other components of the crimping device that can also be seen in other figures.

In FIG. 34, the above described embodiment of the crimping device is also illustrated in front view, showing a section across the trough 128 (the sectional portion under the trough 128 is hatched in the drawing). Corresponding to the sectional view, on the base portion 102 the clamping portion 118b widening further with respect to the hatched portion is shown in the figure. The moving portion 104 and the clamping portion 118a are illustrated similarly as in FIG. 33, except that the crimping pin 120 is shown in dashed lines such that the arrangement thereof inside the clamping portion 118a can be observed in the figure. In this figure there are shown the semicircular clamping recesses 117a, 117b formed in the clamping portions 118a and 118b, respectively (together they form a circular opening), with the crimping end 144 of the crimping pin 120 being shown therebetween.

In FIGS. 35 and 36, a further embodiment of the crimping device according to the invention, configured in a pliers-like manner is illustrated. Because the optical connectors (pins) are arranged in a grid (matrix), it is not expedient to utilise the crimping pliers sideways, i.e. it is expediently used frontally. In the present embodiment, the crimping device comprises clamping portions 177 and 178 that, by way of clamping recesses 185 shown in FIG. 36, are adapted for clamping the stem of the first head unit of the first connector part of the connector structure, with an axis of rotation 179 providing that the clamping portions 177, 178 are movable relative to each other.

In contrast to the above described embodiments of the crimping device, in the embodiment of FIGS. 35 and 36, a first crimping pin 182 and a second crimping pin 184 is arranged in the first clamping portion 177 and in the second clamping portion 178, respectively (the crimping pins are adapted for performing the crimping operation, i.e. for producing a crimp). The introduction of these pins into the receiving recesses is also illustrated in FIG. 36, but it can be observed in FIG. 35 that they extend towards the end portion of the clamping portions 177, 178. In a manner shown in FIG. 35, they do not reach the most protruding portion of the clamping portions 177, 178 because they do not reach as far as that but only as far as the clamping recesses 185 shown in FIG. 36.

In FIGS. 35 and 36 a support element 180 (the support element can also be called a support pin or positioning pin) is also shown that comprises a support end 181. As with the embodiment illustrated in the figures described above, crimping is performed in the present embodiment such that the conical side wall of the conical region disposed on the head portion 18 of the connector part 11 is placed on the support end 181 of the support element 180, and then the clamping portions 177, 178 are pressed tightly on the stem 19 of the connector part 11, forming thereon—in this case, on both sides—the crimping indentations. The support element has a conical end that fits into the head of the pin (into the head portion of the connector part), and thus the optical fibre can be inserted through the connector housing element (barrel). The support pin is also adapted for positioning the head portion and the optical fibre relative to each other, as the latter is inserted until it is stopped. After that, the pliers are simply closed. Thereby, the optical fibre is secured in an appropriate position, while the adjustable crimping means are applied for making the appropriate crimp (a crimping indentation of the appropriate depth and size is formed). After crimping has been performed, the pin (the first head unit of the first connector part) can be pushed inside the sleeve (the connector insert) in the pylon (the latter is a type of interface, such as for example the connector board 66a).

It is noted that in the case where only one of the crimping pins 182, 184 extends into the clamping recess 185, a crimping indentation is produced only on one side.

As shown in FIG. 35, the first clamping portion 177 is formed at the end of a second handle shank 176, and the second clamping portion 178 is formed at the end of the first handle shank 175, such that the handle shanks 175, 176 are interconnected by an axis of rotation 179 (shaft). Corresponding to the pliers-like configuration, therefore, the clamping portions 177 are arranged right opposite the handle shanks 175, 176. Due to the force relations of the setup, it is very cumbersome to produce the appropriate degree of transmission applying the "pliers-shaped" configuration. Therefore, it is preferable to apply instead the above described crimping device that resembles the configuration of a stapling machine, wherein an eccentric configuration is applied for transferring the significant forces. By that it is meant, according to the above, that the constrained path is not arranged centred relative to a pivot point. Thus, the crimping device is pressed gradually during crimping. This eccentricity can increase the applied force. In an exemplary configuration, a compression of approximately 1.5 mm corresponds to one-fourth of a rotation (a displacement of approximately 80-100 mm).

In the subsequent figures, an embodiment of the push-out device according to the invention is illustrated, the device being adapted for pushing out (removing) an optical conduit from a connector part (for example, from the connector part 11 shown in the above described figures), i.e. for releasing a crimped joint. The push-out device according to the invention is adapted for pushing out an optical conduit from a connector part, which connector part comprises a head unit comprising a stem and a head portion, a conical receiving space part in the head portion, having a conical side wall and widening in the direction of the end portion of the head portion situated opposite the connection thereof to the stem, and a conduit channel configured to open into the end portion of the conical receiving space part being at the stem and adapted to receive an optical conduit. In particular, the first connector part 11 of the connector structure according to the invention described above is such a connector part, however, the push-out device according to the invention is also suitable for application with all such connector parts that have the above described features (for example, also for configurations without a spring). The push-out device is intended to be used with such a connector device; the connector part of course does not form a part of the push-out device.

In the embodiment illustrated in the figures, the push-out device comprises a push-out stem 152 (it can also be called a push-out element), and the push-out stem 152 has a push-out pin 168 (it can also be called a needle element, push-out needle element, or push-out end portion) adapted to be introduced into the conduit channel of the connector part (in the figures, the first connector part 11) upon the connection thereof at its push-out end, and an operating end portion and at its operating end. The push-out device further comprises a (typically tubular-shaped) push-out housing element 150 receiving the push-out stem 152, having—at one end—a conical first housing end portion for being fitted against the conical side wall of the conical receiving space part of the head portion of the connector part (in the figures, the connector part 11), wherein the conical first housing end portion comprises an outlet opening 172 adapted for leading out the push-out pin 168, and having—at its other end—a second housing end portion adapted to allow the operation of the operating end portion (e.g. by providing a protruding end of the push-out stem).

According to the above, the push-out device has a configuration resembling a ballpoint pen, wherein a push-out stem extends through the push-out housing element of the device, the push-out stem being operated, i.e. pushed out when the push-out device has been placed on the connector part from which the optical conduit is to be removed. Therefore, as soon as the conical end of the push-out device is inserted in the conical receiving portion of the head portion of the connector part, the optical conduit can be removed therefrom applying the push-out pin of the push-out stem.

In FIG. 37, an embodiment of the push-out device is shown in a view wherein the sectional view of the push-out device is interrupted due to its elongated shape. In FIG. 37 it is shown that in this embodiment the operating end portion projects out from the push-out housing element 150, and an operating cap element 154, having a dimension (measured) perpendicularly to the longitudinal axis of the push-out stem 152 that is greater than the operating end portion is connected to the operating end portion. The push-out stem 152 can be prevented from sliding into the push-out housing element 150 by the operating cap element 154 (besides other configuration features). In FIG. 37—at the slightly narrower end of the push-out housing element 150—a conical first housing end portion 158 is also shown that is to be inserted into the conical region of the connector part when the push-out device is operated. An opening angle DEG (cone angle) indicated in FIG. 37 is, like the angle of the receiving space part 35 of the connector part 11 and the support end of the support element is preferably 90°, such that the receiving space part 35 fits on both the housing end portion 158 and the support end of the support element.

In FIG. 38, a view of the push-out device can be seen that is similar to the one shown in FIG. 37 but showing the push-out device at its entire length. In FIG. 39—showing a sectional view taken along a line F-F of FIG. 38—the push-out device is shown at its entire length.

Accordingly, in FIG. 39 the internal structure of the illustrated embodiment of the push-out device is shown. In a manner illustrated also in FIG. 39, at its portion arranged inside the push-out housing element 150 the push-out stem 152 comprises a (second) widened portion 162, an abutment edge 166 adapted for providing abutment for the widened portion 162 is formed in the inner space of the push-out housing element 150 in the region extending from the second widened portion 162 towards the second housing end portion, and a fourth resilient element 170 supported against the first housing end portion 158 from inside (i.e. the inside of the conical housing end portion 158) and the push-out stem 152 at the joint of push-out stem 152 and the push-out pin 168 (i.e. where the push-out stem 152 continues in the thinner push-out pin 168) is arranged in the inner space of the push-out housing element 150 about the push-out pin 168. The push-out stem 152 is preferably arranged in the push-out housing element 150 such that it has a front portion 156 and a rear portion 157 that are joined by means of a thread 160.

In a manner shown in FIG. 39, in the region extending from the widened portion 162 towards the first conical housing end portion 158 there is also formed a second abutment edge 164, however, the latter is only optionally included also in this embodiment. Essentially the only reason for applying such a configuration feature is the narrowing of the channel of the push-out housing element 150 adapted for receiving the push-out stem 152, but such a narrowing can also be realised otherwise, for example by gradual narrowing. As the push-out stem 152 is guided, the width of the channel extending inside the push-out housing element 150 corresponds, between the abutment edges 164, 166 to the width of the widened portion 162, and along the rest of the element—disregarding the region of the push-out pin 168—to the width of the push-out stem 152.

The configuration of the push-out pin 168 is shown in FIG. 39. According to the figure, the diameter of the push-out pin 168 is much smaller than the diameter of other, general portions of the push-out stem 152 (according to the figure, the diameter of the push-out pin 168 is smaller than one-third of the diameter of the push-out stem 152; so the diameter of the push-out stem 152 utilised for the comparison is therefore not measured at the widened portion 162 but in a generic portion). Like the push-out stem 152, the push-out stem 168 preferably has a circular cross section, the longitudinal axis thereof being coincident with the longitudinal axis of the push-out stem 152.

According to FIG. 39, the push-out pin 168 can be pushed out from the centre of the conical housing end portion 158 of the push-out housing element 150, i.e. the housing end portion 158 comprises, at the centre of the conical configuration, an outlet opening 172 opens into a channel, the outlet opening 172 slicing off the conical end which thus has an essentially frustoconical shape. The push-out pin 168 can be pushed out from the push-out device via a channel opening from the outlet opening 172.

In order that the push-out pin 168 does not stay in the pushed-out state during the operation of the push-out device, the above-mentioned resilient element 170 is arranged in the push-out housing element 150. To push the push-out pin 168 outward, a force has to be exerted against the resilient element 170, while in case the operating cap element 154 is released, the push-out stem 152 is brought in its original position by the resilient element 170, i.e. in a position wherein it abuts against the abutment edge 166.

Figure 40:
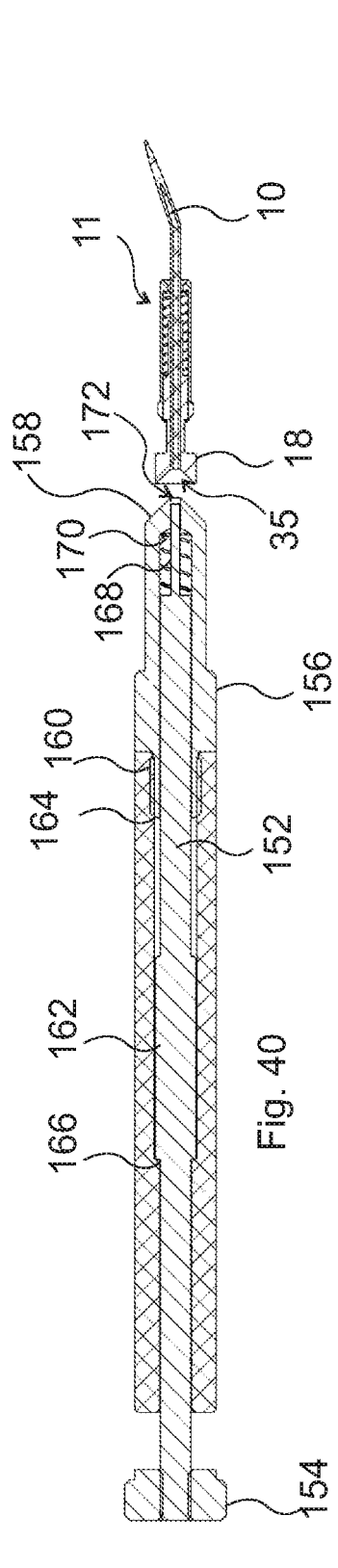
FIG. 40 shows, in a sectional view (taken along a section C-C of FIG. 41), the embodiment of the push-out device shown in FIG. 37 with the first connector part arranged.
Figure 41:
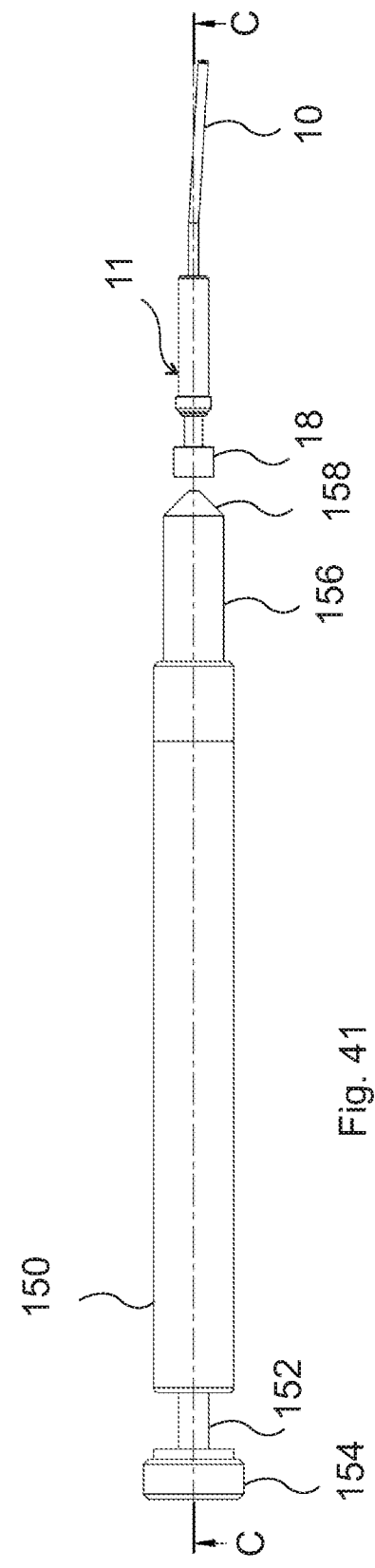
FIG. 41 illustrates in a spatial drawing the arrangement of FIG. 40.

In FIGS. 40 and 41, the above described embodiment of the push-out device is shown together with the connector part 11 adapted to be connected thereto (in FIG. 41 the line C-C is indicated along which the section of FIG. 40 is drawn). In this case, by connection it is meant that the conical receiving space part 35 of the head portion 18 of the connector part 11 is placed on (tightened against) the conical housing end portion 158 (the cone angle of the conical receiving space part and that of the conical housing end portion 158 are preferably identical). It can be observed that in the illustrated embodiment the extension of the conical housing end portion 158 measured perpendicularly to the longitudinal axis is larger than that of the conical receiving space part 35, i.e. the push-out housing element 150 has a bigger cone compared to the conical recess disposed in the connector part 11. These components can even have an identical dimension measured perpendicularly to the longitudinal axis, or that of the housing end portion 158 can be smaller.

Unlike in FIGS. 40 and 41, in FIGS. 42A and 43 the push-out device and the connector part 11 are already mutually connected, and the push-out pin 168 is pushed into the connector part 11 in order to remove the optical cable 10 therefrom. In FIG. 42B, a detail of FIG. 42A showing the contact region between the push-out device and the connector part 11 is shown in a magnified view.

FIG. 42A illustrates that when operating the push-out device, the push-out pin 168 is preferably pushed further than ("overpushed" with respect to) a crimping position P1 (for example, the centre of a crimping indentation) by a distance D4, such that the crimp can be adequately "evened out" and the optical cable 10 can be removed from the crimped, fixed position (thereby the secure removal of the optical conduit can be ensured, and it can be provided that at a later time another optical conduit can be fixed therein applying the crimping device). With an optical cable having a diameter of 1 mm, for example, the distance D4 is approximately 2 mm. It can be seen that in this position the resilient element 170 is in a completely compressed state between the widened portion of the push-out stem 152 and the terminal edge of the internal channel of the push-out housing element 150. In FIGS. 42A and 43 it is also shown that in this position the operating cap element 154 also abuts against the end of the push-out housing element 150, i.e. the extent to which the push-out pin 168 can be "overpushed" is determined by how much the operating cap element 154 can be pushed onto the push-out housing element 150 (in the completely pushed-in state of the operating cap element 154, the edge of the widened portion 162 does not reach the second abutment edge 164, so the end position is not defined by it).

The conical end of the push-out device is therefore fitted into the inverted cone of the connector part. The push-out device thus has a push-out pin that is urged backwards by a spring such that in the base state it does not protrude from the device (and the push-out pin is not damaged). When the push-out device (tool) is pushed into the conical part of the head portion of the first connector part, the first connector part is preferably compressed. The fully compressed first connector part cannot return resiliently to its uncompressed state. Thus, in this state of the connector part, the push-out pin is pushed out from the push-out device by applying pressure on the end thereof, much like pressing on the end of a pen. The stroke of the push-out pin is adjusted such that it travels approximately 2 mm over/behind the crimp of the first connector part, i.e. with a fibre having a diameter of 1 mm, twice the amount of the diameter. Thereby it is ensured that the fibre is pushed out from the crimp in all cases. The pushed-out fibre can be reinstalled in a new pin in a manner described above in relation to crimping.

In FIG. 42B it is shown (in a magnified view) how the push-out pin 168 is pressed in the conduit channel of the connector part 11 from where it pushed out the optical cable 10. In FIG. 42B it is clearly shown that the push-out pin 168 has a slightly smaller diameter than the conduit channel receiving the optical cable 10 such the it can be comfortably displaced inside the conduit channel, i.e. does not get stuck therein. The diameter of the conduit channel is typically slightly greater than the diameter of the optical conduit arranged therein (see for example the above specified dimensions and tolerances). In such a case (with a conduit channel having a diameter of approximately 1 mm) the manufacturing dimension limits of the push-out pin 168 are: minimum 0.85 mm, maximum 0.92 mm. Generally speaking, therefore, the diameter of the push-out pin is about 85-92% the diameter of the conduit channel. In FIG. 42B there can also be seen how the housing end portion 158 is fitted against the side wall of the conical receiving space part 35; the two have identical cone angles.

In the foregoing, therefore, the connector structure according to the invention, and a crimping device and push-out device therefor were described. Utilising the latter devices, the optical conduit can preferably be secured in the connector structure, and can also be removed therefrom. Applying the devices, an optical conduit can be preferably secured in the spring-actuated head unit of the first connector part of the connector structure and can also be pushed out therefrom. The non-spring actuated counterpart in the connector structure (according to the above, the second connector part 21) is preferably not fitted with a cable again during its use. This involves that it has to be replaced together with the cable (the optical conduit), because it is not mounted to the connector board applying a sleeve (connector insert). The original crimps on the connector parts are preferably produced during manufacturing. These components, and also the spring-actuated connector (first connector part) would be made applying a special machine rather than a hand tool. The hand tool is intended for the spring-actuated part, because therein occurs a more significant wear-and-tear effect, and therefore it is preferably implemented as a replaceable part.

FIG. 44A is the schematic spatial drawing (showing certain details and omitting others) of an arrangement wherein an embodiment of the connector structure according to the invention (connector structure 200) is arranged between connector boards, and a light blocking element (light closing element; the light blocking element 220 is also illustrated in a magnified view in FIG. 44B) according to certain embodiments of the invention are also shown. These embodiments will be described herebelow.

In FIG. 44A, a connector part 215 is connected to a printed circuit board 210 by means of the light blocking element. On the printed circuit board 210 there can be seen more than one connector parts fitted to different light sources applying connector inserts (connector sleeves), with the optical conduit coming from the connector structure 200 being introduced into one of them, and with another one being lifted up (in accordance with the figure, the connector part fitted with the light blocking element and the connector arrangement—interconnected with the optical conduit—can be regarded as parts of a single common arrangement). The connector parts are typically adapted for testing LEDs affixed to the printed circuit board 210 applying the so-called surface mount technology. FIG. 44A also illustrates the arrangement, on the printed circuit board 210, of other components that do not play a role in the present invention.

In FIG. 44A, the connector part with a spherical end portion of the connector structure 200 leads towards the printed circuit board 210 via a second optical conduit 209, while the connector part having a conical end portion leads to a LED analyzer 205 via a first optical conduit 208, with the optical conduits leading thereto from the connector structure 200 being connected applying connectors 207 (for the sake of clarity, only a single optical conduit is shown in FIG. 44A). Accordingly, the LED analyzer 205 is adapted for testing LEDs arranged on the printed circuit board 210 (if another light source is applied, an analyzer corresponding thereto is selected). Utilising the connector structure and the light blocking element according to the invention, the optical signal of the LEDs can be expediently transferred to the LED analyzer 205 in a manner illustrated in FIG. 44A. The light blocking element is preferably made of plastic.

The light blocking element and also the type of connector part it is applied for can be observed in FIG. 44B and in FIG. 44C, the latter illustrating a magnified detail of the former (the components visible in FIG. 44B will also be specified below). The light blocking element according to the invention is adapted to be applied with a connector part comprising

- a head unit comprising a head portion (in the embodiment according to FIG. 44B, for short, in FIG. 44B, a head portion 222) at its first end, a widened portion (in FIG. 44B, a widened portion 214), and a stem (in FIG. 44B, a stem 219) interconnecting the head portion and the widened portion and providing that the head portion and the widened portion move together in case of a displacement of the head unit,
- a connector housing element (in FIG. 44B, a connector housing element 212) having a third end and a fourth end opposite the third end, and the connector housing element 212 receives the widened portion at the third end and retains it in its inner space by means of a first inward extending edge portion (in FIG. 44B, an edge portion 216) formed at the third end about the stem, and
- a resilient element (in FIG. 44B, a resilient element 213 that, similarly to the above, is really supported against the widened portion) arranged in the inner space of the connector housing element, supported against the widened portion and against a second inward extending edge portion (in FIG. 44B, an edge portion 217) formed at the fourth end of the connector housing element, and a conduit channel interconnecting the fourth end of the connector housing element and the end portion of the head portion situated opposite the connection to the stem, encompassed by the resilient element, and adapted for arranging an optical conduit is formed in the connector part.

Accordingly, the light blocking element is applied for a connector part that has a number of features of the connector part 11 described above (the connector part 11 can even be applied unchanged), however, the conical end included therein is not required to be included in this connector part. For example, the head portion is wider than the stem, but it is not necessarily so.

Although the connector part does not form a part of the light blocking element according to the invention, the connector part for which it can be applied is defined. However, the connector part and the light blocking element (i.e. the connector part provided with a light blocking element) could also be treated as a single component.

In FIGS. 44B and 44C it is also shown (also see the subsequent figures that contain even more details) that the light blocking element according to the invention comprises

- a skirt portion (in the embodiment of FIG. 44C—or for short, in FIG. 44C—a skirt portion 224; it could also be called a mantle portion or enclosing portion) arranged at least partially around a light source receiving space part (in FIG. 44C, a light source receiving space part 223 that, in case a LED is applied as a light source, often also at least partially receives the LED housing corresponding to the LED) adapted for at least partially receiving one or more light sources (in FIG. 44C, the light source is a LED 226 that is not part of the invention) arranged on a printed circuit board, and
- an inlet opening opening into the light source receiving space part, the light blocking element is configured such that
- the head portion of the connector part is connectible to the inlet opening from a direction opposite the light source receiving space part in a light-blocking manner, and
- it provides light blocking for the one or more light sources in case the light blocking element is connected (fitted, applied, connected onto) to the one or more light sources arranged on the printed circuit board and the connector part is connected to the inlet opening (i.e. when the connector part provided with the light blocking element is applied—of course placed in its designated position—to the one or more light sources to be tested). In other words, providing light blocking means that the light blocking element provides that only light emitted by the received one or more light sources may enter the optical conduit that is arranged in the connector part, i.e. the conduit channel thereof, i.e. external light (outside or "false" light) is prevented from entering the optical conduit.

By the connection of the head portion in a light-blocking manner it is meant that it is connected at the inlet opening such that the connection blocks light (i.e. the applied slide-in configuration is implemented sufficiently tightly so that light does not penetrate between the contact surfaces); as it will be shown below, this can be implemented by providing that the head portion of the connector part contacts the inner wall of the introducing tubular portion circumferentially. Providing the light-blocking connection of the head portion and light blocking by the skirt portion means that light blocking is provided applying the light blocking element in all the required directions, so the light of the light source to be tested can exit only through the optical conduit arranged in the conduit channel.

The light source is at least partially received by the light source receiving space part, by which it is meant that it may conceivably be sufficient to only partially receive the light source therein for providing light blocking. By light blocking it is meant that "false" light is prevented from entering the arrangement, which is obtained by obstructing applying the light blocking element. The light blocking element effectively provides that only light emitted by the light source(s) under test (typically, a LED or LEDs that is/are received at least partially in the light source receiving space part and is/are encompassed by the skirt portion) may enter the optical conduit to be connected by means of the connector part. Of course, in this context "light blocking" is intended to refer to the blocking of external light, the light of the received light source can exit through the connector part in the direction of the optical conduit; according to the above the intention is precisely that it exits only in that direction.

The skirt portion therefore provides light blocking for the one or more light sources received by it, irrespective of whether they are received or encompassed partially or entirely. Accordingly, the function performed by the skirt portion can alternatively be described such that it is arranged to provide light blocking through encompassing a component, or that it covers the light sources such that it blocks them from being subjected to external light (besides that, the light blocking element is configured such that the light of the light sources enclosed by the skirt portion can only reach the optical cable of the connector part connected to it). If the connector part was the only component placed on a light source to be tested (e.g. a LED) without the skirt portion, then—in lack of the skirt portion—external light penetrating from the sides could reach the optical cable of the connector part. Therefore, the skirt portion arranged around the connector part and the light source, is adapted for preventing this penetration. Because SMT LEDs can have very small size, and are mounted very close to each other, the requirement most of the time is to block the light of the immediately adjacent LED; this requirement is of course also fulfilled.

The configuration of the light blocking element 220 of this embodiment is in particular shown in FIG. 44C. A LED 226 arranged on the protrusion extends into a light source receiving space part 223 encompassed by a cylindrical skirt portion 224, and the skirt portion 224 is seated on the base shown in the figure (i.e. on the printed circuit board), light blocking is thus ensured. The skirt portion 224 is that portion of the light blocking element 220 that is arranged around the light source receiving space part 223, however, in this embodiment, the entire light blocking element 220 is configured applying a cylindrical wall implemented as the continuation of the skirt portion 224.

As it will be demonstrated below, since in the illustrated embodiments such a cylindrical head portion is applied that has a circular cross-section taken perpendicular to its longitudinal axis, and for example has a conically configured end portion adapted to be connected to the light blocking element, in the illustrated embodiments a introducing tubular portion having inner space opens from the (above defined) inlet opening opposite the light source receiving space part (the inner space of the introducing tubular portion preferably has a circular cross section perpendicular to the axis of the inlet opening; in this respect, only the configuration of the inner space is important, its outward shape is not important), the introducing tubular portion being adapted for introducing the head portion of a connector part having a head portion having a cross section fitting to the inner space thereof (i.e. preferably a circular cross section). The axis of the inlet opening is the axis of rotational symmetry of the opening, i.e. it is perpendicular to the plane of the opening, and extends through the centre of the opening.

Besides that, in the illustrated embodiments, an end position edge (flange) defining an end position of the introduction of the head portion is formed at the inlet opening. The end position edge has a circular cross section, but it can also be applied with introducing tubular portions with other cross-sectional shapes, and with other shapes of inlet opening. In the illustrated embodiments, the inlet opening is defined by the end position edge because it defines the extent to which the head portion of the connector part can be pushed inwards from a direction opposite the light source receiving space part.

The introducing tubular portion (introducing extension; it may have a different cross sectional shape) having the above listed features, and the above described end position edge therefore offers a particularly preferable manner of connecting the connector part to the light blocking element, however, it can conceivably also be connected (affixed to the light blocking element) in a different manner.

As can be understood from the above description, the end of the connector part facing the light blocking element is not required to be conical, even in the more preferred case above. Therefore, said end can be flat (circle) through which the end optical conduit can be passed. At the same time, as it will be shown below, in the subsequent embodiments the end of the head portion facing the light blocking element preferably has a conical-like shape.

It will also be seen that in the illustrated embodiments it preferably also holds true—particularly at the outward-lying portion of the light source receiving space part—that the cross section of the light source receiving space part perpendicular to the axis of the inlet opening (i.e., typically the cross section—taken perpendicular to the axis of the inlet opening, or in other words, parallel to the PCB that holds the light source when the light blocking element is placed thereon—of the skirt portion that continues the inlet opening) has a rectangular or rectangle-like, or a triangular or triangle-like shape. This condition is considered to be fulfilled also in the embodiment of FIGS. 49A-49F, even though the skirt portion 294 does not extend fully circumferentially around the light source receiving space part 293 due to a protruding portion 299 of the LED housing 295.

In FIGS. 45A-45H, a further embodiment of the light blocking element is illustrated in various views and positions. A light blocking element 250 according to this embodiment can be easily observed in the spatial drawings of FIGS. 45A and 45B. In FIG. 45A, the light blocking element 250 is shown mounted (connected) to the connector part 215. In comparison also with FIG. 45B it can be seen that the light blocking element 250 is pulled on a head portion 256 of the connector part 215 (it stucks thereon to provide a mutual connection).

In all of the applied configurations of the skirt portion or jacket portion the intention is that they are situated as close to the sides of the LED as possible in order to reduce the volume of the inner space around the light source and maximise the transmission of light waves (i.e. minimise losses).

In FIG. 45A the portions of the light blocking element 250 are shown, i.e. an introducing tubular portion 251 and a wider skirt portion 254. The figure also shows that at the portion where the head portion 256 is introduced, the introducing tubular portion 251 is provided with a conical introduction portion 248 to facilitate the introduction of the head portion 256 into the introducing tubular portion 251.

In FIG. 45A a LED housing 255 (LED casing) is also shown that has a lowered LED 257. In FIG. 45B there is shown how the LED housing 255 is fitted inside the light source receiving space part 253 (this is marked for example in FIG. 45H). In FIG. 45B it is also shown that the head portion 256 has a conical side wall 258 that is a "positive" conical surface, i.e. it narrows inwardly. There can also be seen the end of the optical conduit 259 encompassed by the conical side wall 258.

In FIG. 45C the arrangement of the LED housing 255 in the light blocking element 250 is also shown in an underside view. In accordance with the underside view, the skirt portion 254 can be seen around the LED housing 255, with an outline as shown in FIG. 45B. Around this portion, the shoulder portion of the connector part 215 (two circular arcs) can be seen. FIG. 45D is also an underside view, but without the LED housing 255. Accordingly, in the light source receiving space part 253 there can be seen the end of the optical conduit 259.

Like in FIG. 45B, in FIG. 45E the connector part 215 and the light blocking element 250 are shown in a separated state. In the figure there can be observed the conically terminated shape of the head portion 256, as well as other configuration details of the connector part that, also in accordance with FIG. 44B, are similar to the configuration details of the above described connector part 11. In FIG. 45E, the light blocking element 250 is shown from the direction of its wider side.

In FIG. 45F, the connector part 215 and the light blocking element 250 are mutually connected, and a section plane A-A is also illustrated, with the sections taken along it being seen in FIG. 45G and FIG. 45H, with and without a LED housing 255. In FIG. 45G it is illustrated that, according to the configuration the LED 257 will be situated opposite the end of the optical conduit 259, such that a very effective light transmission between these components is provided. It is shown in FIG. 45G that the internal space of the light blocking element 250 is configured such that it follows the shape of the LED housing 255 (of course, a small gap is left between them such that the light blocking element 250 can be placed on the LED housing 255). In FIG. 45H—that does not show the LED housing 255—the shape of the light source receiving space part 253 can be well observed. In FIG. 45G there can also be observed an end position edge 252 that defines an end position until which the head portion 256 can be pushed into the light blocking element 250, and it is also shown that the terminal edge of the LED housing 255 facing the head portion 256 protrudes between the end position edge 252 and the end of the head portion 256.

In FIGS. 45I-45K a LED housing 225 similar to the one applied in the embodiment of FIGS. 45A-45F is shown (in various views, i.e. in side view, top view, spatial view), with a LED 227 seated in the LED housing 225 like the LED 257. The LED housings 225 and 255 are different in that the LED housing 255 has rounded corners, while the corners of the LED housing 225 are not rounded. Receiving the light source is of course also meant to include the at least partial receiving of a LED housing comprising such LED by the light source receiving space part.

FIGS. 46A-46H show another embodiment of the light blocking element, designated with a reference numeral 260, that can be applied with a LED housing 265 and LED 267 having a different configuration than the previous embodiment. In FIG. 46A, the light blocking element 260 is shown mounted to the connector part 215, while in FIG. 46B it is shown separated therefrom. In FIG. 46A an introducing tubular portion 261 of the light blocking element 260 is shown, a skirt portion 264 thereof, and a light source receiving space part 263 encompassed by the skirt portion 264. In FIG. 46A, a LED 267 can also be observed.

In addition to that, in FIG. 46B it is also shown that in this embodiment the connector part 215 has a head portion 266 that differs from the head portion 256 shown in FIG. 45B in that it has a conical shape extending in a different direction (has a conical side wall 268), i.e. an outwardly widening conical shape, as with the connector part 11.

FIGS. 46C, 46D are similar to FIGS. 45C and 45D (depictions without and with the LED housing 265), i.e. the end of the optical conduit 259 is visible, but in these figures the shoulder portion of the connector part 215 is not shown around the light blocking element 260 because the light blocking element 260 is wider relative to it.

In FIGS. 46E and 46F, respectively, the light blocking element 260 can be seen in side view (from its wider side), separated from the connector part 215 and mounted to it. In FIGS. 46G and 46H, a sectional view taken along a section A-A marked in FIG. 46F is shown, respectively, without the LED housing 265, and with the LED housing 265 being included. In these latter figures, a small difference is observable in how the light source receiving space part 263 follows the shape of the LED 267 and the LED housing 265 (this difference can be caused by the different sections shown in the drawings); both wall structures are applicable. In the sectional drawings there can be seen that the head portion 266 can be pushed inwards as far as an end position edge 262 that is followed by an interconnection channel that extends towards the light source receiving space part 263 as a part thereof. The LED 267, arranged in the light source receiving space part 263, protrudes also into this.

In FIGS. 46I-46K, a LED housing 235 similar to the one applied in the embodiment according to FIGS. 46A-46H can be seen in various views. The housing has LEDs 237 protruding at the top.

Figure 47C:
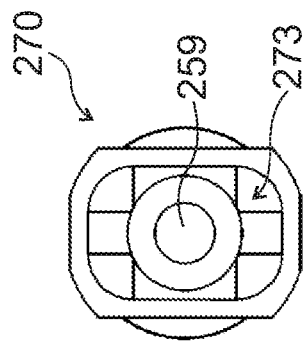
Figure 47B:
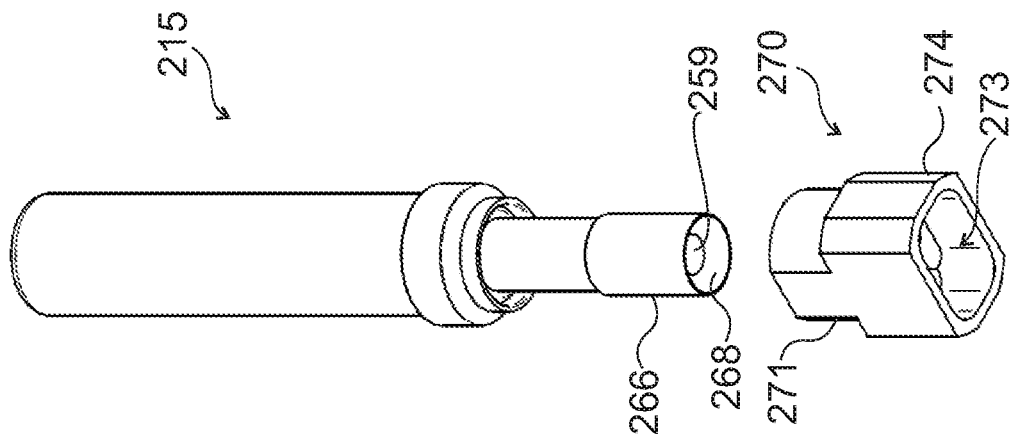
Figure 47A:
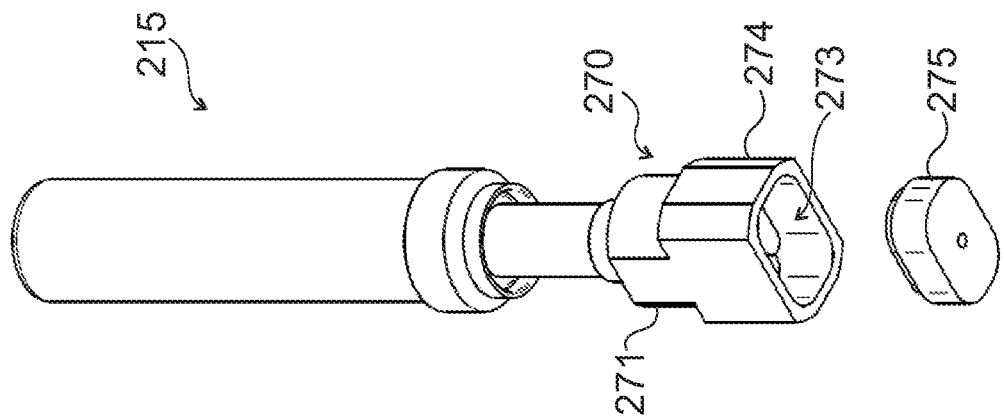

In FIGS. 47A-47F, a still further embodiment of the light blocking element is shown, marked by a reference numeral 270. This embodiment is similar to the one shown in FIG. 45A, the fundamental difference therebetween lying in the configuration of a light source receiving space part 273, and in that a connector part 215 having a head portion 266 with an outwardly widening conical end is applied. In FIGS. 47A-47B, the present embodiment can be seen in spatial drawings that show an introducing tubular portion 271 and a skirt portion 274 of the light blocking element 270, and a LED housing 275 applicable with the light blocking element 270.

In the underside view of FIG. 47C without LED, the internal configuration of the light source receiving space part 273 is shown, where—corresponding to the conically terminated light source receiving space part 273—a cross-shaped internal structure can be seen inside the light blocking element 270 (cf. FIG. 47F).

In FIGS. 47D-47E, a side drawing is shown that is similar to the above described ones. A drawing corresponding to the section indicated in the latter is shown in FIG. 47F, wherein the LED housing 275 provided with a LED 277 is shown in a sectional view. The LED 277 is a flat so-called SMD LED (surface-mounted device; it is also called an SMT LED, see above). The light source thereof faces the head portion 266 (cf. FIGS. 47G-47I). In this embodiment, the head portion 266 can be pushed inwards as far as the end position edge 272.

In FIGS. 47G-47I, a LED housing 245 that is similar to the one applied in the embodiment of FIGS. 47A-47F is illustrated; in the figures there can be seen a LED 247 disposed at the top of the LED housing 245 essentially flat therewith.

In FIG. 48A-48G a still further embodiment, a light blocking element 280 is shown; in FIGS. 48A and 48B it is shown in spatial drawings connected to and separated from the connector part 215. In FIG. 48A, a light source receiving space part 283, an introducing tubular portion 281, and a skirt portion 284 of the light blocking element 280 are shown. The shape of the cross section of the light source receiving space part 283 perpendicular to the longitudinal axis of the arrangement has a triangle-like shape (i.e. a triangular shape with cut-off corners). This is, for example, important if the light blocking elements 280 are intended to be arranged side by side, either along the side forming the hypotenuse of the triangle, or along one of the shorter sides (even forming a circle by aligning these shorter sides beside each other), there is thus more room for such an arrangement. This shape is also advantageous for preventing unintended rotations.

In FIG. 48A, a LED housing 285 (an SMT LED 287 corresponds thereto as well) is shown that is also shown in the underside view in FIG. 48D. It can be seen that for a LED housing 285 of such size and shape a receiving space part with a triangle-like shape is not required, however, by the configuration of two of its sides, the LED housing 285 also matches the shape of the receiving space part 283. The light blocking element 280 is shown in an underside view in FIG. 48C that also shows the internal structure of the light source receiving space part 283, and the end of the optical conduit 259.

In the side views of FIGS. 48E-48F, respectively, the light blocking element 280 is shown separated from and connected with the connector part 215. In FIG. 48G, the head portion 266, the light blocking element 280, and the LED housing 285 are illustrated in a section A-A of FIG. 48F. In this embodiment, the head portion 266 can be pushed inwards as far as an end position edge 282 (it can be seen that—as with the other end position edges—the internal space of the introducing tubular portion slightly narrows down at the end position edge 282).

In FIGS. 49A-49F another embodiment is shown, a light blocking element 290. This embodiment is special in that a light source receiving space part 293 is not completely encompassed by a skirt portion 294, but the light source receiving space part 293 is open at one side corresponding to a LED housing 295 corresponding to this embodiment having a protruding portion 299. A LED 297 on the LED housing 295 is a SMD LED that is mounted to the printed circuit via the protruding portion 299, i.e. it is arranged thereon with an orientation at which it is shown in FIG. 49F. Accordingly, the LED 297 is arranged to face "sideways", i.e. parallel to the printed circuit board. For a LED 297 with such a shape (the LED 297 is arranged on the portion of the LED housing 295 facing the light blocking element 290), light blocking can therefore be provided by applying a skirt portion 294 of such configuration. According to this arrangement, the connector part (and so the light blocking element 290) has to be placed on the printed circuit board sideways, i.e. in a direction parallel to the board. The skirt portion 294 is therefore lightened out at the bottom (as shown in FIG. 49F) such that it can be inserted between the LED housing 295, the LED 297 and the printed circuit board.

FIG. 49A is a spatial drawing wherein the light blocking element 290 can be seen connected to the connector part 215, in a tilted position compared to the previous figures. Accordingly, it can be well observed how the LED housing 295 and the LED 297 will be positioned in the light source receiving space part 293. Disregarding the protruding portion 299, the LED housing 295 has a rectangle-like shape (a rectangle shape with the corners cut off), with the skirt portion 294 being arranged along three of the sides and the fourth side being open.

In FIG. 49C, the light blocking element 290 and the LED housing 295 can be seen in underside view. The extent to which the skirt portion 294 encompasses the LED is shown in the figure. The printed circuit board is preferably situated at the region where the skirt portion 294 has an open configuration, with the edges of the skirt portion 294 shown in FIG. 49C being seated on the board.

In FIGS. 49D-49E, a similar side view is shown such that the view is directed at the cutout of the skirt portion 294. In FIG. 49E, a LED 297 having a LED housing 295 is arranged in the light source receiving space part 293.

In FIG. 49F it is also shown how the LED 297 and the LED housing 295 are fitted against the wall of the light source receiving space part 293. It is preferable for all embodiments to apply a tight fit, but the wall of the receiving space part does not touch the LED or the LED housing (in many cases this is required by the manufacturer). As shown in FIG. 49F, in this embodiment the head portion 266 can be pushed inwards as far as the end position edge 292.

In FIGS. 50A-54C such embodiments are shown wherein the light blocking element is configured such that it has more than one light source receiving space parts, each of them being adapted for receiving a separate connector part. Light blocking is to be meant to apply to each of the light source receiving space parts; those receiving space parts wherein no LEDs are arranged during use, or to which no connector part is connected, are disregarded.

The application of such embodiments is preferable in case the LEDs are arranged on the printed circuit board in an ordered pattern. In such a case, utilising such "bundled" light blocking elements it is preferably not necessary to apply a separate light blocking element for each LED.

The embodiment illustrated in FIGS. 50A-50C, i.e. a light blocking element 300, is applicable with multiple LEDs arranged in a row, and with the corresponding connector parts. As illustrated in the various views, the light blocking element 300 comprises six light source receiving space parts 303. It is shown in FIG. 50A how the ends of the optical conduits 259 are positioned inside the light source receiving space part 303 when the connector parts 215 are connected. In FIGS. 50B-50C, the arrangement of the six connector parts 215 is illustrated.

An embodiment that is similar to the previous one is shown in FIGS. 51A-51D (in underside view, two different side views, and in spatial view); a light blocking element 310 comprises light source receiving space parts 313 arranged in two rows. Based on the figures it can be understood that, corresponding to the arrangement of the LEDs, a block (matrix) of any size, i.e. with any number of rows and columns, can be prepared.

Figure 52A:
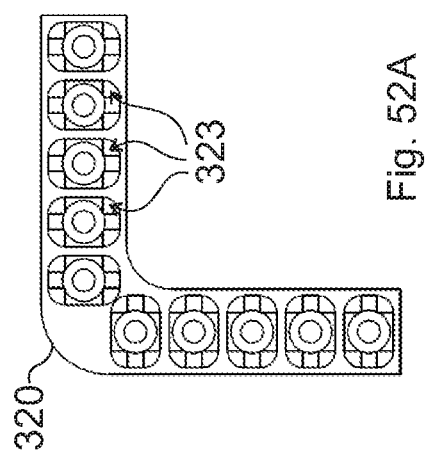
FIGS. 52A-52B illustrate in an underside view and in a side view a still further embodiment of the light blocking element according to the invention that is applicable with LEDs arranged in a V-shaped pattern.
Figure 52B:
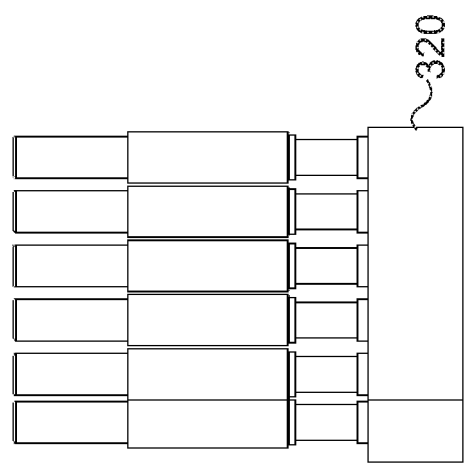

Other arrangements can also be conceived, such as for example a V-shaped light blocking element 320 illustrated in FIGS. 52A-52B. In the example, the two arms of the V are at an angle of 90°, with five light source receiving space parts 323 being included in each arm. In FIG. 52B, the light blocking element 320 is shown in side view. The view is directed at one arm of the element such that the five connector parts 215 arranged therein are visible. The other arm is shown from front, so only a single connector part 215 is visible, the others are obstructed from view.

Figure 53A:
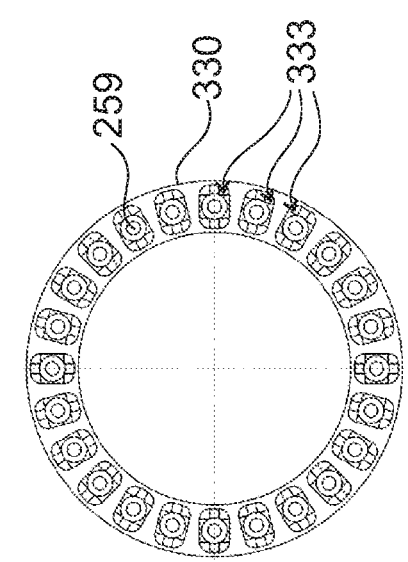
FIGS. 53A-53B illustrate in an underside view and in a side view such an embodiment of the light blocking element according to the invention that is applicable with LEDs arranged in a circular pattern, FIGS. 54A-54C, respectively, illustrate in an underside view, a side view, and in a spatial drawing such a further embodiment of the light blocking element according to the invention that is applicable with LEDs arranged along two concentric circles.
Figure 53B:
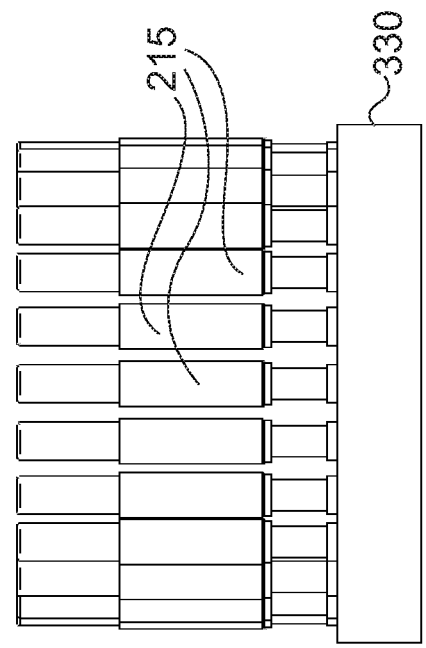

In FIGS. 53A-53B, a further embodiment, a light blocking element 330, is illustrated. In this embodiment, light source receiving space parts 333 are arranged along a circular line. The side view of FIG. 53B corresponds to this, wherein numerous connector parts 215 are partly or entirely obstructed from view.

Figure 54C:
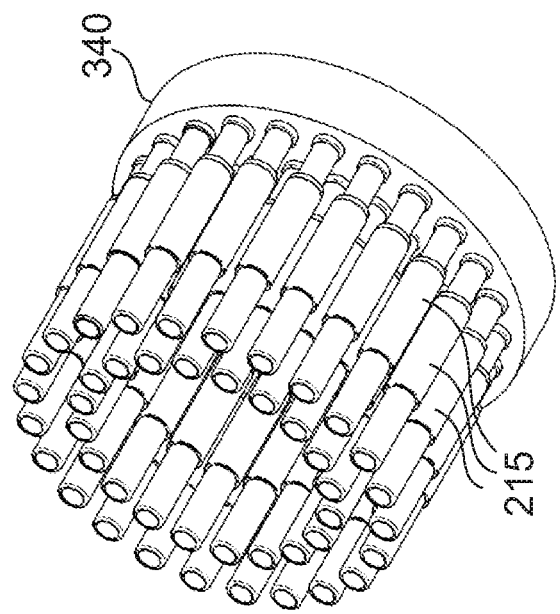
Figure 54A:
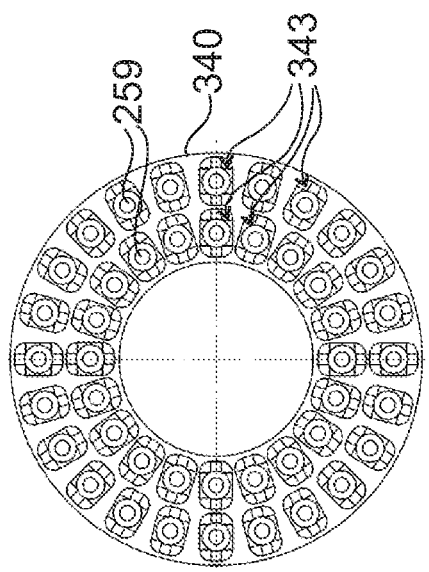
Figure 54B:
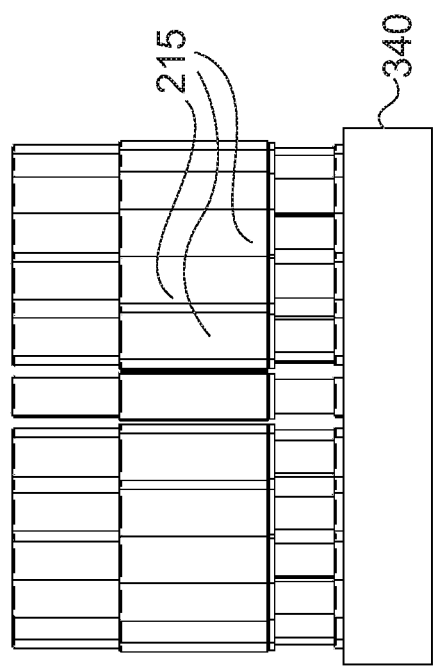

In FIGS. 54A-54C, a similar embodiment, a light blocking element 340, is illustrated. In this embodiment, light source receiving space parts 343 are arranged along two concentric circular lines. In FIG. 54C, the arrangement—particularly the connector parts 215—can also be observed in a spatial drawing.

In the embodiments illustrated in FIGS. 50A-54C, therefore, the light blocking element comprises a plurality of light source receiving space parts arranged in an arrangement pattern, in particular a straight line, circle, or a V-shape, and a plurality of inlet openings corresponding thereto arranged in a single row or in multiple rows.

In the above described embodiments, the light source receiving space part is adapted for receiving a single LED as a light source, and the light source receiving space part is configured to correspond in shape to the LED and/or to a LED housing (the light source receiving space part follows the shape of the LED and/or the LED housing). As shown by the illustrated embodiments, the extent to which it corresponds to the shape of the LED and/or the LED housing depends on the configuration of the LED and its housing (casing). In case the LED protrudes significantly, then the light source receiving space part follows its shape (i.e. the shape of the LED casing; this is the branch of the "or" option referring to the LED); besides that, if the LED housing also protrudes to the receiving space part, then it fits also to its shape (see for example the embodiments of FIGS. 46A-46G and FIGS. 49A-49F; this is the "and" option). Configurations wherein the LED is lowered (recessed), or does not have a significant structural shape for some other reason, are also possible. In these configurations, the receiving space part only fits to the LED housing (see for example the embodiments according to FIGS. 45A-45H and FIGS. 47A-47F; this forms the branch of the "or" option applicable to the LED housing). The embodiments illustrated in FIGS. 50A-54C can also be regarded such embodiments, because in them each light source receiving space part is adapted for receiving a single LED.

Figure 56:
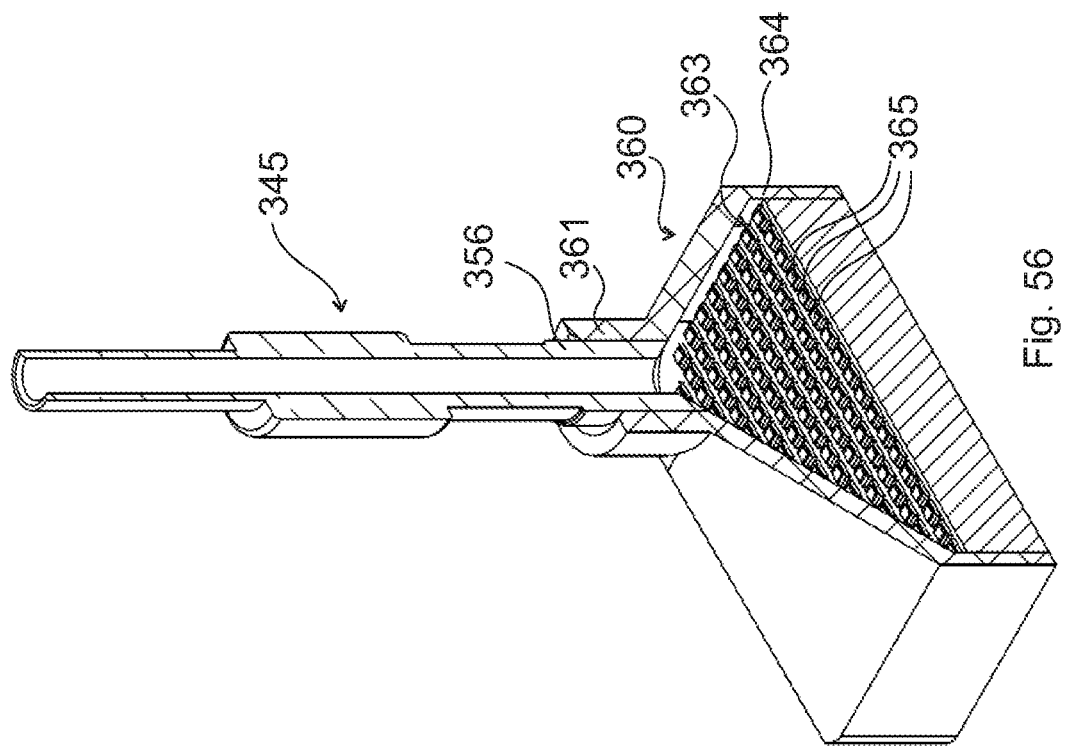
Figure 55:
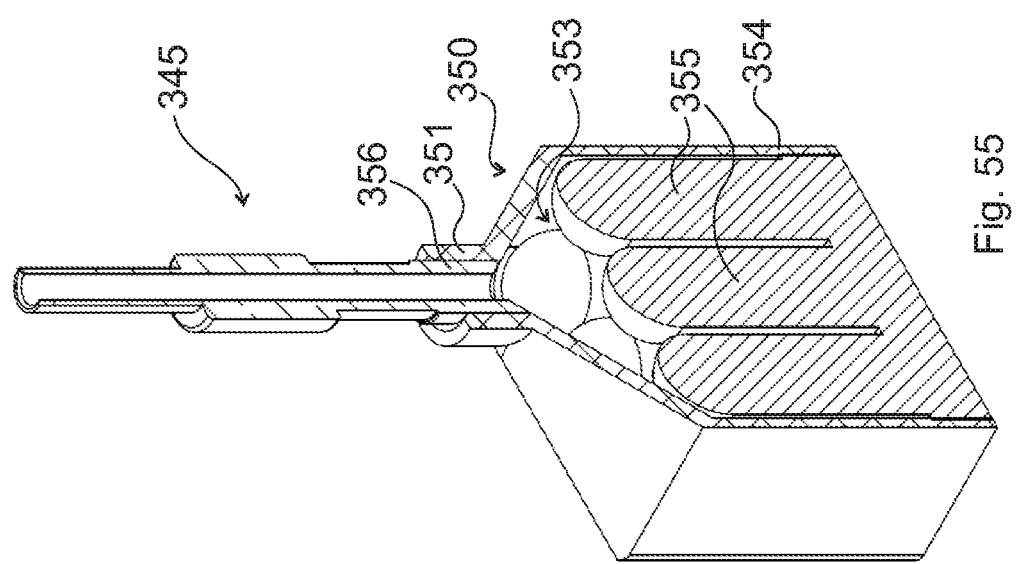

Conversely, in FIGS. 55-57 such embodiments of the light blocking element according to the invention are shown that are adapted to be applied with a group of LEDs (covering them with the same light source receiving space part). In these embodiments, therefore, the light source receiving space part is adapted to receive more than one light sources. In these applications, the light emitted by a group of LEDs is tested (for example, the event when a LED in a group of LEDs is flashed), these embodiments are adapted for testing such groups collectively. FIGS. 55-57 are sectional drawings taken along a plane that bisects a head unit 345 attached to the light blocking element (in FIGS. 55-57, only the head unit of the connector part is shown). Accordingly, the figures show exactly half of the comprised LED group.

In the embodiment of FIG. 55, a light blocking element 350 is applied. The light blocking element 350 has a square or square-like (square with cut-off corners) cross section taken perpendicularly to the longitudinal axis of the connector part. In FIG. 55 the components of the light blocking element 350 are shown, i.e. a introducing tubular portion 351 receiving a head portion 356 of the head unit 345, and a skirt portion 354 that opens therefrom and is encompassed by a light source receiving space part 353 that widens continuously from the introducing tubular portion 351.

In FIG. 55, a group of LEDs 355 is also shown in the light source receiving space part 353. As can be inferred from the sectional view, a total of nine LEDs 355 are encompassed by the light blocking element 350. It can be seen that light blocking is realised by the light blocking element 350, while a group of the LEDs 355 can be tested utilising the optical conduit arranged in the head unit 345.

In FIG. 56, an embodiment similar to the previous one is shown, i.e. a light blocking element 360. This light blocking element 360 is adapted to encompass a number of LEDs 365, it is suitable for testing these. The light blocking element 360 and its parts (an introducing tubular portion 361 and a skirt portion 364) have a similar configuration as those of the light blocking element 350 of the previous embodiment, the difference being that here a receiving space part 363 widens to a greater extent.

The embodiment illustrated in FIG. 57, i.e. a light blocking element 370 is also similar to the above described embodiments. Its parts (an introducing tubular portion 371 and a skirt portion 374) have a similar configuration, the light blocking element 370 encompassing a light source receiving space part 373. However, in the application illustrated in this embodiment there are fewer LEDs 375 (surface mounted LEDs) included compared to the previous one.

A still further embodiment is illustrated in FIGS. 58A-58D. In this embodiment, a light blocking element 390 is applied that is configured similarly to the light blocking element 250. The aim of the solution illustrated in FIGS. 58A-58D is that the relative orientation of the components of the connector part can be controlled, and thus a definite orientation of the light blocking element 390 can be provided.

In this embodiment, the light blocking element 390 is utilized for a connector part 395 (with regard to the features not discussed below it is identical to the above described connector parts, such as the connector part 215), which connector part 395 comprises a flattened side wall portion 380 formed on the widened portion 394 of the head unit 398 (the flattened side wall portion 380 is visible in FIG. 58A, but can be observed even better in FIG. 58C, wherein it is marked on the otherwise cylindrical widened portion 394), a guide protrusion 382 on the inside of the connector housing element facing the flattened side wall portion 380 (preferably, the guide protrusion 382 reaches so far that it touches the flattened side wall portion 380 such that it can guide it even more precisely; it faces the flattened side wall portion 380 and counteracts rotation; the guide protrusion 382 is arranged such that it faces the flattened side wall portion 380 upon any longitudinal-direction displacement of the head unit 398), a first orientation marking 386 on the outside of the connector housing element and a second orientation marking 388 on the head portion rotated in the same direction about the longitudinal axis of the connector part 395 as the guide protrusion 382 (in the assembled state they are aligned with each other, also due to the guiding provided by the guide protrusion 382, for the details of the assembly process see below; the orientation marking can be implemented as a flattened portion like in the figure, an incision or other type of marking).

Applying this embodiment, therefore, it can be ensured that the head unit 398 (and thus the light blocking element 390 attached thereto) and the connector housing element have the desired relative orientation. The above defined assembled state is obtained by—before forming the guide protrusion 382—the head unit 398 and the connector housing element are rotated relative to each other such that their orientation markings 386 and 388 become aligned (thereby ensuring the desired orientation of the light blocking element 390 relative to the head portion 396 of the head unit 398, i.e. the light blocking element 390 is pulled on the head portion 396 at an appropriate orientation with respect to the orientation marking 388). This is followed by forming, preferably by applying pressure to the outer wall of the connector housing element by crimping, the guide protrusion 382. Forming the guide protrusion 382 in such a manner causes the formation of an indentation 384 in the connector housing element.

FIG. 58A shows a half section side view of the present embodiment wherein the lower-lying portions are shown in section, so it can be seen that the guide protrusion 382 touches the flattened side wall portion 380. In FIG. 58B, a side elevation view is shown that is rotated with respect to FIG. 58A. In the figure there can be seen the mutually aligned indentation 384 (that corresponds to the guide protrusion 382) and orientation markings 386, 388.

FIGS. 58C and 58D show the head unit 398 also shown in FIGS. 58A-58B. FIG. 58C shows a side view directed at the flattened side wall portion 380, FIG. 58D showing a view from a direction rotated by 90° relative to FIG. 58C.

Figure 59B:
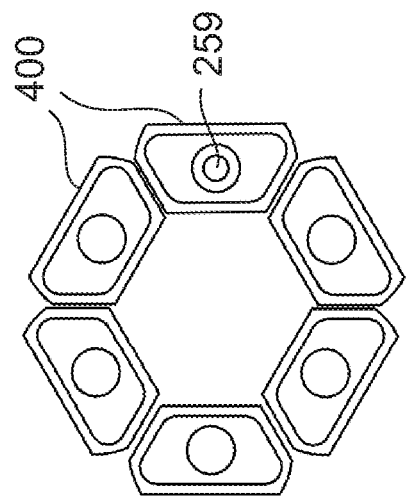
Figure 59A:
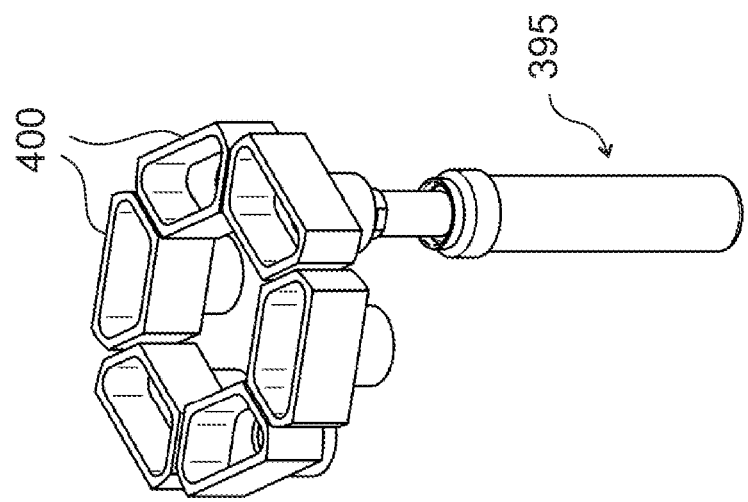

In FIGS. 59A-59B (spatial and top view drawings) there can be seen light blocking elements 400 having a skirt portion that has a trapezoid-like cross-sectional shape (a trapezoid with cut-off corners) in the plane perpendicular to the longitudinal direction of the connector part (the axis of the inlet opening). As it was mentioned above in relation to the light blocking element 280, these can also be arranged in a circle, with their shorter sides touching each other. According to FIGS. 59A-59B, for such a configuration six of the illustrated light blocking elements 400 are required.

To prevent unnecessary rotation, preferably a flattened connector part 395 illustrated in FIGS. 58A-58D is applied for the light blocking element 400. Rotation prevention can also be achieved by applying the structure shown in FIGS. 59A-59B in an integrated manner, i.e. providing a configuration having a "mask" comprising multiple light source receiving space parts similar to the ones illustrated in the embodiments of FIGS. 50A-54C.

In case, for example, a skirt (pin cap superposed element) with a trapezoidal or triangular sectional shape is applied, then light blocking can be provided for such densely mounted, rectangular block-shaped LEDs that are arranged in a circular pattern. This cannot be achieved by applying a rectangular skirt because then the corners thereof would touch and overlap.

The mode of industrial application of the invention according to the above description follows from the features of the invention. As can be seen from the description above, the invention achieves its objects in a particularly preferable manner compared to the prior art. The invention is, of course, not limited to the preferred embodiments described in details above, but further variants, modifications and developments are possible within the scope of protection determined by the claims.

LEGENDS 10 (first) optical cable
11 (first) connector part
12 (second) optical cable
14 (second) body
16 (second) head portion
18 (first) head portion
19 stem
20 (first inward extending) edge portion
21 (second) connector part
22 connector housing element
23 (first) shoulder portion
24 (first) widened portion
26 resilient element
27 (second) shoulder portion
28 (spherical) end portion
29 (second inward extending) edge portion
30 (conical) side wall
31 cylindrical portion
32 (second conical) introduction portion
34 (first conical) introduction portion
35 (conical) receiving space part
36 guide portion
40 (first) opening
42 (first) jacket
44 (first) core
45 (first) conduit channel
50 (second) opening
52 (second) jacket
54 (second) core
55 (second) conduit channel
60 (first) connector insert
62 (oblique) opening
64 rim
65a (first) opening
65b (second) opening
66a (first) connector board
66b (second) connector board
68 interconnection rod
70 connection opening
72 (second) crimping protrusion
74 (first) crimping protrusion
76 (first) crimping indentation
78 (second) crimping indentation
80 (second) connector insert
81 insert body
82 outlet channel
84 insert ring
86 through opening
88 inset recess
90 rim
102 base portion
104 moving portion
106 hooking handle
107 handle shank
108 (second) axis of rotation
110 (first) axis of rotation
112 clamping tab
114 hooking portion
116 hooking recess
117a (first) clamping recess
117b (second) clamping recess 118a (first) clamping portion
118b (second) clamping portion
119 protrusion
120 crimping pin
122 hooking shaft
123 shaft holder
124 (first) support element
125 cavity
126 (second) support end
128 (first) trough
130 guide pin (for resilient element)
132 (second) resilient element
134 (second) trough
136 securing opening
138 adjustment screw
140 (third) resilient element
141 (elongated) opening
142 incision
144 crimping end
150 push-out housing element
152 push-out stem
154 operating cap element
156 front portion (of housing element)
157 rear portion (of housing element)
158 (conical first) housing end portion
160 thread
162 (second) widened portion
164 (second) abutment edge
166 (first) abutment edge
168 push-out pin
170 (fourth) resilient element
172 outlet opening
175 (first) handle shank
176 (second) handle shank
177 (first) clamping portion
178 (second) clamping portion
179 axis of rotation
180 (second) support element
181 (second) support end
182 (first) crimping pin
184 (second) crimping pin
185 clamping recess
200 connector structure
205 LED analyzer
207 connector
208 (first) optical conduit
209 (second) optical conduit
210 printed circuit board
211 connector insert
212 connector housing element
213 resilient element
214 widened portion
215 connector part
216 (first inward extending) edge portion
217 (second inward extending) edge portion
219 stem
220 light blocking element
222 head portion
223 light source receiving space part
224 skirt portion
225 LED housing
226 LED
227 LED
235 LED housing
237 LED
245 LED housing
247 LED
248 conical introduction portion
250 light blocking element
251 introducing tubular portion
252 end position edge
253 light source receiving space part
254 skirt portion
255 LED housing
256 head portion
257 LED
258 (conical) side wall
259 optical conduit
260 light blocking element
261 introducing tubular portion
262 end position edge
263 light source receiving space part
264 skirt portion
265 LED housing
266 head portion
267 LED
268 (conical) side wall
270 light blocking element
271 introducing tubular portion
272 end position edge
273 light source receiving space part
274 skirt portion
275 LED housing
277 LED
280 light blocking element
281 introducing tubular portion
282 end position edge
283 light source receiving space part
284 skirt portion
285 LED housing
287 LED
290 light blocking element
291 introducing tubular portion
292 end position edge
293 light source receiving space part
294 skirt portion
295 LED housing
297 LED
299 protruding portion
300 light blocking element
303 light source receiving space part
310 light blocking element
313 light source receiving space part
320 light blocking element
323 light source receiving space part
330 light blocking element
333 light source receiving space part
340 light blocking element
343 light source receiving space part
345 head unit
350 light blocking element
351 introducing tubular portion
353 light source receiving space part
354 skirt portion
355 LED
356 head portion
360 light blocking element
361 introducing tubular portion
363 light source receiving space part
364 skirt portion
365 LED
370 light blocking element
371 introducing tubular portion
373 light source receiving space part 374 skirt portion
375 LED
380 flattened side wall portion
382 guide protrusion
384 indentation
386 (first) orientation marking
388 (second) orientation marking
390 light blocking element
394 widened portion
395 connector part
396 head portion
398 head unit
399 stem
400 light blocking element
D1 (first) distance
D2 (second) distance
D3 (third) distance
D4 (fourth) distance
DEG angle
P1 crimping position

The invention claimed is:

1. A connector structure for connecting optical conduits, comprising a first connector part (11) and a second connector part (21) connectible to each other, characterised in that the first connector part (11) comprises
a first head unit comprising a first head portion (18) at a first end, a first widened portion (24), and a stem (19) interconnecting the first head portion (18) and the first widened portion (24) and providing that the first head portion (18) and the widened portion (24) move together in case of a displacement of the head unit, wherein the first head portion (18) is situated at an end of the stem (19), and a conical receiving space part (35) having a conical side wall (30) and widening in the direction of an end portion of the first head portion (18) situated opposite the connection thereof to the stem (19) is formed in the first head portion (18),
a connector housing element (22) having a third end and a fourth end opposite the third end, and the connector housing element (22) receives the first widened portion (24) at the third end and retains it in its inner space by means of a first inward extending edge portion (20) formed at the third end and arranged around the stem (19), and
a first resilient element (26) arranged in an inner space of the connector housing element (22), supported against the first widened portion (24) and against a second inward extending edge portion (29) formed at the fourth end of the connector housing element (22), and a first conduit channel (45) interconnecting the fourth end of the connector housing element (22) and an end portion of the conical receiving space part (35) being at the stem (19), encompassed by the first resilient element (26), and adapted for arranging a first optical conduit is formed in the first connector part (11), and
the second connector part (21) has a fifth end and a sixth end, and comprises, at the fifth end, a second head portion (16) having a spherical end portion (28) adapted for being circularly seated on the conical side wall (30) of the conical receiving space part (35) of the first head portion (18) of the first connector part (11) in case the first connector part (11) is connected to the second connector part (21), and a second conduit channel (55) interconnecting the sixth end of the second connector part (21) and the spherical end portion (28) and adapted for arranging a second optical conduit is formed in the second connector part (21).

2. The connector structure according to claim 1, characterised in that the diameter of the first conduit channel (45) perpendicularly to the longitudinal axis thereof is the same as the diameter of the second conduit channel (55) perpendicularly to the longitudinal axis thereof.

3. The connector structure according to claim 1, characterised in that
a first opening (40) of the first conduit channel (45) at the conical receiving space part (35), and a second opening (50) of the second conduit channel (55) on the spherical end portion (28), have opening planes that are perpendicular, respectively, to the longitudinal axis of the first conduit channel (45) and to the second longitudinal axis of the second conduit channel (55), and are configured symmetrically about the first longitudinal axis and the second longitudinal axis, respectively, and
a first angle formed between the first longitudinal axis and the conical side wall (30) is smaller than a second angle formed between the second longitudinal axis and a tangent to the spherical end portion (28) drawn at the edge of the second opening (50) perpendicular to the edge of the second opening (50).

4. The connector structure according to claim 3, characterised in that, in case the first optical conduit and the second optical conduit are arranged, respectively, in the first conduit channel (45) and the second conduit channel (55), the respective ends of the first optical conduit and the second optical conduit situated at the first opening (40) and the second opening (50) are arranged at the respective opening planes of the first opening (40) and the second opening (50).

5. The connector structure according to claim 1, characterised in that an inwardly narrowing first conical introduction portion (34) adapted for introducing the first optical conduit is formed at the fourth end of the connector housing element (22), and/or an inwardly narrowing second conical introduction portion (32) adapted for introducing the second optical conduit is formed at the end of the second connector part (21) situated opposite the second head portion (16).

6. The connector structure according to claim 1, characterised by comprising a first shoulder portion (23) arranged on the outside wall of the connector housing element (22) of the first connector part (11), protruding from the longitudinal axis of the first conduit channel (45) further outward than the outside wall of the connector housing element (22), and adapted for clamping the first connector part (11).

7. The connector structure according to claim 1, characterised in that the first head unit comprises a cylindrical guide portion (36) connected to the end portion of the first widened portion (24) being at the fourth end of the connector housing element (22), and encompassing the first conduit channel (45).

8. The connector structure according to claim 1, characterised in that the second connector part (21) comprises a body (14) connected to the second head portion (16) at its end opposite the spherical end portion (28), having a smaller extension measured from the longitudinal axis of the second conduit channel (55) than the second head portion (16), and encompassing the second conduit channel (55).

9. The connector structure according to claim 1, characterised in that the second head portion (16) of the second connector part (21) comprises a cylindrical portion (31) being in connection with the spherical end portion (28) and has a diameter identical to the largest diameter thereof perpendicularly to its longitudinal axis.

10. The connector structure according to claim 1, characterised in that the first resilient element (26) is a helical spring.

11. The connector structure according to claim 1, characterised by comprising a connector insert (60, 80) having a cylindrical insert body (81) adapted to be fitted, via a first end, onto the connector housing element (22) of the first connector part (11).

12. The connector structure according to claim 11, characterised in that the connector insert further comprises a cylindrical outlet channel (82) connected to a second end thereof, and an insert ring (84) pressed against the inside wall of the outlet channel (82), being coaxial with the outlet channel (82), being adapted for guiding the first optical conduit is arranged in the outlet channel (82).

13. The connector structure according to claim 12, characterised in that a through opening (86) is formed in the side wall of the outlet channel (82), and an inset recess (88) being narrower than the through opening (86) is formed on the insert ring (84).

* * * * *